(12) United States Patent
Cernak et al.

(10) Patent No.: US 12,497,712 B2
(45) Date of Patent: Dec. 16, 2025

(54) PROPERTY MODULATION WITH CHEMICAL TRANSFORMATIONS

(71) Applicant: THE REGENTS OF THE UNIVERSITY OF MICHIGAN, Ann Arbor, MI (US)

(72) Inventors: Timothy Cernak, Ann Arbor, MI (US); Babak Mahjour, Ann Arbor, MI (US); Yuning Shen, Ann Arbor, MI (US); Andrew McGrath, Ann Arbor, MI (US); Rui Zhang, Ann Arbor, MI (US)

(73) Assignee: REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 1475 days.

(21) Appl. No.: 16/836,481

(22) Filed: Mar. 31, 2020

(65) Prior Publication Data

US 2020/0370204 A1 Nov. 26, 2020

Related U.S. Application Data

(60) Provisional application No. 62/963,863, filed on Jan. 21, 2020, provisional application No. 62/850,872, filed on May 21, 2019.

(51) Int. Cl.
| | |
|---|---|
| *G01N 33/48* | (2006.01) |
| *C40B 40/04* | (2006.01) |
| *C40B 50/04* | (2006.01) |
| *G16C 20/10* | (2019.01) |
| *C40B 50/10* | (2006.01) |
| *G16C 20/20* | (2019.01) |
| *G16C 20/40* | (2019.01) |
| *G16C 20/60* | (2019.01) |

(52) U.S. Cl.
CPC .............. *C40B 50/04* (2013.01); *C40B 40/04* (2013.01); *G16C 20/10* (2019.02); *C40B 50/10* (2013.01); *G16C 20/20* (2019.02); *G16C 20/40* (2019.02); *G16C 20/60* (2019.02)

(58) Field of Classification Search
None
See application file for complete search history.

(56) References Cited

U.S. PATENT DOCUMENTS

| | | |
|---|---|---|
| 6,362,351 B2 | 3/2002 | Scott |
| 2003/0033088 A1 | 2/2003 | Agrafiotis et al. |
| 2003/0087334 A1 | 5/2003 | Bunin et al. |
| 2003/0229477 A1 | 12/2003 | Schurer et al. |

FOREIGN PATENT DOCUMENTS

| | | |
|---|---|---|
| WO | 2019/156872 A1 | 8/2019 |

OTHER PUBLICATIONS

Nielsen, Thomas E., and Stuart L. Schreiber. "Towards the optimal screening collection: a synthesis strategy." Angewandte Chemie International Edition 47.1 (2008): 48-56.*
Szymkuc et al., Computer-Assisted Synthetic Planning: The End of the Beginning, Angew Chem. Int. Ed. Engl., 55(20):5904-37 (2016).
Coley et al., A graph-convolutional neural network model for the prediction of chemical reactivity, Chem. Sci., 10(2):370-7 (2018).
Warr, A Short Review of Chemical Reaction Database Systems, Computer-Aided Synthesis Design, Reaction Prediction and Synthetic Feasibility, Mol. Inform., 33(6-7):469-76 (2014).
Chen et al., No electron left behind: a rule-based expert system to predict chemical reactions and reaction mechanisms, J. Chem. Inf. Model, 49(9):2034-43 (2009).
Lyu et al., Ultra-large library docking for discovering new chemotypes, Nature, 566(7743):224-9 (2019).
European Patent Application No. 20809115, Supplementary Partial European Search Report, dated May 15, 2023.
Bickerton et al., Quantifying the chemical beauty of drugs, Nat. Chem., 4:90-98 (2012).
Gaich et al., Aiming for the ideal synthesis, J. Org. Chem., 75(14):4657-4673 (2010).
Hari et al., Metal-free, visible-light-mediated direct C-H arylation of heteroarenes with aryl diazonium salts, J. Am. Chem. Soc., 134(6):2958-2961 (2012).
Hendrickson et al., A logic-based program for synthesis design, J. Am. Chem. Soc., 107:5228-5238 (1985).
Hendrickson, Systematic characterization of structures and reactions for use in organic synthesis, J. Am. Chem. Soc., 93(25):6847-6854 (1971).
Henze et al., The number of structurally isomeric alcohols of the methanol series, J. Am. Chem. Soc., 53:3042-3046 (1931).
Hill et al., Getting physical in drug discovery: a contemporary perspective on solubility and hydrophobicity, Drug Discovery Today, 15(15-16):648-655 (2010).
Huang et al., Iridium-catalyzed ortho-arylation of benzoic acids with arenediazonium salts, Angew. Chem. Int. Ed. Engl., 54:12607-12611 (2015).
International Application No. PCT/US2020/026002, International Search Report and Written Opinion, mailed Jul. 23, 2020.
International Application No. PCT/US2020/026002, Invitation to Pay Additional Fees, mailed May 22, 2020.

(Continued)

*Primary Examiner* — Anna Skibinsky
(74) *Attorney, Agent, or Firm* — MARSHALL, GERSTEIN & BORUN LLP

(57) ABSTRACT

Disclosed herein is a method of generating a combinatorial library of products having a diverse array of properties. In particular, the method comprises: (a) selecting one or more pairs of reactants comprising complementary functional groups; (b) mapping all possible bond arrangements between the complementary functional groups of each pair to provide a library of possible products; (c) analyzing one or more properties of each possible product to select one or more products with desired properties (desired products); and (d) synthesizing the one or more desired products. Further disclosed herein is a method that involves the retrosynthetic reduction of a complex molecule into simple starting materials.

5 Claims, 14 Drawing Sheets

(56) References Cited

OTHER PUBLICATIONS

Li et al., Recent advances in silver-catalyzed Nitrene, Carbene, and Silylene-transfer reactions, Eur. J. Org. Chem., 4313-4322 (2006).
Moore, The shortest path through a maze, Proc. Int. Symposium on the Theory of Switching, Part II, Harvard University Press, 285-292 (1959).
Patra et al., Decarboxylation as the Key step in C-C bond-forming reactions, Chem. Eur. J., 23:7382-7401 (2017).
Ugi et al. New elements in the representation of the logical structure of chemistry by qualitative mathematical models and corresponding data structures, In Comp. Chem., 199-233 (1993).
Valeur et al., Amide bond formation: beyond the myth of coupling reagents, Chem. Soc. Rev., 38:606-631 (2009).
Wager et al., Central nervous system multiparameter optimization desirability: Application in drug discovery, ACS Chem. Neuro., 7:767-775 (2016).
Wang et al., Transition-metal catalysed C-N bond activation, Chem. Soc. Rev., 45:1257-1272 (2016).

* cited by examiner a. the amide coupling is the most popular reaction in drug discovery b. conceivable amine-acid coupling transformations

FIG. 9

PROPERTY MODULATION WITH CHEMICAL TRANSFORMATIONS

TECHNICAL FIELD

The present disclosure relates to methods of developing new chemical reactions between complementary pairs of functional groups, such as between an amine and a carboxylic acid, to produce a library of products having property diversity, and selecting from the library, products with specific, desirable properties. The present disclosure also relates to novel methods that involve the retrosynthetic reduction of a complex molecule into simple starting materials.

DESCRIPTION OF RELATED TECHNOLOGY

New chemical compounds and reactions are explored to achieve specific functional objectives, such as metabolic stability for pharmaceuticals or volatility for perfumes. Molecular functions are encoded by molecular properties, which in turn are linked to molecular structure. Traditional methods of modulating molecular properties with chemical synthesis involve coupling different chemical building blocks to a core molecule using popular chemical transformations, such as the amide coupling or Suzuki coupling. The products produced by these known combinatorial methods are limited by the traditional chemical transformations used to produce them (e.g., the coupling of an amine and a carboxylic acid to form an amide). New synthetic reactions and strategies are needed to develop chemical libraries of compounds having a greater degree of structural and property diversity.

SUMMARY

In one aspect, disclosed herein is a method comprising: (a) selecting one or more pairs of reactants comprising complementary functional groups; (b) mapping possible bond arrangements, such as all possible bond arrangements, between the complementary functional groups of each pair to provide a library of possible products; (c) analyzing one or more properties of each possible product to select one or more products with desired properties (desired products); and (d) synthesizing the one or more desired products.

In some embodiments, the method further comprises enumerating possible oxidation states, such as all possible oxidation states, of each possible product in the library of possible products to produce a library of auxiliary products. In various embodiments, the method further comprises enumerating possible stereoisomers, such as all possible stereoisomers, of each product and auxiliary product to produce a library of stereoisomers. In some cases, the library of possible products, library of auxiliary product, and/or library of stereoisomers is a combinatorial library. In various cases, the one or more properties is selected from the group consisting of partition coefficient (LOG P), molecular weight (MW), rotatable bonds (ROTB), polar surface area (PSA), aromaticity (AROM), formal charge (FC), 3D shape as determined by principal moment of inertia (PMI), fraction of $sp^3$ carbons (FSP3), number of hydrogen bond donors (HBD), number of hydrogen bond acceptors (HBA), quantitative estimate of drug-likeliness (QED), and combinations thereof.

In some embodiments, an adjacency matrix is used to enumerate a library of products comprising all possible bond arrangements between all atoms, and the selection of a subset of products from the library. For example, in some embodiments the possible bond arrangements are mapped using an adjacency matrix.

In some embodiments, one reactant of the reactant pair comprises a C—H bond that is capable of functionalization. In various embodiments, the functional groups are selected from the group consisting of amines, alcohols, thiols, carboxylic acids and derivatives thereof, aldehydes, ketones, organohalides, alkynes, allenes, alkenes, and activated forms of the foregoing. In some cases, one reactant of a reactant pair comprises a functional group selected from the group consisting of an amine, an alcohol, a thiol, an organohalide, and activated forms thereof, and the other reactant of the reactant pair comprises a functional group selected from the group consisting of a carboxylic acid or derivative thereof, an alcohol, an amine, a thiol, an organohalide, and activated forms thereof. In various cases, the functional groups of the one or more pairs of reactants are selected from the group consisting of: (i) a free or an activated amine and a carboxylic acid or derivative thereof, (ii) a free or an activated amine and a free or an activated alcohol, (iii) a free or an activated amine and an organohalide, (iv) a free or an activated alcohol and an organohalide, (v) an organohalide and a carboxylic acid or derivative thereof, (vi) a free or an activated alcohol and a carboxylic acid or derivative thereof. In some embodiments, the functional groups are a free or activated amine and a carboxylic acid or derivative thereof.

In various embodiments, the synthesizing comprises contacting a free or an activated alkyl or aryl amine and an alkyl or aryl carboxylic acid or derivative thereof in the presence of a catalytic system comprising: (i) an oxidant or a reductant, and (ii) a transition metal catalyst comprising copper, nickel, iron, or palladium, to form a carbon-carbon bond. In some cases, the synthesizing comprises contacting a free or an activated alkyl or aryl amine and an alkyl or aryl carboxylic acid or derivative thereof in the presence of a co-catalytic system comprising: (i) a transition metal co-catalyst comprising copper, nickel, or palladium, and (ii) a photoredox co-catalyst, to form a carbon-carbon bond. In some cases, the synthesizing comprises contacting a free of an activated alkyl or aryl amine and an alkyl or aryl carboxylic acid or derivative thereof in the presence of a catalytic system comprising: (i) an oxidant or a reductant, and (ii) and a transition metal catalyst comprising copper, nickel, iron, or palladium, to form a carbon-oxygen bond. In various embodiments, the synthesizing comprises contacting a free of an activated alkyl or aryl amine and an alkyl or aryl carboxylic acid or derivative thereof in the presence of a co-catalytic system comprising: (i) a transition metal co-catalyst comprising copper, nickel, iron, or palladium, and (ii) a photoredox co-catalyst, to form a carbon-oxygen bond. In some cases, the synthesizing comprises contacting a free of an activated alkyl or aryl amine and an alkyl or aryl carboxylic acid or derivative thereof in the presence of a catalytic system comprising: (i) an oxidant or reductant, and (ii) a transition metal catalyst comprising copper, nickel, iron, or palladium, to form a carbon-nitrogen bond. In various cases, the synthesizing comprises contacting a free of an activated alkyl or aryl amine and an alkyl or aryl carboxylic acid or derivative thereof in the presence of a co-catalytic system comprising: (i) a transition metal co-catalyst comprising copper, nickel, iron, or palladium, and (ii) a photoredox co-catalyst, to form a carbon-nitrogen bond. In some embodiments, the activated aryl amine is a diazonium salt, a trialkylammonium salt, isocyanidyl, or a pyridinium salt. In various embodiments, the synthesizing comprises contacting an activated alkyl or aryl amine and an alkyl or aryl carboxylic acid or derivative thereof in the presence of a radical shuttle to form a carbon-oxygen bond. In some cases, the activated alkyl amine comprises a pyridinium salt, the alkyl or aryl carboxylic acid or derivative thereof comprises a potassium salt, and the radical shuttle comprises diethyl 2-bromo-2-methylmalonate.

Another aspect of the disclosure provides a method of forming a carbon-carbon bond comprising contacting an activated aryl amine with an aryl carboxylic acid or derivative thereof in the presence of a catalytic system comprising a silver salt and a transition metal catalyst comprising copper, nickel, iron, or palladium to form the carbon-carbon bond. In some embodiments, the activated aryl amine is selected from the group consisting of a diazonium salt, a trimethlyammonium salt, isocyanidyl, and a pyridinium salt. In various embodiments, the diazonium salt is formed in situ by contacting an aniline with tert-butylnitrite or sodium nitrite. In some cases, the aryl carboxylic acid or derivative thereof is activated with a silver complex, hypobromite, hypervalent iodine, or benzophenone oxime. In various cases, the activated aryl amine is a diazonium salt and the aryl carboxylic acid or derivative thereof is an ortho-substituted benzoic acid. In some embodiments, the catalytic system comprises a silver salt and palladium (0). In various cases, the catalytic system comprises $Ag_2CO_3$ and $Pd(PPh_3)_4$.

Yet another aspect of the disclosure relates to a method of forming a carbon-carbon bond comprising contacting an aryl amine or activated amine with an alkyl carboxylic acid or derivative thereof in the presence of a co-catalytic system comprising a photoredox co-catalyst and a transition metal co-catalyst comprising copper, nickel, and palladium to form the carbon-carbon bond. In some embodiments, the aryl amine comprises aniline. In various embodiments, the aryl activated amine is selected from the group consisting of a diazonium salt, a trimethlammonium salt, isocyanidyl, and a pyridinium salt. In some cases, the diazonium salt is formed in situ by contacting an aniline with tert-butylnitrite or sodium nitrite. In various cases, the alkyl carboxylic acid or derivative thereof is $C_{4-10}$cycloalkyl carboxylic acid, $C_{4-20}$alkylene carboxylic acid, $C_{4-20}$alkylenylene carboxylic acid, or benzylic carboxylic acid. In some embodiments, the transition metal co-catalyst comprises copper (II). In various embodiments, the photoredox co-catalyst comprises iridium. In some cases, the photoredox co-catalyst comprises [Ir(dF(CF$_3$ppy)$_2$(bpy)]PF$_6$ or Ir[dFFppy]$_2$-(4,4'-dCF$_3$bpy)PF$_6$.

Another aspect of the disclosure provides a method comprising: (a) selecting a desired product; (b) retrosynthetically mapping all possible bond disconnections from the desired product; (c) analyzing each bond disconnection to provide a library of possible reactant pairs having complementary functional groups for each bond disconnection; and (d) selecting a reactant pair having complementary functional groups (selected reactant pair) from each library of possible reactant pairs for the synthesis of the desired product. In some embodiments, the possible bond disconnections are mapped using an adjacency matrix. In some embodiments, step (c) of the method further comprises enumerating all possible oxidation states for each reactant in each library of possible reactant pairs, and adding to each library of possible reactant pairs the enumerated oxidation states of each reactant in the library. In some cases, step (c) further comprises enumerating all possible stereoisomers of each reactant and oxidation states thereof in each library of possible reactant pairs, and adding to each library of possible reactant pairs, the enumerated stereoisomers for each reactant and oxidation states thereof. In some embodiments, each library of possible reactant pairs is a combinatorial library.

In some embodiments, one reactant of the reactant pair comprises a C—H bond that is capable of functionalization. In various embodiments, the functional groups are selected from the group consisting of amines, alcohols, thiols, carboxylic acids and derivatives thereof, aldehydes, ketones, organohalides, alkynes, allenes, alkenes, and activated forms of the foregoing. In some cases, one reactant of a reactant pair comprises a functional group selected from the group consisting of an amine, an alcohol, a thiol, an organohalide, and activated forms thereof, and the other reactant of the reactant pair comprises a functional group selected from the group consisting of a carboxylic acid or derivative thereof, an alcohol, an amine, a thiol, an organohalide, and activated forms thereof. In various cases, the functional groups of the one or more pairs of reactants are selected from the group consisting of: (i) a free or an activated amine and a carboxylic acid or derivative thereof, (ii) a free or an activated amine and a free or an activated alcohol, (iii) a free or an activated amine and an organohalide, (iv) a free or an activated alcohol and an organohalide, (v) an organohalide and a carboxylic acid or derivative thereof, (vi) a free or an activated alcohol and a carboxylic acid or derivative thereof. In some embodiments, the functional groups are a free or activated amine and a carboxylic acid or derivative thereof.

In some cases, the method further comprising (e) synthesizing the desired product from the selected reactant pairs having complementary functional groups. In some cases, the desired product is synthesized via an unknown reaction of the selected reaction pairs.

Further aspects and advantages will be apparent to those of ordinary skill in the art from a review of the following detailed description, taken in conjunction with the drawings. The description hereafter includes specific embodiments with the understanding that the disclosure is illustrative, and is not intended to limit the invention to the specific embodiments described herein.

and 19,

wherein A and B are complementary functional groups, to form products 20-25. Numerous additional arrangements are possible, although not shown here.

Figure 2:
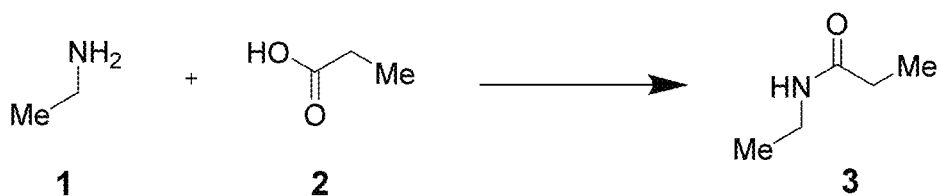
Figure 2:
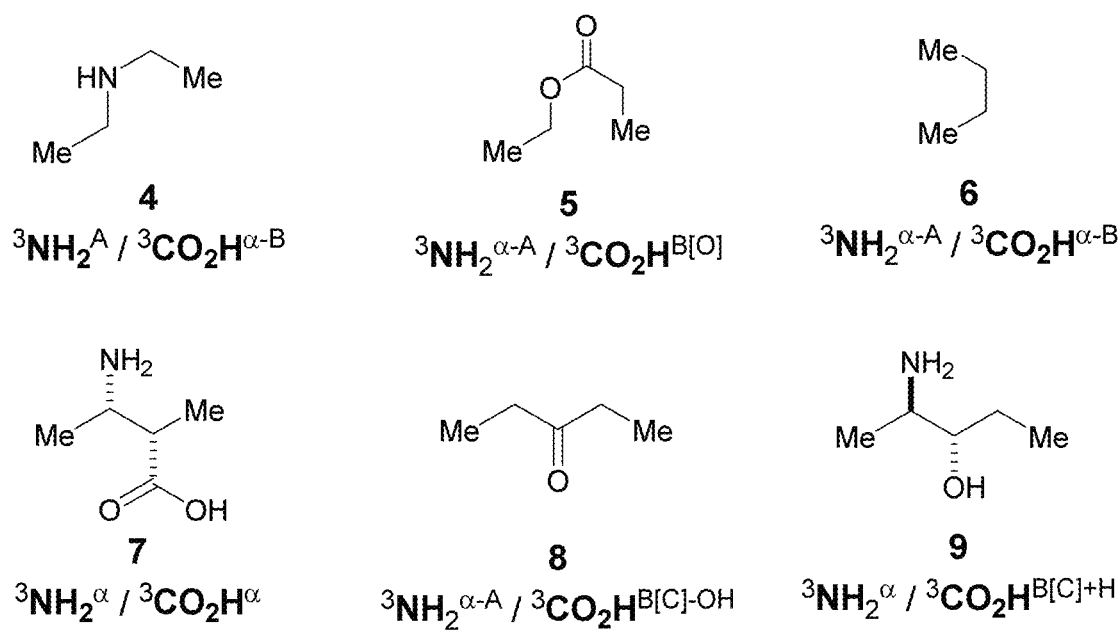
Figure 3A:
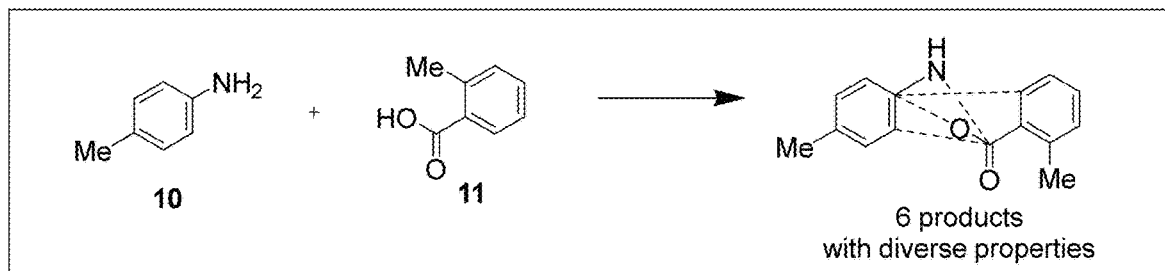
Figure 3A:
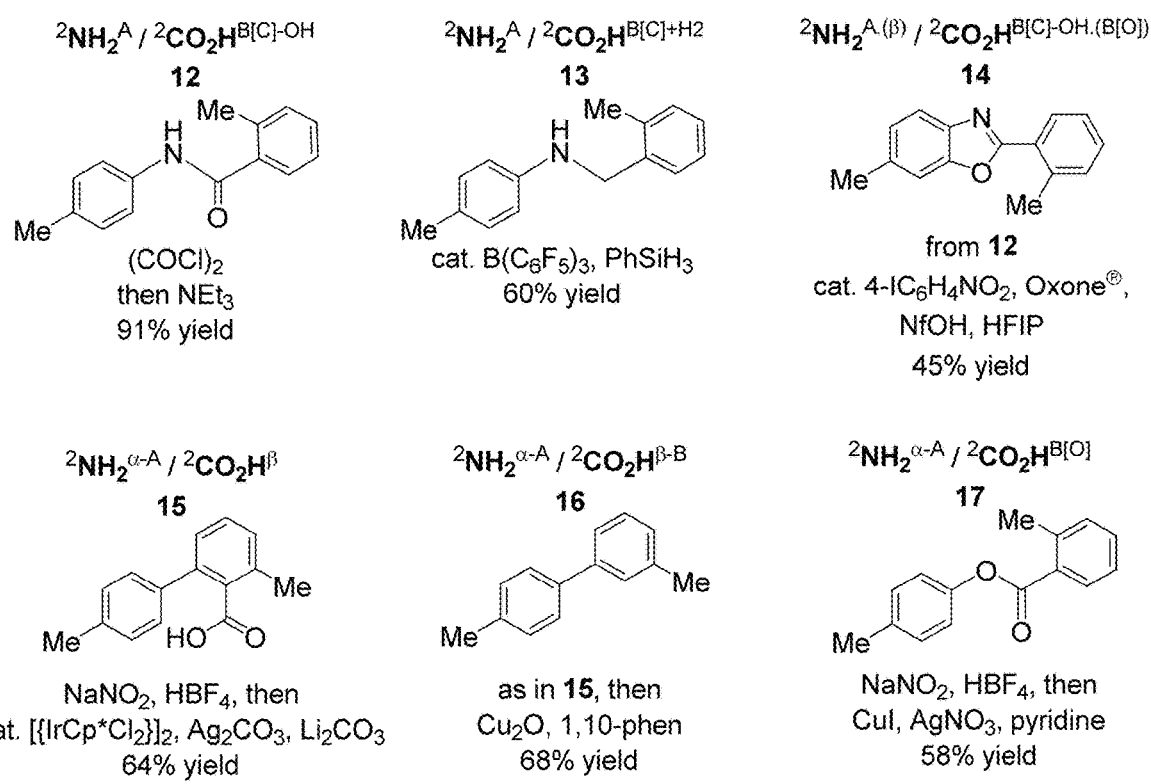
Figure 3B:
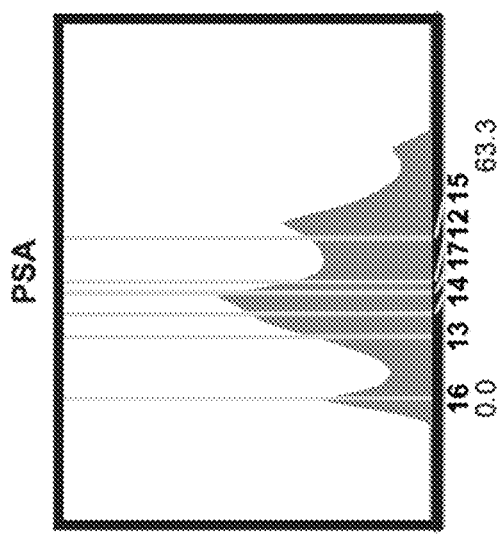
Figure 3B:
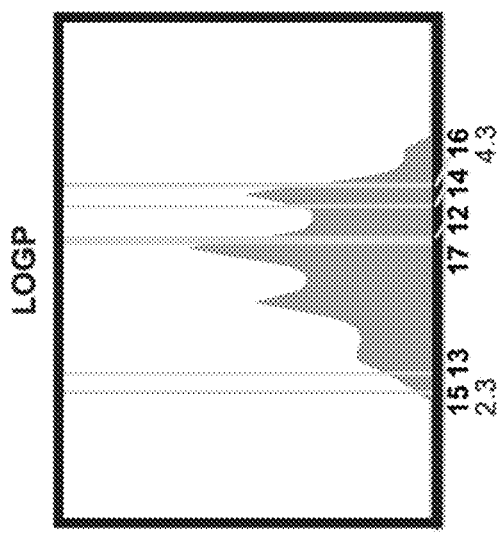
Figure 3B:
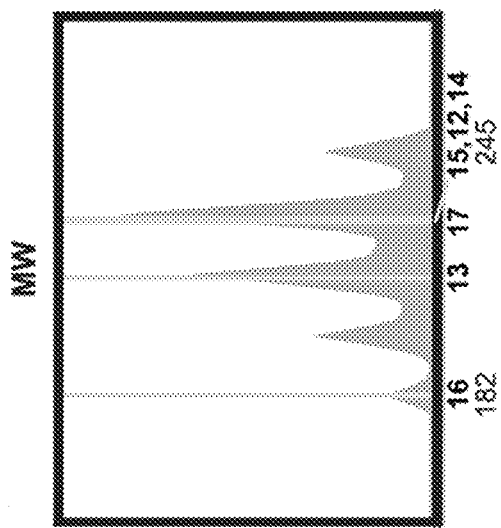

FIG. 2 depicts the mapping of some of the possible bond arrangements between a an alkyl amine and a carboxylic acid. Numerous additional arrangements are possible, although not shown here.

FIG. 3 depicts (a): some of the diverse products that can be formed from the same two starting materials—an aryl amine and an aryl carboxylic acid, and (b): Kernel density estimation plots showing the range of accessible molecular weight (MW), partition coefficient (LOG P), and polar surface area (PSA) by coupling the aryl amine with the aryl carboxylic acid with diverse amine—acid coupling transformations. Grey lines denote the MW, LOG P, and PSA of 12-17. Calculations use 13 and 15 in their charged protonation state.

Figure 4A:
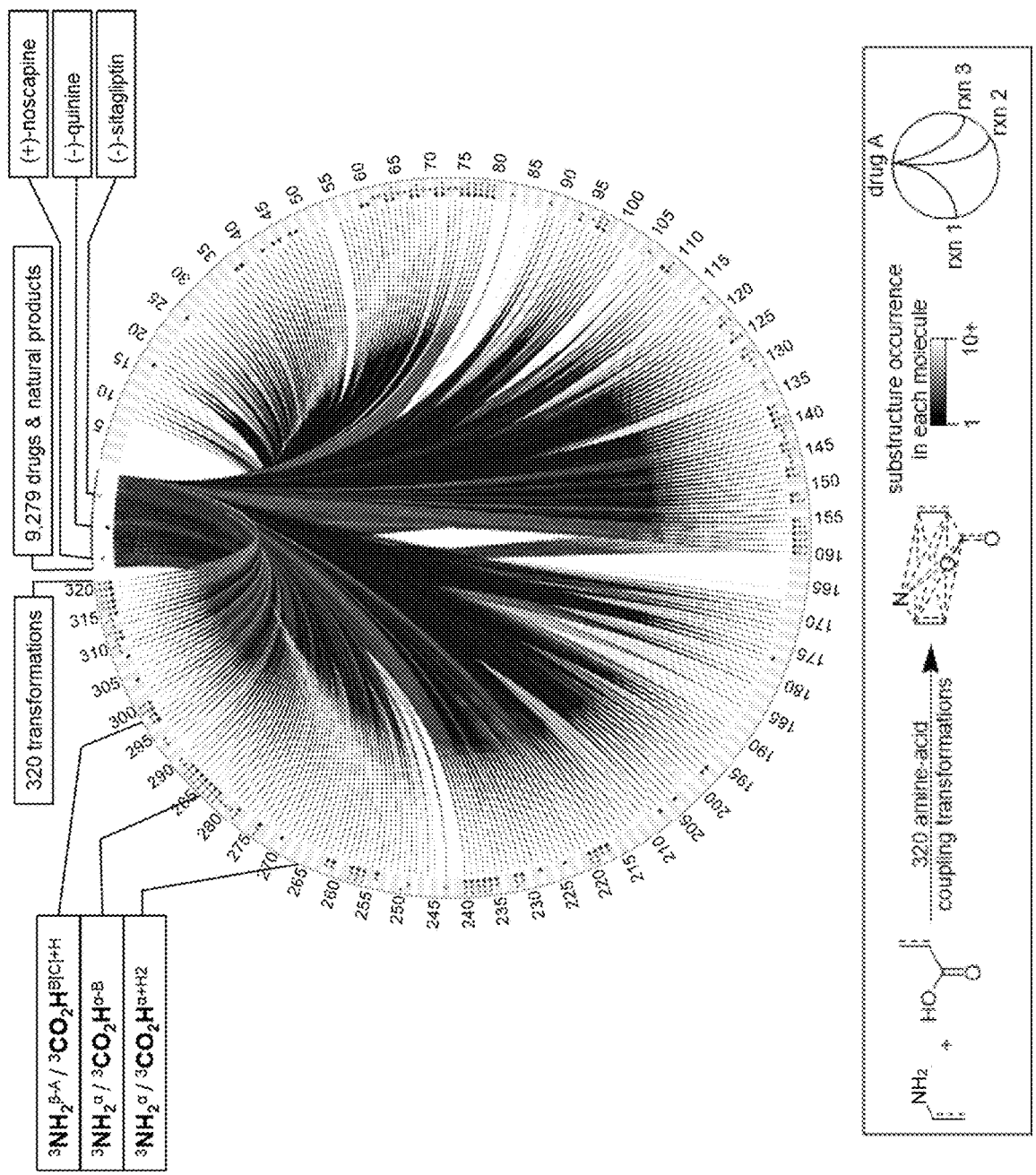

FIG. 4 depicts A) a visualization of 9729 complex molecules from the DrugBank database connected to substructures of 320 different bond arrangements that were enumerated from reactants comprising an ethyl amine or ethenamine and propanoic acid or acrylic acid. The dots around the periphery in FIG. 4C denote which specific transformations appear in complex molecules (+)-noscapine (green dots), (−)-quinine (purple dots) and (−)-sitagliptin (blue dots), which connect to 112, 96, and 55 transformations, respectively; B) the distribution, plotted as kernel density estimates, of predicted chemoinformatic properties for the same product substructures from transformations of an amine and an acid depicted in FIG. 4A.

Figure 5:
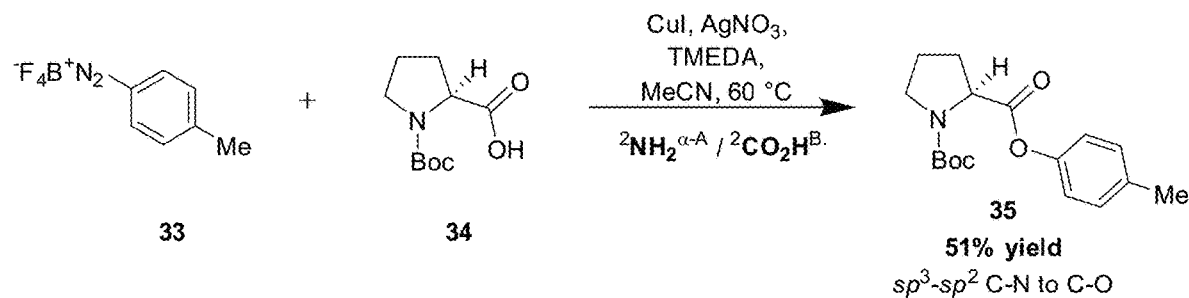

FIG. 5 depicts a $sp^2$-$sp^3$ deaminative esterification of the disclosure.

Figure 6:
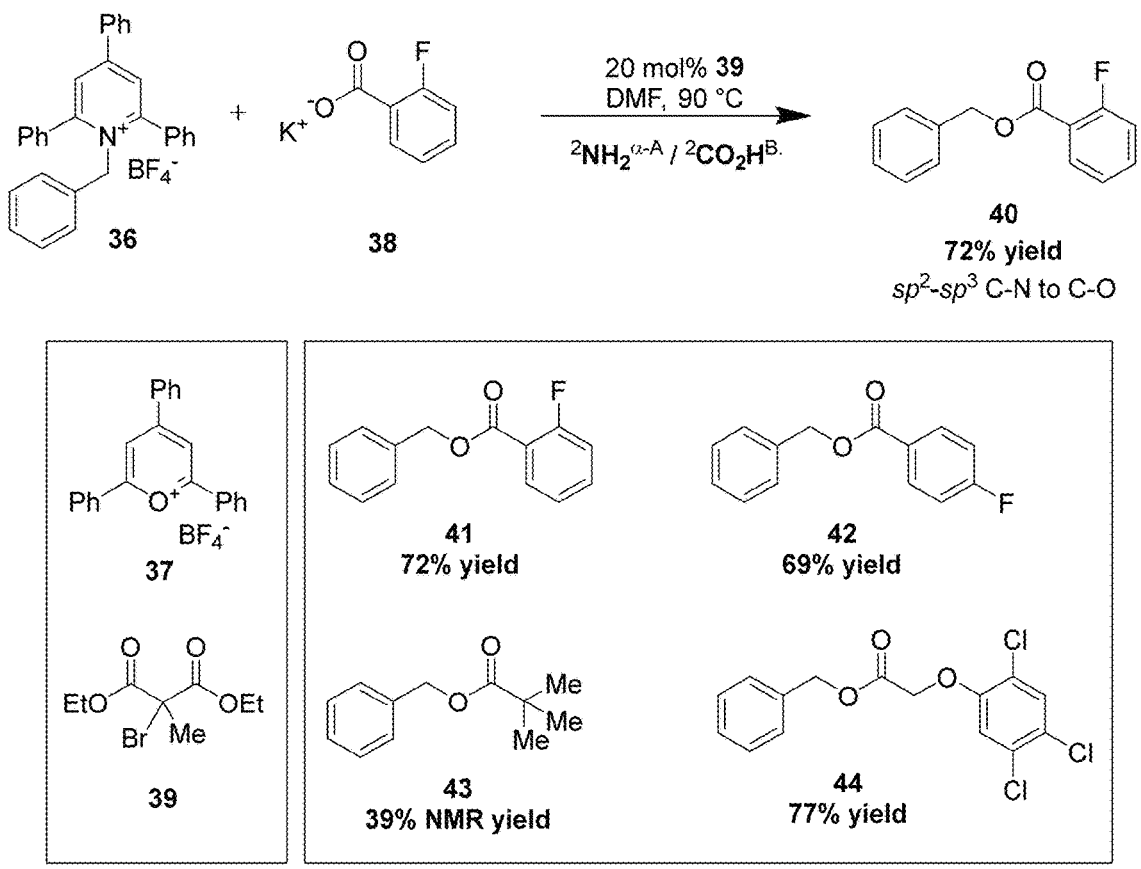

FIG. 6 depicts a $sp^3$-$sp^2$ deaminative esterification of the disclosure.

Figure 7:
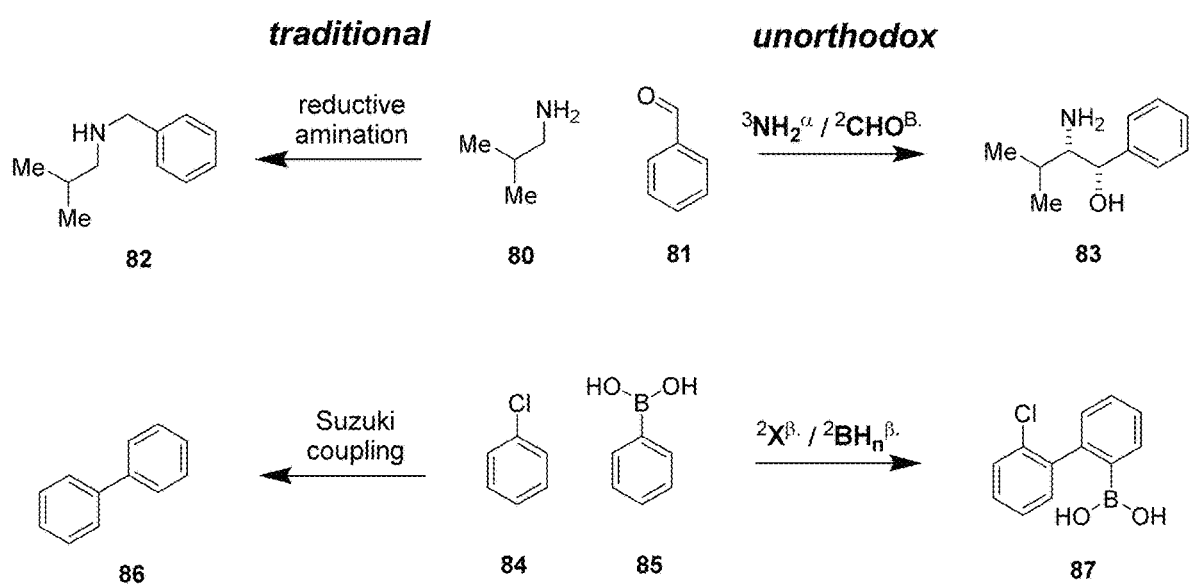

FIG. 7 depicts examples of unorthodox transformations between pairs of reactants having amine-aldehyde complementary functional groups and halide—boronic acid complementary functional groups to arrive at products with different properties than those derived from traditional transformations, such as reductive amination or Suzuki coupling.

Figure 8:
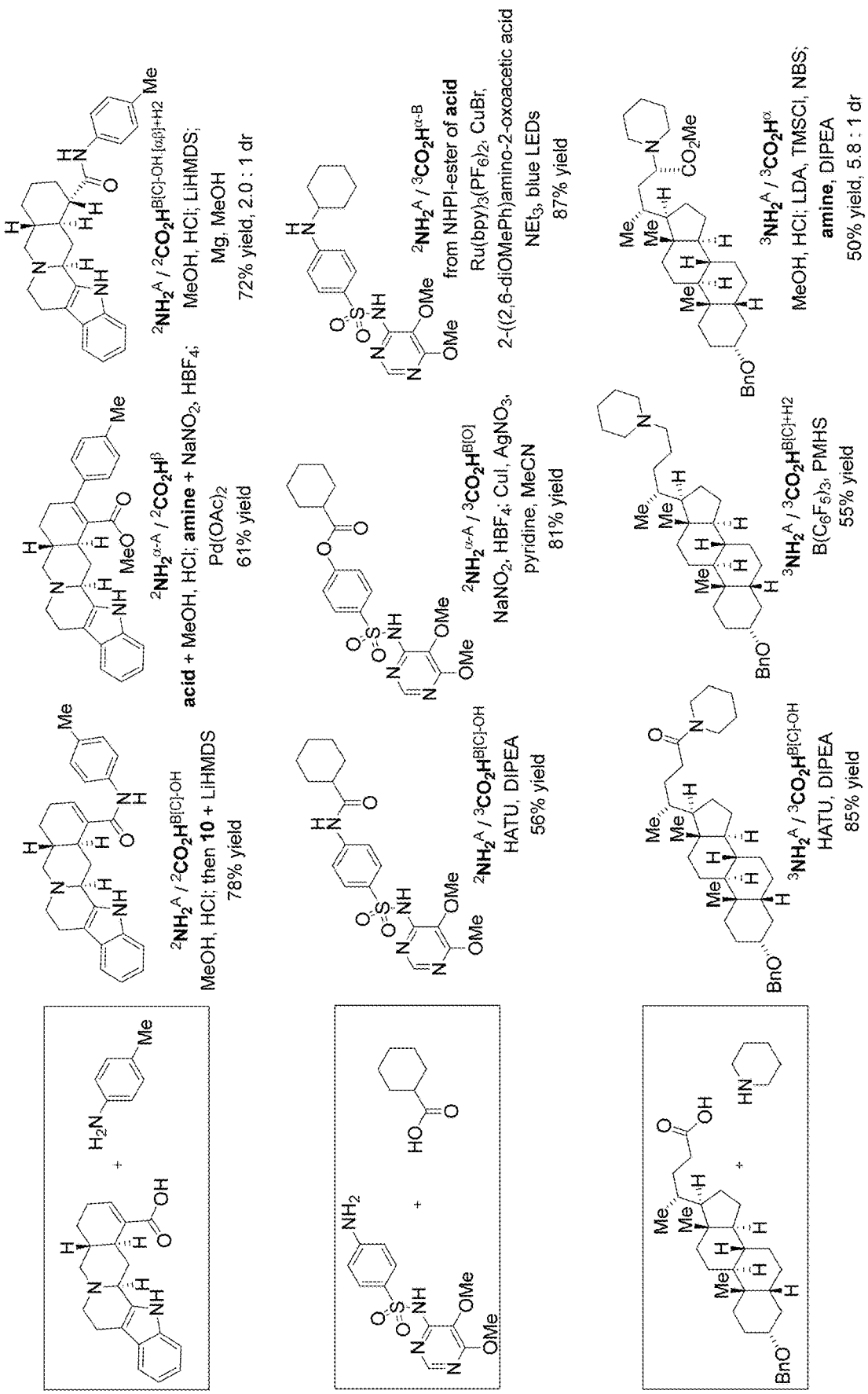

FIG. 8 depicts examples unorthodox transformation for late-stage diversification of complex molecules.

Figure 9:
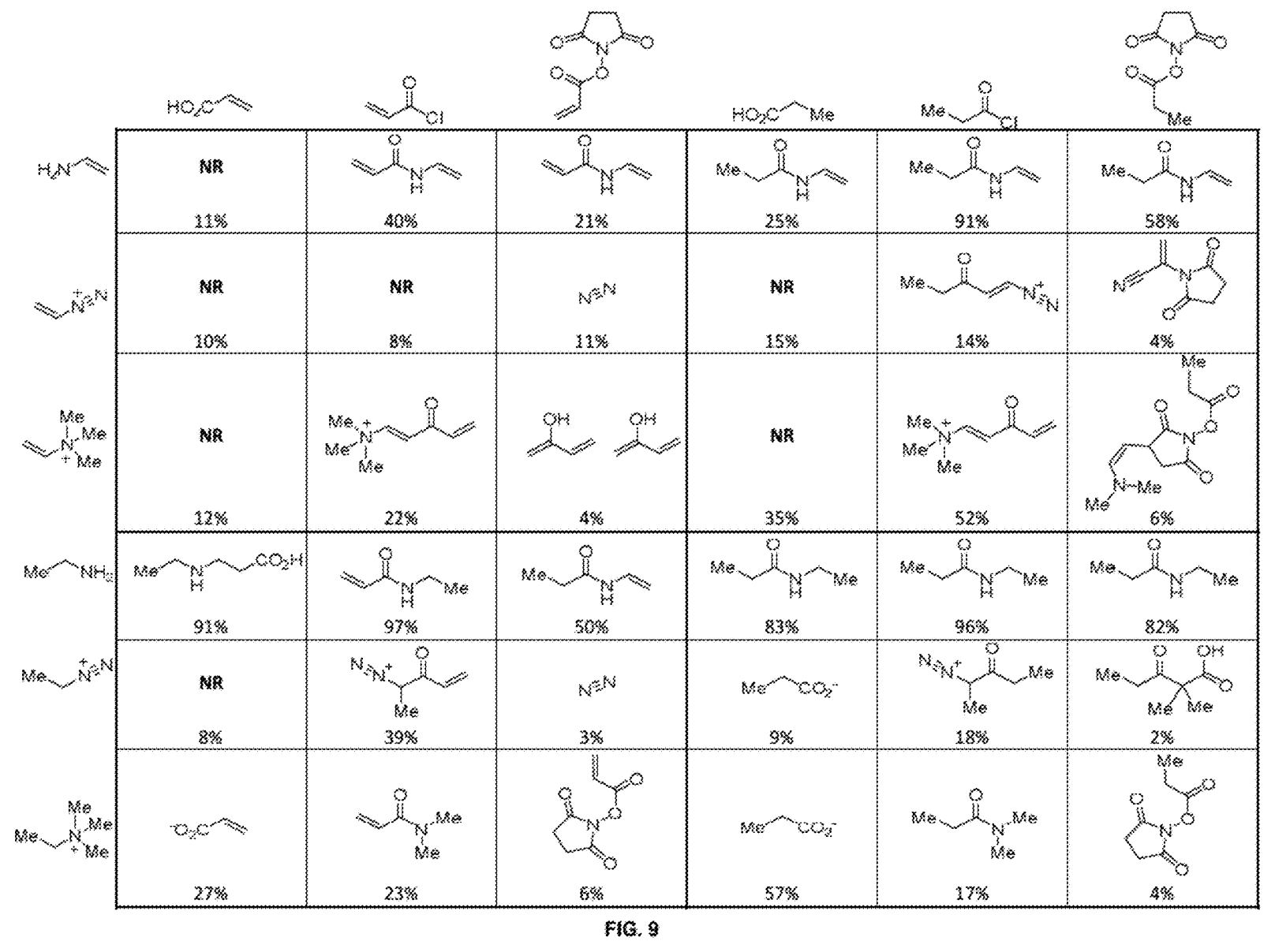

FIG. 9 depicts predicted reactions using amines, and their derivatives, and acids, and their derivatives as inputs in IBM's reaction predictor (https://rxn.res.ibm.com/, accessed Mar. 4, 2019). The number is the model's confidence in the transformation shown, which is the top-scoring hit for each search criteria.

FIG. 10 depicts A) an adjacency matrix representation of a transformation; B) Generation of a 3-atom adjacency matrix, with the molecule it represents at each stage of its construction displayed; C) Selected examples of transformation matrices and the products obtained by adding them to the starting material adjacency matrices. The color depicts the bond order between the atoms listed at the noted matrix position.

Figure 11:
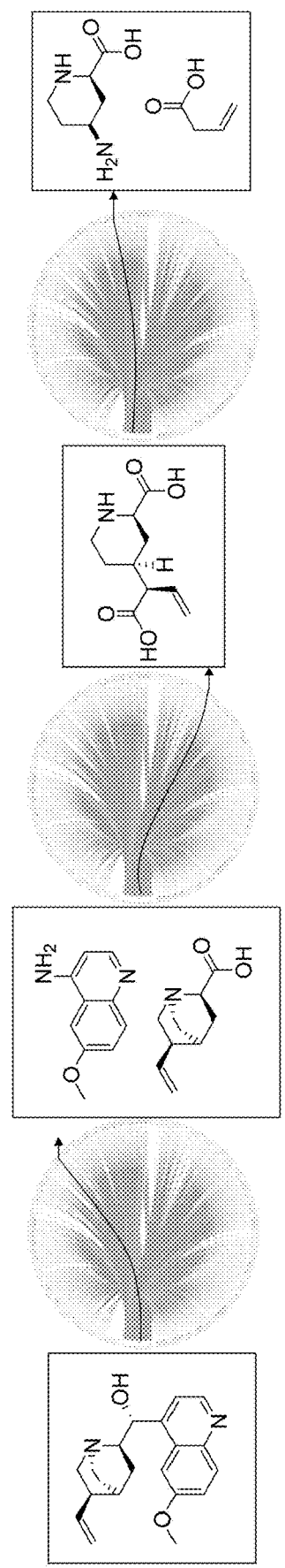

FIG. 11 depicts a series of transformations according to the disclosure, run in series to achieve a retrosynthesis route to disconnect a complex molecule into simpler starting materials.

Figure 12:
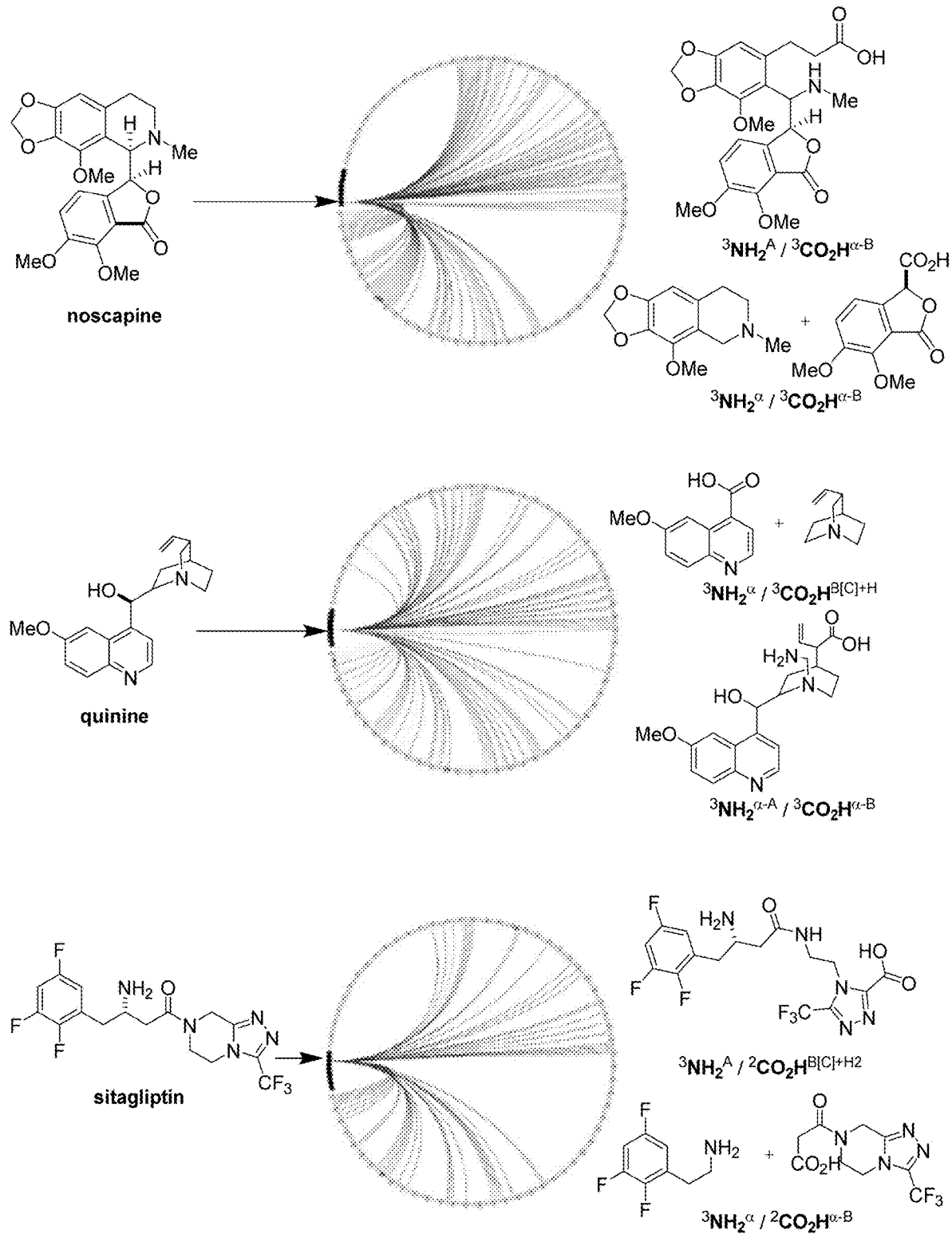

FIG. 12 depicts the use of predicted reactions in the disconnection of complex molecules, such as noscapine, quinine, or sitagliptin. Such unorthodox transformations are useful for designing a retrosynthetic strategy to the total synthesis of complex molecules.

Figure 13:
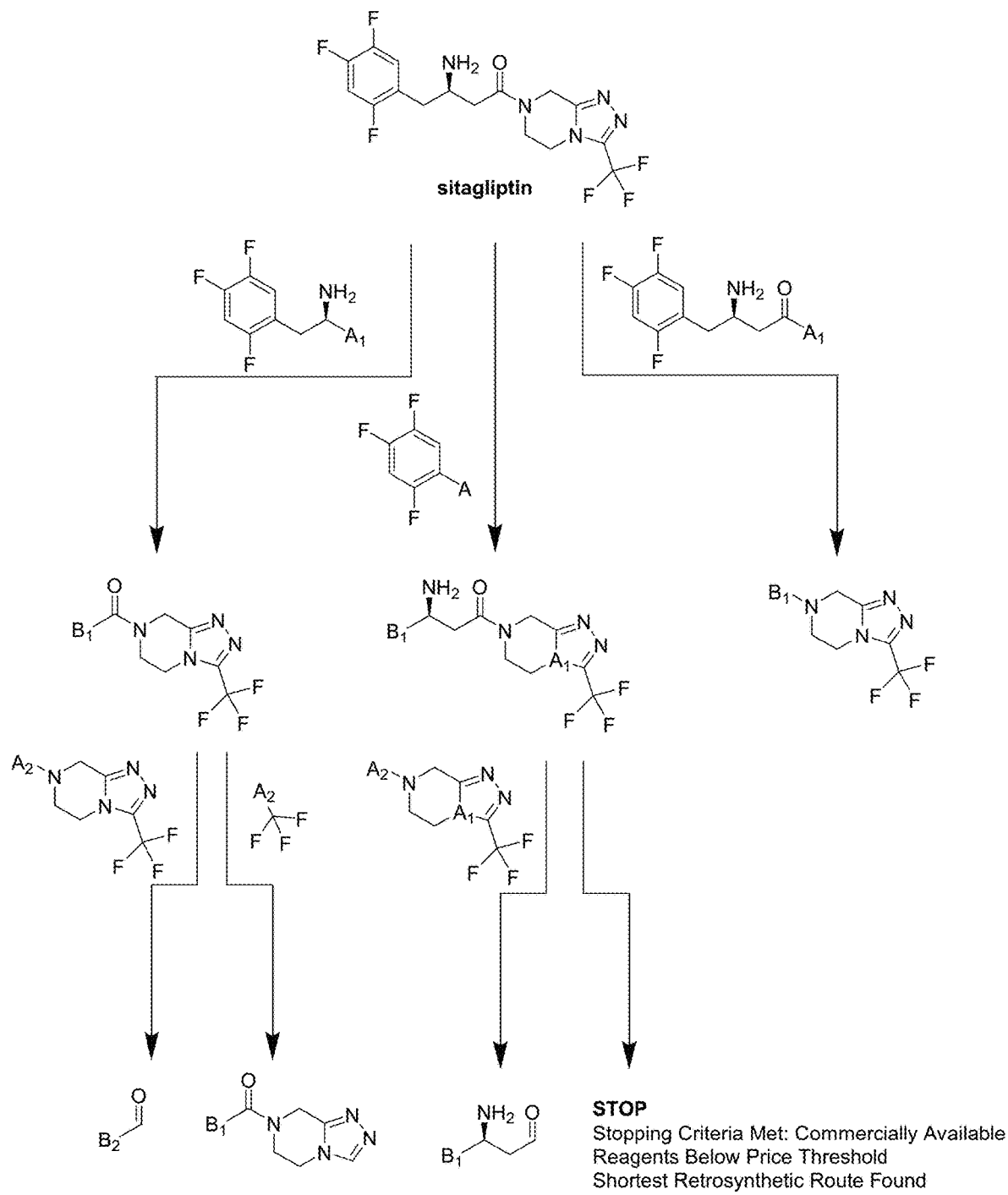

FIG. 13 depicts a retrosynthetic tree of sitagliptin that can be generated via the retrosynthetic method disclosed herein (e.g., reverse enumeration). Intermediates generated by the reverse enumeration algorithm are confirmed against an existing catalog of commercially available reagents. When performed in a breadth first search, the first intermediates produced that adhere to the specified stopping criteria result in the shortest possible retrosynthetic route to the given target.

DETAILED DESCRIPTION

Disclosed herein are methods of building libraries of chemical compounds using a specific pair of reactants having complementary functional groups, and varying the chemical transformations that can be performed with the complementary functional groups, to generate the compounds in the libraries. The molecular products that can be produced from the methods described herein can have diverse properties. These properties can be optimized towards desired functional profiles for, e.g., pharmaceuticals, agrochemicals, and fragrances. The methods disclosed herein are different from traditional methods of building combinatorial libraries of chemical compounds, which involve varying the reactants and/or functional groups themselves to produce the products of the library. In the methods disclosed herein, the reactants are kept constant and the chemical transformations that the reactants undergo are varied, which allows the molecular properties of the compounds to be modulated to produce libraries of compounds having more diverse properties. Sequences of chemical transformations may be used to protect or activate the reagents.

Advantageously, the methods described herein allow not only the modulation of chemical properties of molecules, but they uncover unorthodox transformations of common functional groups, such as reacting an amine and carboxylic acid in a decarboxylative cross-coupling reaction, rather than to simply form the traditional amide bond. Thus, for a particular pair of reactants having complementary functional groups, hundreds of unknown, yet plausible, chemical transformations can be achieved. In some instances, multiple bonds may be broken to form bond-fragmentation or bond-rearrangement products. Increasing the amount of bond-reordering in the enumeration step leads to a larger library of products. Depending on the degree of bond-reordering that is incorporated in the enumeration step, thousands of unique and unknown, yet plausible, chemical transformations can be achieved. Further, the products enumerated from a particular pair of reactants having complementary functional groups can have a wide range of property diversity. For example, mapping the bond arrangements, such as all of the bond arrangements, that can occur between an amine and a carboxylic acid results in a library of products ranging from highly polar to highly lipophilic, and which bear a variety of formal charges. Thus, the methods described herein allow atom-level modulation of chemical structures simply by switching catalysts or reaction conditions. These methods have far-reaching implications in providing new functional molecules in which product performance is directly linked to chemical structure. Additionally, the unorthodox chemical transformations that are uncovered via the methods disclosed herein could be applied to the late-stage diversification of industrial products, such as pharmaceuticals, and as demonstrated in Examples 4-6 and FIG. 8, to impart a desired change of properties on a complex molecule by using the functional groups that are already present on the complex molecule. This process also serves to highlight gaps in the synthetic chemistry toolbox as targets for reaction method development.

General Methods

Disclosed herein is a method of synthesizing a compound with desired properties comprising: (a) selecting one or more pairs of reactants comprising complementary functional groups; (b) mapping possible bond arrangements, such as all possible bond arrangements, between the complementary functional groups of each pair of reactants to provide a library of possible products; (c) analyzing one or more properties of each possible product to select one or more products with desired properties (desired products); and (d) synthesizing the one or more desired products.

The method disclosed herein includes selecting one or more pairs of reactants comprising complementary functional groups. A reactant is a molecule that undergoes a change during a chemical reaction. A functional group is a group of atoms within a molecule that has distinctive chemical properties, and that will undergo the same or similar chemical reactions regardless of the molecule (e.g., reactant) to which it is attached. Examples of functional groups include, but are not limited to, alkanes, alkenes, alkynes, allenes, organohalides, ketones, aldehydes, carboxylic acids and derivatives thereof, ethers, nitriles, amines, alcohols, thiols, and activated forms of the foregoing. As used herein, derivatives of carboxylic acids include carbonyl compounds that can undergo a nucelophilic acyl substitution reaction. Examples of carboxylic acid derivatives include, but are not limited to, acyl halides, anhydrides, amides, esters, thioesters, and acyl phosphates.

As used herein, an "activated" functional group refers to a functional group that has been derivatized to increase its reactivity. For example, an "activated" amine can include a diazonium salt, a trialkylammonium salt, an isocyanidyl group, and a pyridinium salt. An "activated" carboxylic acid or derivative thereof can include a salt of a carboxylic acid or derivative, such as the potassium salt. Unless otherwise indicated, the terms "amine" and "carboxylic acid" include both free and activated forms thereof.

As used herein, the term "alkyl" refers to straight chained and branched saturated hydrocarbon groups containing one to twenty carbon atoms, for example, one to twenty carbon atoms, or one to ten carbon atoms, or one to six carbon atoms. The term $C_n$ means the alkyl group has "n" carbon atoms. For example, $C_4$ alkyl refers to an alkyl group that has 4 carbon atoms. $C_{1-7}$ alkyl and $C_1$-$C_7$ alkyl refer to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Nonlimiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group.

As used herein, the term "cycloalkyl" refers to an aliphatic cyclic hydrocarbon group containing three to eight carbon atoms (e.g., 3, 4, 5, 6, 7, or 8 carbon atoms). The term $C_n$ means the cycloalkyl group has "n" carbon atoms. For example, $C_5$ cycloalkyl refers to a cycloalkyl group that has 5 carbon atoms in the ring. $C_{5-8}$ cycloalkyl and $C_5$-$C_8$ cycloalkyl refer to cycloalkyl groups having a number of carbon atoms encompassing the entire range (i.e., 5 to 8 carbon atoms), as well as all subgroups (e.g., 5-6, 6-8, 7-8, 5-7, 5, 6, 7, and 8 carbon atoms). Nonlimiting examples of cycloalkyl groups include cyclopropyl, cyclobutyl, cyclopentyl, cyclohexyl, cycloheptyl, and cyclooctyl. Unless otherwise indicated, a cycloalkyl group can be an unsubstituted cycloalkyl group or a substituted cycloalkyl group. The cycloalkyl groups described herein can be isolated or fused to another cycloalkyl group, a heterocycloalkyl group, an aryl group and/or a heteroaryl group.

As used herein, the term "heterocycloalkyl" is defined similarly as cycloalkyl, except the ring contains one to three heteroatoms independently selected from oxygen, nitrogen, and sulfur. In particular, the term "heterocycloalkyl" refers to a ring containing a total of three to eight atoms, of which 1, 2, 3 or three of those atoms are heteroatoms independently selected from the group consisting of oxygen, nitrogen, and sulfur, and the remaining atoms in the ring are carbon atoms. Nonlimiting examples of heterocycloalkyl groups include piperdine, tetrahydrofuran, tetrahydropyran, dihydrofuran, morpholine, and the like. Heterocycloalkyl groups can be saturated or partially unsaturated ring systems optionally substituted with, for example, one to three groups, independently selected alkyl, alkenyl, OH, $C(O)NH_2$, $NH_2$, oxo (=O), aryl, haloalkyl, halo, and OH. Heterocycloalkyl groups optionally can be further N-substituted with alkyl, hydroxyalkyl, alkylene-aryl, and alkylene-heteroaryl. The heterocycloalkyl groups described herein can be isolated or fused to another heterocycloalkyl group, a cycloalkyl group, an aryl group, and/or a heteroaryl group. When a heterocycloalkyl group is fused to another heterocycloalkyl group, then each of the heterocycloalkyl groups can contain three to eight total ring atoms, and one to three heteroatoms. In some embodiments, the heterocycloalkyl groups described herein comprise one oxygen ring atom (e.g., oxiranyl, oxetanyl, tetrahydrofuranyl, and tetrahydropyranyl).

As used herein, the term "aryl" refers to monocyclic or polycyclic (e.g., fused bicyclic and fused tricyclic) carbocyclic aromatic ring systems. Examples of aryl groups include, but are not limited to, phenyl, naphthyl, tetrahydronaphthyl, phenanthrenyl, biphenylenyl, indanyl, indenyl, anthracenyl, and fluorenyl. Unless otherwise indicated, an aryl group can be an unsubstituted aryl group or a substituted aryl group.

As used herein, the term "heteroaryl" refers to a cyclic aromatic ring having five to twelve total ring atoms (e.g., a monocyclic aromatic ring with 5-6 total ring atoms), and containing one to three heteroatoms selected from nitrogen, oxygen, and sulfur in the aromatic ring. Unless otherwise indicated, a heteroaryl group can be unsubstituted or substituted with one or more, and in particular one to four, substituents selected from, for example, halo, alkyl, alkenyl, $OCF_3$, $NO_2$, CN, NC, OH, alkoxy, amino, $CO_2H$, $CO_2$alkyl, aryl, and heteroaryl. In some cases, the heteroaryl group is substituted with one or more of alkyl and alkoxy groups. Heteroaryl groups can be isolated (e.g., pyridyl) or fused to another heteroaryl group (e.g., purinyl), a cycloalkyl group (e.g., tetrahydroquinolinyl), a heterocycloalkyl group (e.g., dihydronaphthyridinyl), and/or an aryl group (e.g., benzothiazolyl and quinolyl). Examples of heteroaryl groups include, but are not limited to, thienyl, furyl, pyridyl, pyrrolyl, oxazolyl, quinolyl, thiophenyl, isoquinolyl, indolyl, triazinyl, triazolyl, isothiazolyl, isoxazolyl, imidazolyl, benzothiazolyl, pyrazinyl, pyrimidinyl, thiazolyl, and thiadiazolyl. When a heteroaryl group is fused to another heteroaryl group, then each ring can contain five or six total ring atoms and one to three heteroatoms in its aromatic ring.

As used herein, the term "substituted," when used to modify a chemical functional group, refers to the replacement of at least one hydrogen radical on the functional group with a substituent. Substituents can include, but are not limited to, alkyl, cycloalkyl, alkenyl, cycloalkenyl, alkynyl, heterocycloalkyl, ether, polyether, thioether, polythioether, aryl, heteroaryl, hydroxyl, oxy, alkoxy, heteroalkoxy, aryloxy, heteroaryloxy, ester, thioester, carboxy, cyano, nitro, amino, amido, acetamide, and halo (e.g., fluoro, chloro, bromo, or iodo). When a chemical functional group includes more than one substituent, the substituents can be bound to the same carbon atom or to two or more different carbon atoms.

Further, unless otherwise indicated, the term "amine" includes alkyl amines, alkenyl amines, and aryl amines. Unless otherwise indicated, the term "alkyl amine" refers to an amine attached to a spa hybridized carbon atom linear alkyl group, a branched alkyl group, or a $C_{3-10}$cycloalkyl group. Unless otherwise indicated, the term "alkenyl amine" refers to an amine directly attached to a $sp^2$ hybridized carbon atom of an alkenyl group. Unless otherwise indicated, the term "aryl amine" refers to an amine directly attached to a $sp^2$ hybridized carbon atom of an aryl group.

Similarly, unless otherwise indicated, the term "carboxylic acid" refers to alkyl carboxylic acids, alkenyl carboxylic acids, and aryl carboxylic acids. Unless otherwise indicated, the term "alkyl carboxylic acid or derivative thereof" refers to a carboxylic acid or derivative thereof attached to a linear alkyl group, a branched alkyl group, or a $C_{3-10}$cycloalkyl group. Unless otherwise indicated, the term "alkenyl carboxylic acid or derivative thereof" refers to a carboxylic acid or derivative thereof directly attached to a $sp^2$ hybridized carbon atom of an alkenyl group. Unless otherwise indicated, the term "aryl carboxylic acid or derivative thereof" refers to a carboxylic acid or derivative thereof directly attached to a $sp^2$ hybridized carbon atom of an aryl group.

Complementary functional groups are two functional groups that can react with each other to form a product. Examples of complementary functional groups include, but are not limited to, an amine and carboxylic acid or derivative thereof, an alcohol and a carboxylic acid or derivative thereof, a thiol and a carboxylic acid or derivative thereof, and a primary amine and an alkyl halide. In some embodiments, the complementary functional groups are selected from the group consisting of amines, alcohols, thiols, carboxylic acids and derivatives thereof, aldehydes, ketones, organohalides, alkynes, allenes, alkenes, and activated forms of the foregoing. In various embodiments, one reactant of a reactant pair comprises a functional group selected from the group consisting of an amine, an alcohol, a thiol, an organohalide, and activated forms thereof, and the other reactant of the reactant pair comprises a functional group selected from the group consisting of a carboxylic acid or derivative thereof, an alcohol, an amine, a thiol, an organohalide, and activated forms thereof. In some cases, the complementary functional groups are selected from the group consisting of: (i) an amine and a carboxylic acid or derivative thereof, (ii) an amine and an alcohol, (iii) an amine and an organohalide, (iv) an alcohol and an organohalide, (v) an organohalide and a carboxylic acid or derivative thereof, and (vi) an alcohol and a carboxylic acid or derivative thereof. In various cases, the complementary functional groups are an amine and a carboxylic acid or derivative thereof.

In some embodiments, one reactant of the reactant pair comprises a C—H bond that is capable of functionalization. A C—H bond capable of functionalization is a C—H bond that can be cleaved and replaced with a carbon-oxygen, carbon-nitrogen, or carbon-carbon bond. Contemplated C—H functionalization reactions include, Friedel-Crafts acylations, alkylations, arylations, or other reactions in which a reactant serves as a nucleophile; as well as reactions promoted by directing groups, such as those catalyzed by palladium, iridium, copper, or other transition metal catalysts. In addition to C—H functionalization reactions wherein the predominant mechanistic step operates through the transfer of two-electrons, C—H functionalization reactions where the predominant mechanistic step operates through a single electron transfer also are contemplated, such as hydrogen-atom abstraction methods, including those initiated by photoredox, metallophotoredox, or electrochemical processes.

Figure 1:
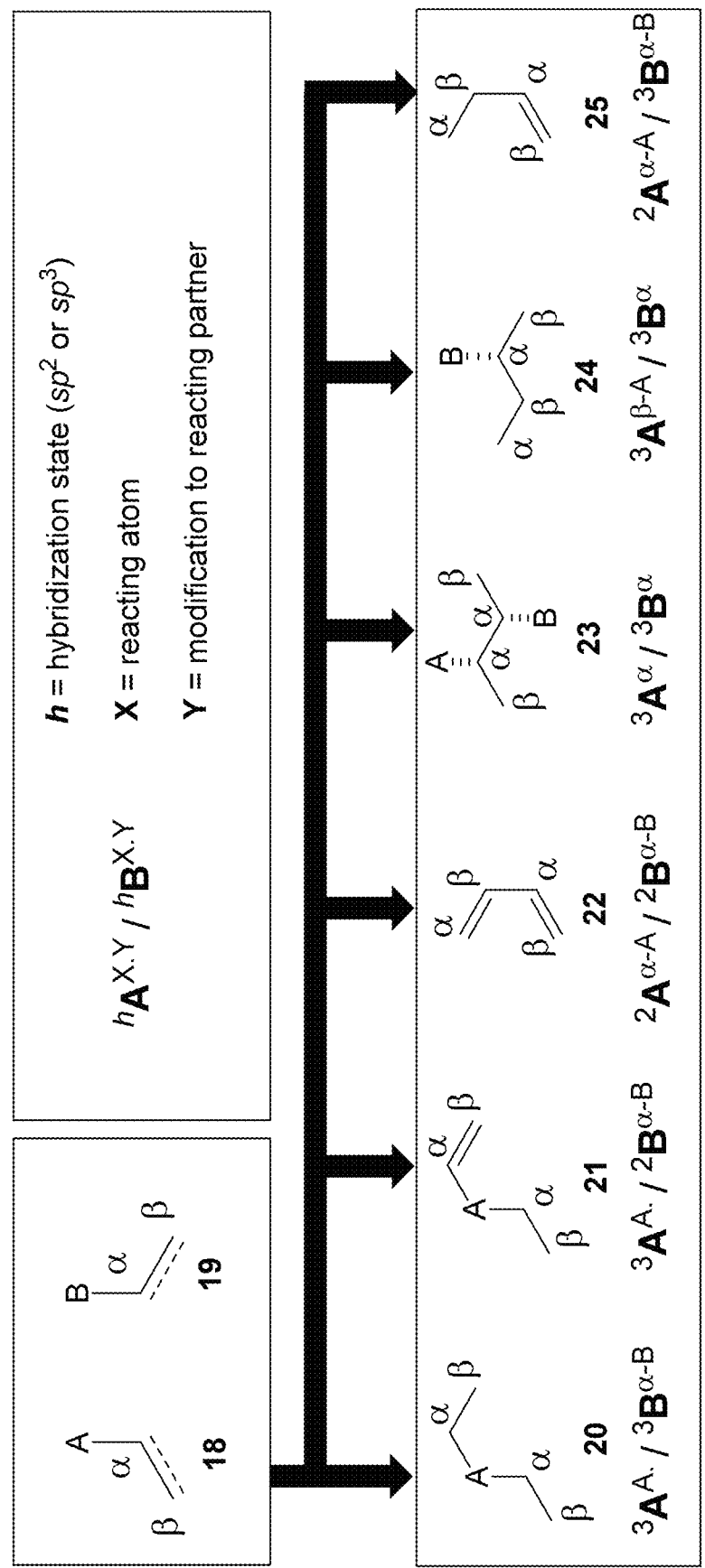
FIG. 1 depicts the mapping of some of the possible bond arrangements for general reactants 18.

The method provided herein further comprises mapping possible bond arrangements, such as all possible bond arrangements, between the complementary functional groups of each reactant pair to provide a library of possible products. The possible bond arrangements between the complementary functional groups can be mapped by, for example, drawing out each possible product between a functional group pair, including unconventional products, so long as the products satisfy the octet rule. Each possible product can result from reaction of the functional groups themselves, or the atoms α or β to the functional groups. For example, the mapping of possible bond arrangements for general reactants 18,

and 19,

wherein A and B are the complementary functional groups, can result in many different bond arrangements. FIG. 1 shows six (products 20-25) of the possible bond arrangements that can result from the combination of reactants 18 and 19. Also as shown in FIG. 1, the mapping can be tracked using systematic nomenclature $^{h}A^{X\cdot Y}/^{h}B^{X\cdot Y}$, where h is the hybridization state of the functional group A or B (e.g., $sp^2$ or $sp^3$), X is the reacting atom (e.g., the functional group itself, the atom α to the functional group, or the atom β to the functional group), and Y is the modification that occurs to the functional group as a result of a particular bond arrangement. For example, when the functional group is present in the product, then Y is designated as A. or B, and when the functional group is absent from the product, Y is designated as −A or −B.

In embodiments, the possible bond arrangements between the complementary functional groups can be mapped by, for example, an adjacency matrix (see Henze, H. R.; Blair, C. M. *J. Am. Chem. Soc.* 1931, 53, 3042; Ugi, I. et al. New elements in the representation of the logical structure of chemistry by qualitative mathematical models and corresponding data structures. In *Computer Chemistry* (ed. Ugi, I.) 199-233 (*Springer*, 1993). As used herein, the term "adjacency matrix" refers to a matrix for mapping possible bond arrangements and/or reactions between two complementary reactants. In an adjacency matrix representation of a reactant, each entry reflects the bond order between two atoms.

Figure 10A:
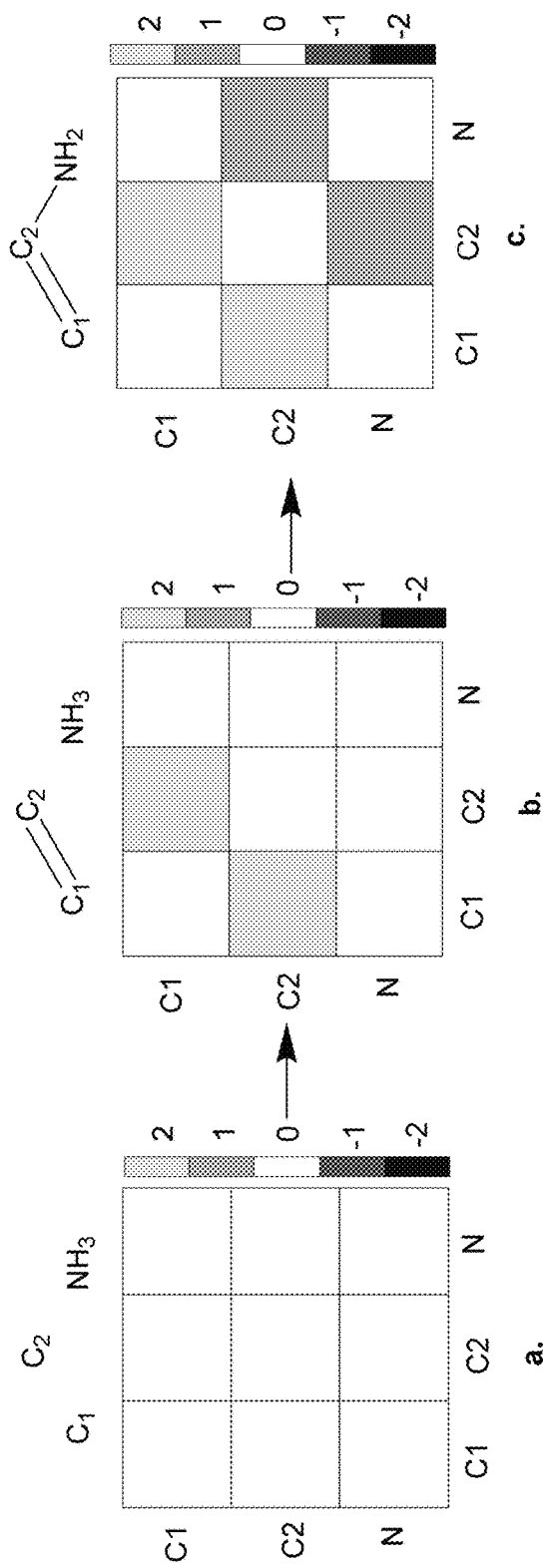
Figure 10B:
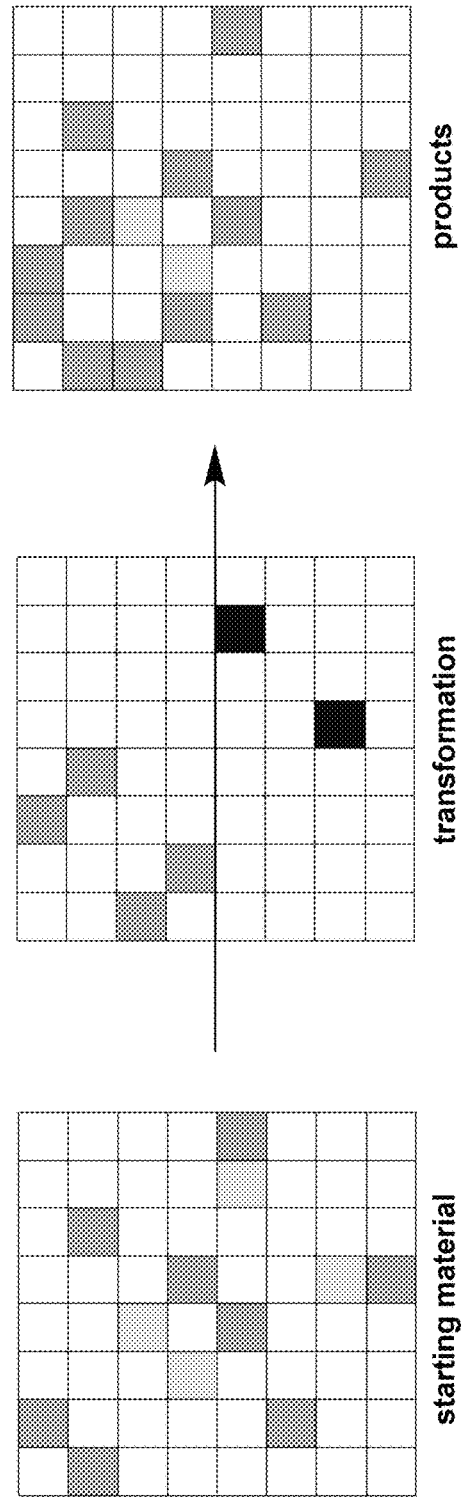
Figure 10C:
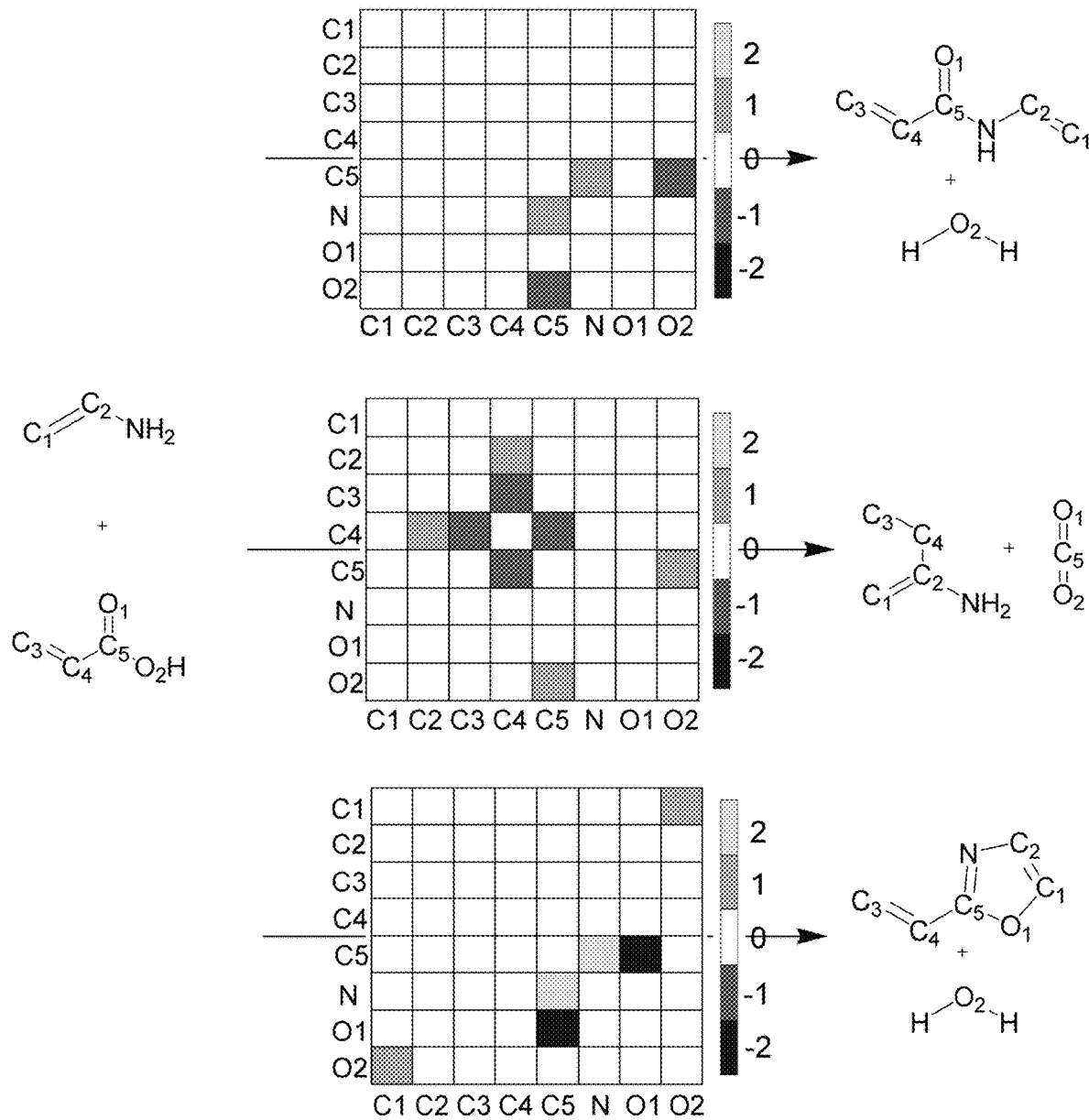

For example, FIG. 10B demonstrates the construction of ethenamine,

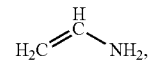

using an adjacency matrix. The process for developing an adjacency matrix starts with a matrix of all zeros, which is filled in by examining the bond orders between all combinations of two atoms in the molecule. $C^1$ and $C^2$ are connected with a double bond, so the number 2 (bond order of 2 is represented by a yellow color) is inserted where the row $C^1$ intersects column $C^2$, and where row $C^2$ intersects column $C^1$. The same process is repeated for the single bond between $C^2$ and N, in which the number 1 is inserted at the intersection of the corresponding row and column (bond order of 1 is represented by a green color). There exists no bond between $C^1$ and N; hence, the corresponding entries are left as the number 0 (bond order of 0 is represented by a white color). In an adjacency matrix representation of a transformation, the matrix entries reflect the change in bond order between all atom pairs. Addition of the adjacency matrix representing a transformation to that of a reactant can result in the described product(s). FIG. 10A, FIG. 10B, and FIG. 10C show the application of an adjacency matrix in the transformation of acrylic acid and ethenamine to three different products. In the top transformation matrix, the entry corresponding to N and $C^5$ is equal to 1, indicating that the N—$C_5$ bond order is increased by 1 during the transformation. Similarly, the entry corresponding to $O^2$ and $C^5$ is equal to −1, indicating a reduction of 1 in the bond order between $O^2$ and $C^5$. The result of this transformation, interpreted chemically, represents the formation of an amide between acrylic acid and ethenamine, with the loss of an O atom from acrylic acid in the form of water. Adjacency matrices are advantageous in representing reactions, as they can clearly and succinctly represent all changes in bond orders in the reactant(s), while also being computer-readable. Complex reactions involving many changes in connectivity can be represented using this method. For example, the middle matrix in FIG. 10C simultaneously encodes the bonding of $C^2$ to $C^4$, loss of O=$C_5$=O as carbon dioxide, and reduction of the $C^3$-$C^4$ bond from a bond order of 2, to a bond order of 1, while the bottom matrix in FIG. 10C encodes a complex cyclization reaction of acrylic acid and ethenamine.

In some embodiments, the method further comprises enumerating possible oxidation states of each possible product, such as all of the possible oxidation states of each possible product in the library of possible products to form a library of auxiliary products. As used herein, "oxidation state" refers to the degree of oxidation (loss of electrons) of an atom in a chemical compounds. The oxidation state may be positive (loss of electrons compared to neutral form), negative (gain of electrons compared to neutral form), or zero (no change in electrons compared to neutral form). When the oxidation number is positive, an oxidation product results. When the oxidation number is negative, a reduction product results. An oxidation product refers to an auxiliary product having a functional group with fewer electrons or a greater oxidation state than the functional group of the product. A reduction product refers to the auxiliary product having a functional group with more electrons or a lower oxidation state than the function group of the product. The various oxidation states of each possible product that can be enumerated are oxidation states that observe the octet rule, such as those that are commonly known for a particular functional group. For example, when the possible product is an alcohol, the series of oxidation states that can be enumerated include, the alcohol, the corresponding aldehyde, and the corresponding carboxylic acid. In embodiments, the oxidation and reduction products can be enumerated from the library of possible products. The oxidation and reduction products that can be enumerated from the library of possible products to form the library of auxiliary products are any oxidation and reduction products that are commonly known for a particular functional group. For example, when a carboxylic acid functional group is present in a product, various reduction products can be enumerated, such as the corresponding carbonyl, alcohol, and alkane congeners. When an alcohol is present in a product, various oxidation and reduction products can be enumerated, such as an aldehyde, carboxylic acid, and alkane. When an aldehyde is present in a reaction product, both oxidation and reduction products can be enumerated, such as a carboxylic acid, an alcohol, and an alkane.

In various embodiments, possible stereoisomers, such as all possible stereoisomers, of each product in the library of possible products and library of auxiliary products are enumerated to form a library of stereoisomers. A stereoisomer refers to each of two or more compounds differing only in the spatial arrangement of atoms. For example, for compound 23 in FIG. 1:

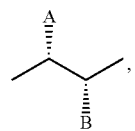

the following additional stereoisomers can be enumerated:

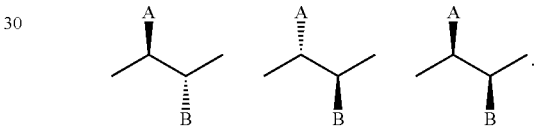

As another example, for compound 24 in FIG. 1:

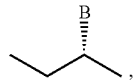

the following additional stereoisomer can be enumerated:

In the methods disclosed herein, one or more properties of each possible product in the library of products, library of auxiliary products, and/or library of stereoisomers (collectively referred to as "library") are analyzed to select one or more products from the library that has desired properties (desired products). The one or more properties can be any property (e.g., physical, chemical, and/or biological) desired by one of skill in the art. In some embodiments, the one or more properties includes a physical property. In various embodiments, the one or more properties includes a chemical property. In some cases, the one or more properties includes a biological property. Examples of the one or more properties that are analyzed include, but are not limited to, molecular weight, molecular volume, molecular shape, polarity, melting point, boiling point, density, stability, solubility, lipophilicity, acidity, basicity, degree of ionization, oxidation state, toxicity, activity at a target, quantitative estimate of drug-likeness (QED) (see Bickerton et al, Nature Chem. 4, 90-98 (2012)), solubility forecasting index (SFI) (see Hill and Young, Drug Discov. Today. 15, 15-16 (2010)), or central nervous system multiparameter optimization desirability (CNS-MPO) (see Wager et al, ACS Chem. Neuro. 7, 767-775 (2016)). The one or more properties selected by one skilled in the art can be dependent on the ultimate use of the desired product (e.g., agrochemical, material, medicine, flavor, fragrance, textile, natural product, dye, or biological probe). For example, if the ultimate use of the product is as a pharmaceutical, then the one or more properties can include, for example, QED, as described (along with other examples of biological properties) in Bickerton et al., Nature Chemistry, Vol. 4, 2012, 90-98. In various embodiments, the one or more properties is selected from the group consisting of include partition coefficient (LOG P), molecular weight (MW), rotatable bonds (ROTB), polar surface area (PSA), aromaticity (AROM), formal charge (FC), 3D shape as determined by principal moment of inertia (PMI), number of structural alerts (ALERTS), fraction of $sp^3$ carbons (FSP3), number of hydrogen bond donors (HBD), number of hydrogen bond acceptors (HBA), quantitative estimate of drug-likeliness (QED), and combinations thereof. In some cases, the one or more properties is selected from the group consisting of LOG P, MW, ROTB, HBD, HBA, FSP3, FC, and AROM. In various cases, the one or more properties is selected from the group consisting of LOG P, MW, HBD, and HBA.

The chemoinformatic process of choosing viable molecules for synthesis can include three steps: enumeration, characterization, and analysis. In some embodiments, RDKit, a Python package, can be used to perform this process.

First, RDKit can be used to create the enumerated set of coupled molecules from the two starting materials. Each possible variation of the coupling can be encoded using SMARTS and instantiated in RDKit via the ReactionFromSmarts method. All of the reactions derived from the same two class of starting materials (such as the reaction between a $sp^3$ hybridized acid and a $sp^3$ hybridized amine) are grouped together in an array. Once starting materials are chosen, a "for loop" can be used to iterate through each reaction and virtually react the starting materials. The final product of each reaction can be stored in an array for later analysis.

Second, each molecule in the product array can be characterized. The analysis of the properties of each possible product can be used to select one or more products for synthesis. This analysis can be performed through, e.g., various cheminformatic methods. These methods can involve characterizing (or fingerprinting) each product by various physical properties such as those described herein. Molecular characterization can also be performed considering the physical structure of the molecules with methods such as Morgan Fingerprinting or Extended Connectivity Fingerprinting. Other characterization methods can include biological assays, protein docking, or computational modeling.

RDKit and Pipeline Pilot (a standalone cheminformatics software) can be used to calculate the majority of these physical properties. Once the enumeration process is complete, the final set of molecules can be exported, e.g., as a CSV of SMILES. Products can be ionized at a pH of 7.4. After this process is complete, each molecule in the list of ionized product SMILES can again be instantiated. The list of ionized products can be iterated through and the relevant physical properties can be calculated for each molecule via various RDKit packages such as the rdMolDescriptors package. The set of calculated properties for each molecule can be stored in an array and saved for later analysis. RDKit can also be used to find if molecules can be made using a certain reaction via substructure matching.

Third, once the desired characterization data of each molecule is received, various graphical and statistical methods can be used for analysis and to compare and contrast the potential products against each other or against existing molecules in order to choose the final product(s) for synthesis. These methods can include simple graphical methods such as box plots and ridge plots, or more complex methods based on machine learning, regression, and dimensionality reduction such as principal component analysis, self-organizing maps, t-distributed stochastic neighboring, etc. Dimensionality of each molecule can be compared by creating a primary moment of inertia plot, which is calculable via RDKit.

The majority of these graphical and statistical methods can be achieved using various Python packages. In some embodiments, other chemoinformatics platforms such as Dassault Systemes' Pipeline Pilot package can be used. The array of calculated molecular properties can be imported into python via CSV or JSON and packages such as numpy and pyplot are used to store and filter data in data structures. These data structures can be used to create graphs using matplotlib and pyplot. The various mathematical operations provided by numpy allow the dimensionality reduction and principal component analysis to be performed, which is then graphed via matplotlib. The Seaborn python package can be used to create ridge plots and the sompy package can be used to create self-organizing maps from a dataset. Finally, once various analytical methods are considered, a desired reaction can be chosen and performed.

Thus, the method disclosed herein further comprises synthesizing the one or more desired products. In some embodiments, the synthesis of the desired products can be done by any method or methods known to one skilled in the art. In various embodiments, the desired products can be synthesized using traditional methodologies. In some cases, the desired products can be synthesized using high-throughput experimentation (HTE) approaches. In HTE approaches, chemical reactions are studied in parallel arrays, in glass microvials or plastic wellplates, to generate large amounts of data towards diverse optimization objectives. Miniaturized HTE approaches can be used to minimize the amount of reagents needed to optimize chemical reactions. The synthetic method used to synthesize one or more products in the library is dependent on the product itself. Standard organic synthesis techniques for reaction execution may be used, including those methods for performing reactions in the absence of air, light, or water, or alternately in the presence of air, light, or water. In a typical experiment, reagents and catalysts are mixed in a solvent, and aged, with or without agitation, for a specific time at a specific temperature. The crude reaction mixtures may be used for further assays (e.g. biochemical) as is, or they may be quenched by the addition of quenching reagents such as aqueous ammonium chloride. The resulting organic extracts may be purified by recrystallization, distillation or chromatographic methods. Continuous flow processes may also be used for any or all of the reaction execution, reaction analysis, reaction quenching, and reaction purification steps.

Figure 4B:
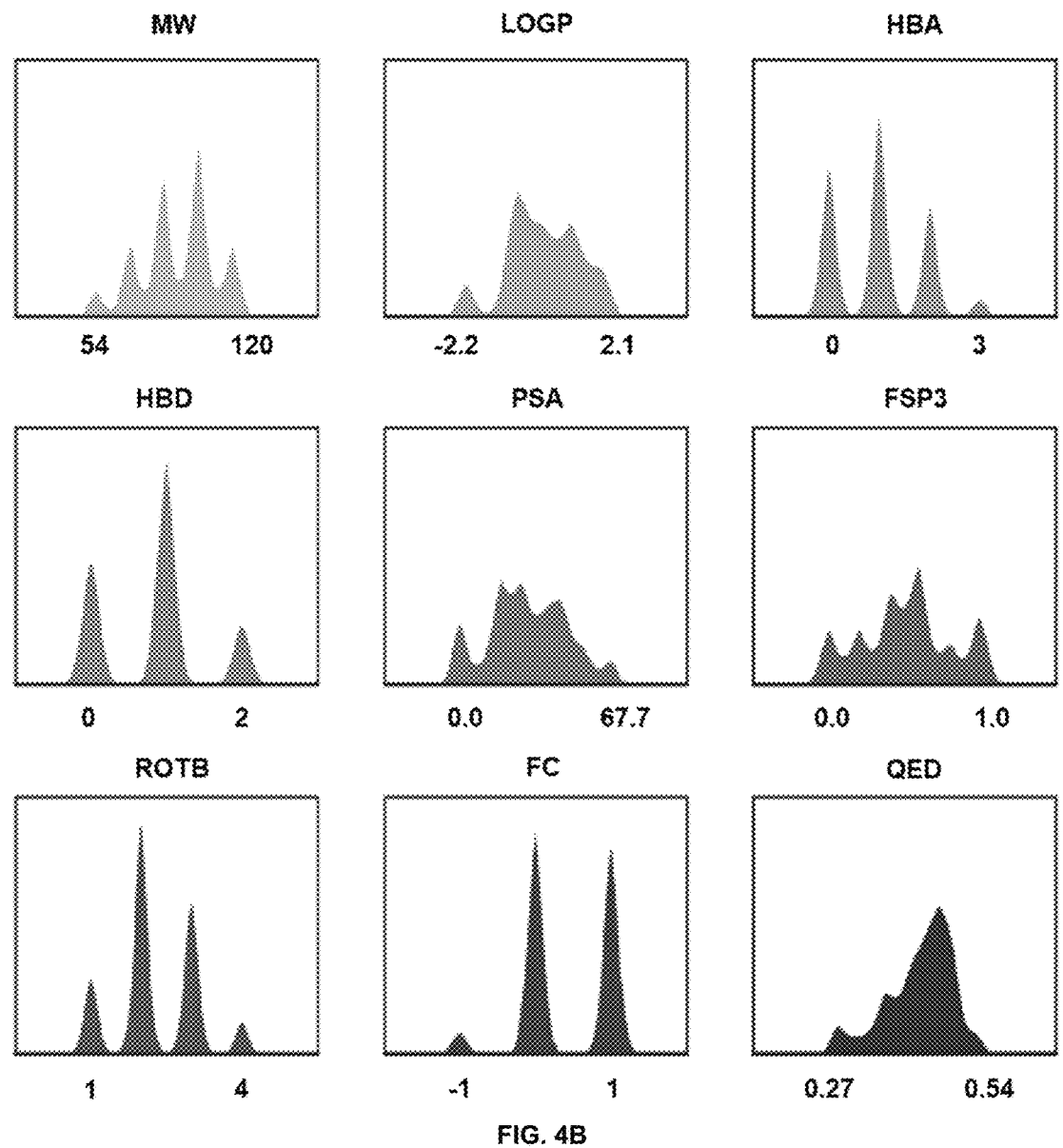

The methods described herein can advantageously be applied to synthesizing or transforming complex molecules to form products with desired properties. For example, the simple reactant pairs of ethyl amine/propanoic acid, ethyl amine/acrylic acid, ethenamine/propanoic acid, and ethenamine/acrylic acid can result in 320 different bond arrangements. Depending on how many oxidation states of products are included in the enumeration, the actual number of products can be more than 320, or less than 320. Each of the 320 enumerated bond arrangements comprise a characteristic substructure. When the 320 substructures are searched in the DrugBank database, for example, 9726 complex molecules containing the substructures result. FIG. 4A shows a chart wherein each line represents the successful identification of an enumerated product substructure within a drug, with the line's color depicting its frequency of occurrence in that molecule. Thus, there is a high degree of connectivity between the products of nearly every amine-acid cross-coupling reaction with diverse pharmaceuticals and natural products. Without being bound by any particular theory, this high degree of connectivity suggests that each new transformation that can be developed between an amine and a carboxylic acid can potentially be useful in the synthesis of complex molecules having desired properties. For example, FIG. 4B shows the distribution of predicted chemoinformatic properties for all of the enumerated transformations of the amines and acids. FIG. 4C shows a visualization of 9729 complex molecules from the DrugBank database connected to substructures of 320 different bond arrangements that were enumerated from reactants comprising an ethyl amine or ethenamine and propanoic acid or acrylic acid. The dots around the periphery denote which specific transformations appear in complex molecules (+)-noscapine (green dots), (−)-quinine (purple dots) and (−)-sitagliptin (blue dots), which connect to 112, 96, and 55 transformations.

Retrosynthetic Methods

Further disclosed herein are novel retrosynthetic methods that involve the reduction of a complex molecule into simple starting materials. The methods disclosed herein improve upon traditional retrosynthetic methods, such as those reported in e.g., E. J. Corey, et al., The Logic of Chemical Synthesis, Wiley-Interscience, New York, 1995; J. B Hendrickson, *J. Am. Chem. Soc.* 1971, 93, 25, 6847-6854; J. B. Hendrickson, D. L. Grier, A. G. Toczko, *J. Am. Chem. Soc.* 1985, 107, 5228-5238; and T. Gaich, P. S. Baran, *J. Org. Chem.* 2010, 75, 14, 4657-4673). As used herein, the term "retrosynthetic" or "retrosynthesis" or "retrosynthetically" refers to deconstructing a desired product molecule into simple precursor structures, such as a pair of reactants comprising complementary functional groups.

The retrosynthetic method disclosed herein can comprise: (a) selecting a desired product; (b) retrosynthetically mapping all possible bond disconnections from the desired product; (c) analyzing each bond disconnection to provide a library of possible reactant pairs having complementary functional groups for each bond disconnection; and (d) selecting a reactant pair having complementary functional groups from each library of possible reactant pairs for the synthesis of the desired product. In embodiments, the method further includes (e) synthesizing the desired product from the selected reactant pairs having complementary functional groups. In some embodiments, each library of possible reactant pairs is a combinatorial library. In some embodiments, the reactant pair is present in a single molecule, such as in an intramolecular reaction. In embodiments, the retrosynthetic methods disclosed herein allow recognition of unconventional and/or unprecedented reaction pairs for the synthesis of a desired product, as long as both the desired product and complementary reactants observe the octet rule.

The retrosynthetic method described herein includes selecting one or more desired products. The desired product can be any desired molecule, simple or complex, suitable to one of ordinary skill in the art, such as pharmaceutical compounds, industrial chemicals, agrochemicals, etc.

The retrosynthetic method provided herein further comprises retrosynthetically mapping possible bond disconnections, such as all possible bond disconnections, from the desired product. In embodiments, the possible bond disconnections are mapped using an adjacency matrix, as previously described. In embodiments, retrosynthetically mapping possible bond disconnections, such as all possible bond disconnections, can include inputting the desired product, or its intermediates, into a computer using the SMILES or SMARTS notation. The resulting possible bond disconnections from the desired product can be mapped to known reactions between two possible reactants, and also to new (unknown) reactions between two reactants by, for example, drawing out all of the bond disconnections of the desired product, and/or, by drawing out all possible reactions to reconnect the disconnected bond. In embodiments, the unknown reactions used to achieve the retrosynthetic disconnection are conceivable. The ability of the retrosynthetic method described herein to uncover previously unknown reactions between two reactants advantageously maximizes the efficiency of a route proposal to the desired product, even though, in some embodiments, the new reactions themselves may need to be developed. As in the systematic enumeration of transformations previously described supra, the disconnection of bonds in a desired product in the retrosynthetic method disclosed herein applies a holistic consideration of possible reactions to form the desired product, many of which may have no literature precedent. For example, FIG. 11 depicts a retrosynthesis of quinine in which disconnection of the desired product results in a C—H functionalization reaction at the α-position of the amine of a quinuclidine fragment, with simultaneous reductive coupling of an aryl acid fragment.

The retrosynthetic method provided herein further comprises analyzing each bond disconnection to provide a library of possible reactant pairs having complementary functional groups for each bond disconnection. In embodiments, the analysis step comprises drawing out each possible reactant pair for each bond disconnection, including unconventional or nontraditional reactant pairs, so long as the octet rule is satisfied. For example, a desired product may be retrosynthetically disconnected into simpler fragments even if, for example, the chemical reaction required to achieve the disconnection was presently unknown. FIG. 12 depicts several examples of this concept, in which sitagliptin is disconnected to a phenethylamine fragment and a β-ketoacid fragment. In this particular example, a decarboxylative-deaminative reaction to unite the phenethylamine fragment with the β-ketoacid fragment in the forward synthetic reaction can be developed.

In some embodiments, the retrosynthetic method further comprises enumerating possible oxidation states of each reactant, such as all of the possible oxidation states of each reactant in each library of possible reactant pairs, and adding to each library of possible reactant pairs the enumerated oxidation states of each reactant in the library. The various oxidation states of each reactant that can be enumerated are oxidation states that observe the octet rule, such as those that are commonly known for a particular functional group, as described above. For example, amines may be oxidized to N-oxides, carboxylic acids may be reduced to alcohols, or C—H bonds may be oxidized to hydroxylated or carbonyl-containing fragments, as necessary, to result in the desired overall transformation or multistep synthetic route.

In some embodiments, the retrosynthetic method further comprises enumerating possible stereoisomers, such as all possible stereoisomers, of each reactant and each oxidation state thereof, and adding to each library of possible reactant pairs, the enumerated stereoisomers for each reactant and each oxidation state thereof. In some embodiments, each library of possible reactant pairs is a combinatorial library, as described above. For example, complementary anti- and syn-producing reactions can be employed to deliver a library of diastereomers.

The retrosynthetic method disclosed herein further comprises selecting a reactant pair having complementary functional groups from each library of possible reactant pairs for the synthesis of the desired product. The reactant pair is selected by holistic consideration of the impact the selected reactant pair will have on the overall step-count or operational simplicity of the multistep synthetic route, the availability of literature precedent to support the realization of the reaction between the reactant pairs, or the cost or availability of the reactant pair or precursors thereof. In some embodiments, the selection of the reactant pair is guided by the brevity and/or operational simplicity of the overall multistep synthetic route, which can be discerned by manual inspection or by the application of optimization algorithms such as a breadth-first search (see FIG. 13). As used herein, the term "breadth first search" refers to an algorithm for traversing or searching tree or graph data structures. It starts at the 'tree root' (or some arbitrary node of a graph, sometimes referred to as a 'search key'), and explores all of the neighbor nodes at the present depth prior to moving on to the nodes at the next depth level (see E. F. Moore, *Proceedings of an International Symposium on the Theory of Switching.* 1959, 285-292). In some embodiments, principles for efficient synthesis, such as convergency, redox economy and protecting group minimization, can guide the optimization of the synthetic route. See, e.g., E. J. Corey, et al., The Logic of Chemical Synthesis, Wiley-Interscience, New York, 1995; J. B Hendrickson, *J. Am. Chem. Soc.* 1971, 93, 25, 6847-6854; J. B. Hendrickson, D. L. Grier, A. G. Toczko, *J. Am. Chem. Soc.* 1985, 107, 5228-5238; T. Gaich, P. S. Baran, *J. Org. Chem.* 2010, 75, 14, 4657-4673).

In some embodiments, the reactants of the reactant pairs can comprise functional groups selected from the group consisting of amines, alcohols, thiols, carboxylic acids and derivatives thereof, aldehydes, ketones, organohalides, alkynes, allenes, alkenes, and activated forms of the foregoing. For example, one reactant of a reactant pair can comprise a functional group selected from the group consisting of an amine, an alcohol, a thiol, an organohalide, and activated forms thereof, and the other reactant of the reactant pair can comprise a functional group selected from the group consisting of a carboxylic acid or derivative thereof, an alcohol, an amine, a thiol, an organohalide, and activated forms thereof. For example, the functional groups of the one or more pairs of reactants can be selected from the group consisting of: (i) a free or an activated amine and a carboxylic acid or derivative thereof, (ii) a free or an activated amine and a free or an activated alcohol, (iii) a free or an activated amine and an organohalide, (iv) a free or an activated alcohol and an organohalide, (v) an organohalide and a carboxylic acid or derivative thereof, (vi) a free or an activated alcohol and a carboxylic acid or derivative thereof. For example, the functional groups of the reactants can be a free or activated amine and a carboxylic acid or derivative thereof.

In embodiments, the retrosynthetic method disclosed herein further comprises synthesizing the desired product. In some embodiments, the synthesizing comprises experimentally executing the forward synthesis to provide the desired product. The synthesis of the desired product can be done by any method known to one skilled in the art. In various embodiments, the desired product can be synthesized using traditional methodologies. In some cases, the desired product can be synthesized using high-throughput experimentation (HTE) approaches, as previously described. The synthetic method used to synthesize the desired product is dependent on the product itself. Standard organic synthesis techniques for reaction execution may be used, including those methods for performing reactions in the absence of air, light, or water, or alternately in the presence of air, light, or water. In a typical experiment, reagents and catalysts are mixed in a solvent, and aged, with or without agitation, for a specific time at a specific temperature. The crude reaction mixtures may be used for further assays (e.g. biochemical) as is, or they may be quenched by the addition of quenching reagents such as aqueous ammonium chloride. The resulting organic extracts may be purified by recrystallization, distillation or chromatographic methods. Continuous flow processes may also be used for any or all of the reaction execution, reaction analysis, reaction quenching, and reaction purification steps.

The retrosynthetic method described herein can advantageously be applied to synthesizing or transforming complex molecules. For example, FIG. 11 depicts a series of transformations run in series to achieve a retrosynthesis to disconnect a complex molecule (i.e., the desired product) into simpler starting materials (i.e., a pair of reactants). As another example, FIG. 12 depicts the use of the retrosynthetic methods for three different complex molecules (i.e., desired products): (+)-noscapine, (−)-quinine and (−)-sitagliptin. The complex molecules can be disconnected into simpler fragments, thus achieving the retrosynthesis of these targets. The simple fragments highlighted for each of (+)-noscapine, (−)-quinine and (−)-sitagliptin represent just two examples of disconnections from the many more found, depicted as a connecting line in the chord diagram. The proposed chemical transformations to achieve the desired retrosynthesis can be known reactions, or can be postulated reactions wherein the chemical transformation is feasible but viable reaction conditions to achieve it are currently unknown.

Amine-Carboxylic Acid Coupling System

The coupling of an amine to a carboxylic acid to form an amide bond is a robust and popular synthetic reaction used in organic synthesis. The transformation unites an amine, which is a hydrophilic basic moiety having two hydrogen bond donors (HBD), with a carboxylic acid, a hydrophilic acidic moiety with one HBD and two hydrogen bond acceptors (HBA), to form an amide having one HBD and one HBA—a neutral species that is more lipophilic than the starting reactants. The methods provided herein explore other transformations that can occur between an amine and a carboxylic acid to form a library of products having diverse chemical properties (e.g., basic, acidic, neutral, lipophilic).

Thus, disclosed herein is a method comprising: (a) selecting one or more pairs of reactants comprising complementary functional groups; (b) mapping possible bond arrangements, such as all possible bond arrangements, between the complementary functional groups of each pair to provide a library of possible products; (c) analyzing one or more properties of each possible product to select one or more products with desired properties (desired products); and (d) synthesizing the one or more desired products, wherein the complementary functional groups are an amine and a carboxylic acid or derivatives thereof, as previously described herein. Also as previously described, unless otherwise indicated, the terms "amine" and "carboxylic acid" can refer to both free and activated forms thereof.

In some embodiments, the amine is an alkyl amine, an alkenyl amine, or an aryl amine, and the carboxylic acid or derivative thereof is an alkyl carboxylic acid or derivative thereof, an alkenyl carboxylic acid of derivative thereof, or an aryl carboxylic acid or derivative thereof, each as previously described herein. In embodiments, the alkyl amine, alkenyl amine, or aryl amine can have a molecular weight (MW) in the range of 50 g/mol to 1500 g/mol, or 50 g/mol to 1200 g/mol, or 50 g/mol to 1000 g/mol, or 50 g/mol to 800 g/mol, or 50 g/mol to 700 g/mol, or 50 g/mol to 500 g/mol, or 50 g/mol to 200 g/mol, or 100 g/mol to 1000 g/mol, or 200 g/mol to 800 g/mol. In various embodiments, the aryl amine or derivative thereof is aniline or a derivative thereof. In some embodiments, the amine is a free amine (e.g., a free linear alkyl amine, a free branched alkyl amine, or a free $C_{3-10}$cycloalkyl amine). In various embodiments, the amine is an activated amine (e.g., an activated linear alkyl amine, an activated branched alkyl amine, or an activated $C_{3-10}$cycloalkyl amine), as previously described herein. The amine can be activated using common amine activation groups known to those skilled in the art, such as those found in Q. Wang, Y. Su, L. Li, H. Huang. Chem. Soc. Rev., 2016, 45, 1257. In some embodiments, the amine is activated and isolated before contacting it with the carboxylic acid or derivative thereof. In some cases, the amine is activated in situ. For example, a diazonium salt of an aniline can be formed in situ by contacting the aniline with tert-butylnitrite or sodium nitrite using appropriate reaction conditions known to one skilled in the art. Contemplated activated amines can include, for example, diazonium salts, a trimethylammonium salts, pyridinium salts, and isocyanidyl groups. In some cases, the activated amine is a diazonium salt. In various cases, the activated amine is a trimethylammonium salt. In some embodiments, the activated amine is a pyridinium salt. In various embodiments, the activated amine is a isocynidyl group. In some embodiments, an alkyl amine can be activated by reacting it with triphenylpyrylium tetrafluoroborate to form a Katritzky salt,

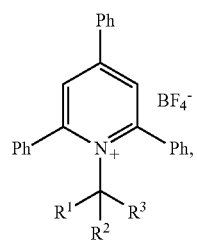

as shown in General Procedure A, wherein $R^1$, $R^2$, and $R^3$ are radicals or hydrogen.

In some embodiments, the alkyl carboxylic acid or derivative thereof, alkenyl carboxylic acid or derivative thereof, or aryl carboxylic acid or derivative thereof can have a molecular weight (MW) in the range of 50 g/mol to 1500 g/mol, or 50 g/mol to 1200 g/mol, or 50 g/mol to 1000 g/mol, or 50 g/mol to 800 g/mol, or 50 g/mol to 700 g/mol, or 50 g/mol to 500 g/mol, or 50 g/mol to 200 g/mol, or 100 g/mol to 1000 g/mol, or 200 g/mol to 800 g/mol. In various embodiments, the aryl carboxylic acid or derivative thereof comprises benzoic acid. In some embodiments, the carboxylic acid or derivative there is a free carboxylic acid or derivative thereof. In various embodiments, the carboxylic acid or derivative thereof is activated, as previously described herein. The carboxylic acid or derivative thereof can be activated using common carboxylic acid activation groups known to those skilled in the art, such as those found in E. Valeur, M. Bradley, Chem. Soc. Rev., 2009, 38, 606-631, and T. Patra, D. Amiti, Chem. Eur. J. 2017, 23, 7382-7401. In various embodiments, the carboxylic acid or derivative thereof is activated and isolated before it is contacted with the activated amine. In various cases, the carboxylic acid or derivative thereof is activated in situ. Contemplated activated carboxylic acids and derivatives thereof include, but are not limited to, carboxylic acids and derivatives thereof that have been reacted with a silver complex, hypobromite, acyl halide, benzophenone oxime, cesium, potassium salt, sodium salt, lithium salt, or hypervalent iodine carboxylate reagent.

In some embodiments, the reactant pair comprises an alkyl amine and an alkyl carboxylic acid or derivative thereof. In various embodiments, the reactant pair comprises an alkyl amine and an aryl carboxylic acid or derivative thereof. In some cases, the reactant pair comprises an alkyl amine and an alkenyl carboxylic acid or derivative thereof. In some cases, the reactant pair comprises an aryl amine and an alkyl carboxylic acid or derivative thereof. In some cases, the reactant pair comprises an aryl amine and an alkenyl carboxylic acid or derivative thereof. In various cases, the reactant pair comprises an alkenyl amine and an alkyl carboxylic acid or derivative thereof. In some embodiments, the reactant pair comprises an alkenyl amine and an aryl carboxylic acid or derivative thereof. In some cases, the reactant pair comprises an alkenyl amine and an alkenyl carboxylic acid or derivative thereof.

The mapping of bond arrangements between an amine and carboxylic acid, as described herein, can result in products having a diverse array of properties. In some embodiments, the mapping can produce products in which a carbon-carbon bond, a carbon-oxygen bond, or a carbon-carbon bond is formed. Thus, methods described herein can include reacting the amine and carboxylic acid or derivative thereof reactants to synthesize a product having a carbon-oxygen bond, a product having a carbon-nitrogen bond, or a product having a carbon-carbon bond. For example, alkyl amine 1,

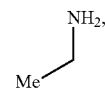

and alkyl carboxylic acid 2,

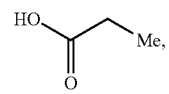

can form 55 different bond arrangements, with each bond arrangement imparting a specific physiochemical profile on its product. FIG. 2b shows six of the possible 55 bond arrangements that can be formed from amine and carboxylic acid reactants. For example, a decarboxylation reaction ($^3NH_2^{A'}/^3CO_2H^{\alpha-B}$) can result in product 4 (formation of a C—N bond), a deamination reaction ($^3NH_2^{\alpha-A'}/^3CO_2H^{\beta[O]}$) can result in product 5 (formation of a C—O bond), and a one-pot decarboxylation-deamination reaction ($^3NH_2^{\alpha-A'}/^3CO_2H^{\alpha-\beta}$) can forge a carbon-carbon bond as shown in product 6. Each product enumerated from the common set of reactants has a unique property profile, which can be analyzed to determine if the product would be useful, e.g., as a pharmaceutical. Another example is mapping all possible bond arrangements between aryl amine 10,

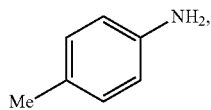

and aryl carboxylic acid 11,

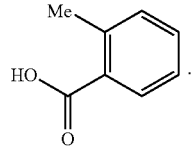

FIG. 3 shows six of the possible products that can be formed from reactants p-toluidine 10 and o-toluic acid 11, as well as the reaction conditions that can be used to synthesize the products. For example, a reductive amidation (product 13, formation of a C—N bond, see also Example 3) can be performed using conditions reported by Fu et al. Angew. Chem. Int. Ed. 2015, 54, 9042-9046, an ortho-arylation (product 15, formation for a C—C bond) and tandem ortho-arylation/decarboxylation (product 16, formation of a C—C bond) can be performed using the procedures reported in Gooβen et al., Angew. Chem. Int. Ed. 2015, 54, 12607-12611, and a novel deaminative esterification reaction can be performed using methods described herein (product 17, formation of a C—O bond, see Example 1). The products produced span a diverse property profile from basic (15) to acid (15) to neutral (12, 17) and lipophilic (14, 16).

In some embodiments, the synthesizing step comprises contacting an amine (such as an alkyl amine, an alkenyl amine, or an aryl amine), as described herein, with a carboxylic acid or derivative thereof (such as an alkyl carboxylic acid or derivative thereof, an alkenyl carboxylic acid or derivative thereof, or an aryl carboxylic acid or derivative thereof), as described herein, in the presence of a catalytic system comprising: (i) an oxidant or a reductant, and (ii) a transition metal catalyst comprising copper, nickel, iron, or palladium, to form a carbon-carbon bond. In various embodiments, the synthesizing comprises contacting an amine with a carboxylic acid or derivative thereof in the presence of a catalytic system comprising: (i) an oxidant or a reductant, and (ii) a transition metal catalyst comprising copper, nickel, iron, or palladium, to form a carbon-oxygen bond. In some cases, the synthesizing comprises contacting the amine with the carboxylic acid or derivative thereof in the presence of a catalytic system comprising: (i) an oxidant or a reductant, and (ii) and a transition metal catalyst comprising copper, nickel, iron, or palladium, to form a carbon-nitrogen bond.

The oxidant or reductant of the catalytic system can be any oxidant or reductant capable of synthesizing the desired product. Contemplated oxidants include, for example alphabromomalonates, OXONE (a potassium triple salt comprising $KHSO_5$, $\frac{1}{2}KHSO_4$, and $\frac{1}{2}K_2SO_4$), peroxides, and alkyl halides. In some embodiments, the oxidant is a silver salt. The silver salt can be any silver salt that functions to achieve the desired transformation. Contemplated silver salts include, but are not limited to, 2,6-bis[(di-tert-butylphosphino)methyl]pyridine silver(I) tetrafluoroborate, (1,5-cyclooctadiene)(hexafluoroacetylacetonato)silver(I), potassium dicyanoargentate, silver acetate, silver bis(trifluoromethanesulfonyl)imide, silver carbonate, silver chloride, silver diethyldithiocarbamate, silver hexafluoroantimonate (V), silver hexafluorophosphate, silver methanesulfonate, silver nitrate, silver (I) oxide, silver sulfate, silver tetrafluoroborate, silver p-toluenesulfonate, silver trifluoromethanesulfonate, tetrakis(acetonitrile)silver(I) tetrafluoroborate, and tris(1,1,1-trifluoromethanesulfonyl)methyl silver(I). See, e.g., Li and He, European Journal of Organic Chemistry 2006, 4313-4322. In some cases, the silver salt is selected from the group consisting of silver trifluoromethanesulfonate, silver nitrate, and silver carbonate. In some embodiments, the silver salt is $Ag_2CO_3$. In various embodiments, the silver salt is $AgNO_3$. Contemplated reductants include, for example, manganese, zinc, magnesium, sodium persulfate, ammonium persulfate, silanes, siloxanes, and stannanes. In some cases, the reductant is selected from the group consisting of manganese, sodium persulfate, or a silane. In some cases, the reductant is manganese.

The transition metal catalyst of the catalytic system comprises copper, nickel, iron, manganese or palladium. In some embodiments, the transition metal catalyst comprises copper. In various embodiments, the copper is copper (I). In some cases, the copper catalyst is selected from the group consisting of copper (I) bromide, copper (I) chloride, copper (I) cyanide, copper (I) thiocyanate, copper (I) thiophenecarboxylate, tetrakis(acetonitrile copper) (I) tetraafluoroborate, and copper (I) iodide. The copper (I) catalysts may be further complexed with ligands to generate the active catalyst. The ligands can include, but are not limited to, tetramethylethylenediamine, 2,6-dimethylanilo oxoacetic acid, 2,6-dimethoxyanilo oxoacetic acid, or 1,10-phenanthroline. In various cases, the transition metal catalyst is CuI complexed with tetramethylethylenediamine, 2,6-dimethylanilo oxoacetic acid, or 2,6-dimethoxyanilo oxoacetic acid. In some cases, the transition metal catalyst comprises nickel. In various embodiments, the nickel is nickel (0) or nickel (II). Contemplated nickel catalysts include, but are not limited to, nickel (0) (cyclooctadiene)$_2$, nickel (II) iodide, nickel (II) bromide hydrate, nickel (II) acetate tetrahydrate, nickel (II) chloride ethyleneglycol dimethyl ether complex, and nickel (II) (acetylacetate)$_2$. Any of the said metal salts may be further complexed with ligands to generate the active catalytic species. The ligands can include, but are not limited to, di-tertbutyl bipyridine, tri-tertbutyl terpyridine, 1,10-phenanthroline, bathophenanthrloine, ligands derived from 1,3-disubstituted imidazolium salts, triphenylphosphine, XPhos (a phosphine ligand derived from biphenyl), and xantphos (an organophosphorus compound derived from xanthene). In various cases, the nickel transition metal catalyst is selected from the group consisting of nickel (II) acetate complexed to di-tertbutyl bipyridine, phenanthroline, bathophenanthroline or nickel (0) (cyclooctadiene)$_2$ complexed to 1,3-bis(2,4,6-trimethylphenyl)imidazole carbene. In some cases, the transition metal catalyst comprises iron. In various embodiments, the iron is iron (II) or iron (III). Contemplated iron catalysts include, but are not limited to iron (II) acetylacetate, iron (II) sulfate, iron (III) chloride, and iron (III) chloride. In various cases, the iron transition metal catalyst is selected from the group consisting of iron (II) acetylacetate. In some cases, the transition metal catalyst comprises manganese. In various embodiments, the manganese is manganese (I). Contemplated manganese catalysts include, but are not limited to cyclopentadienylmanganese (I) tricarbonyl and methylcyclopentadienylmanganese (I) tricarbonyl. In some cases, the transition metal catalyst comprises palladium. In various embodiments, the palladium is palladium (0) and palladium (II). Contemplated palladium catalysts include, but are not limited to tetrakistriphenylphosphine palladium (0), bis(dibenzylideneacetone)palladium(0), [1,1'-bis(diphenylphosphino)ferrocene] dichloropalladium(II), palladium (II) acetate, palladium (II) chloride, and palladium (II) trifluoroacetate. The palladium compounds can be further complexed with ligands to generate the active catalyst. The ligands can include but are not limited to, XPhos, Johnphos, 1,2-bis(diphenylphosphinoethane), Brettphos (a dialkyl phosphine ligand), Ruphos (2-dicyclohexylphosphino-2',6'-diisopropoxybiphenyl), and tricyclohexylphosphine. In various cases, the palladium transition metal catalyst is selected from the group consisting of Pd(PPh$_3$)$_4$ and Pd(dppf)Cl$_2$.

For example, as shown in FIG. 5 and Example 1, activated aryl amine 33 can readily react with alkyl carboxylic acid 34 in the presence of CuI, TMEDA, AgNO$_3$ in MeCN to cleave a C—N bond and form a new C—O bond (35). Also, as shown in Example 1, under the same reaction conditions, activated aryl amine, 4-methylbenzenediazonium, can react with aryl carboxylic acid, 2-methylbenzoic acid, to cleave a C—N bond and form a new C—O bond.

Also disclosed herein is a method of forming a carbon-carbon bond comprising contacting an activated aryl amine with an aryl carboxylic acid or derivative thereof in the presence of a catalytic system comprising a silver salt and a transition metal catalyst comprising copper, nickel, iron, or palladium to form the carbon-carbon bond. Carbon-carbon bond forming transformations, in particular, are among the most powerful reactions in the synthetic toolbox. Therefore, a new ways of forming carbon-carbon bonds by reacting an amine with a carboxylic acid or derivative thereof, which are prevalent in common building block materials, natural products, and commercial products, are highly advantageous.

The activated aryl amine can be any activated aryl amine known to one skilled in the art, as previously described herein. In some embodiments, the aryl amine is an activated aniline. For example, the aryl amine can be 3,5-dichloroaniline. In some cases, the aryl amine is activated by forming its diazonium salt (e.g.,

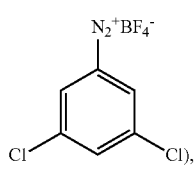

trimethlyammonium salt (e.g.,

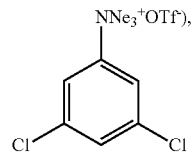

pyridinium salt (e.g.,

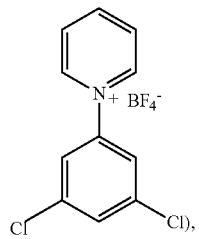

or an isocyanidyl group (e.g.,

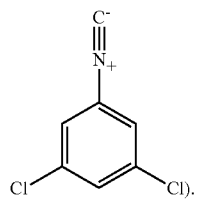

In various cases, the activated aryl amine is a diazonium salt. In some embodiments, the aryl amine is activated and isolated before contacting it with the aryl carboxylic acid or derivative thereof. In some cases, the aryl amine is activated in situ. For example, a diazonium salt of an aniline can be formed in situ by contacting the aniline with tert-butylnitrite or sodium nitrite using appropriate reaction conditions known to one skilled in the art. In some cases, an amine may be treated with an oxopyrylium salt, such as tetrafluoroborate, to form a pyridinium salt which may be used in situ.

The aryl carboxylic acid or derivative thereof can be any activated aryl carboxylic acid or derivative thereof known to one skilled in the art, as previously described herein. In some embodiments, the aryl carboxylic acid or derivative thereof is an activated benzoic acid, such as an ortho-substituted benzoic acid or picolinic acid. For example, the activated aryl carboxylic acid or derivative thereof can be 2-fluorobenzoic acid. In some cases, the aryl carboxylic acid or derivative thereof is activated with a silver complex, hypobromite, benzophenone oxime, or hypervalent iodine (e.g., to form

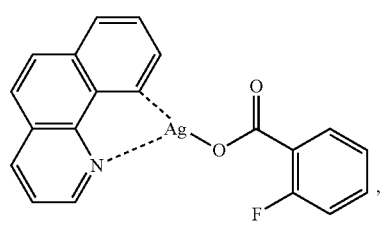

-continued

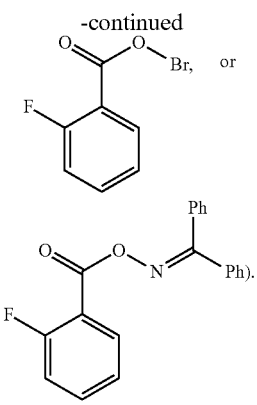

In various cases, the activated aryl carboxylic acid is a silver complex. In various embodiments, the aryl carboxylic acid or derivative thereof is activated and isolated before it is contacted with the activated aryl amine. In various cases, the aryl carboxylic acid or derivative thereof is activated in situ. In some cases, the aryl carboxylic acid is activated in the form of its acyl halide, as for example, in the treatment with oxalyl chloride to form an acyl chloride, or in the treatment with triphenylphosphine and N-bromosuccimide to form an acyl bromide, or other methods for the synthesis of acyl halides familiar to those skilled in the art.

The catalytic system comprises a silver salt and a transition metal catalyst comprising copper, nickel, iron, or palladium, as described supra. In some embodiments, the silver salt is silver nitrate or silver carbonate. In various embodiments, the silver salt is $Ag_2CO_3$. In various cases, the transition metal catalyst comprises palladium. In some cases, the palladium catalyst is palladium (0). In some embodiments, the palladium catalyst is $Pd(PPh_3)_4$.

In some cases, the synthesizing step comprises contacting an amine with a carboxylic acid or derivative thereof in the presence of a radical shuttle to form a carbon-oxygen bond. In some cases, the amine is an activated amine, as previously described herein. In some embodiments, the activated amine comprises a pyridinium salt. In various embodiments, the carboxylic acid or derivative thereof is a free carboxylic acid or derivative thereof. In some cases, the carboxylic acid or derivative thereof is activated. In various embodiments, the activated carboxylic acid or derivative thereof is its potassium salt. The potassium salt of a carboxylic acid or derivative thereof can be formed by any method known to one skilled in the art. For example, the potassium salt of the carboxylic acid can be prepared by reacting the carboxylic acid with KOH, as described in General Procedure D. The radical shuttle can be any radical shuttle known to those skilled in the art capable of forming a carbon-oxygen bond upon reaction of an activated amine and an activated carboxylic acid. Contemplated radical shuttles includes, but are not limited to, transition metal complexes such as [Ni(μ-Cl)(IPr)]$_2$, as well as organic reagents such as diphenyldisulfide, diphenyldiselenide, and diethyl 2-bromo-2-methylmalonate. In some cases, the radical shuttle comprises diethyl 2-bromo-2-methylmalonate. For example, as shown in FIG. 6 and General Procedure B, the Katritzky salt (36), which is readily formed from benzylamine and oxopyrrillium (37), can react with the potassium salt of carboxylic acid 38 in the presence of a catalytic amount of a radical shuttle 39, to cleave a C—N bond and forge a new C—O bond (40). The activated amine 36 also can couple to other activated carboxylic acids to form products 41-44. As shown in General procedure C, the Katritzky salt can react with a free carboxylic acid or derivative thereof in the presence of a catalytic amount of a diethyl 2-bromo-2-methylmalonate to cleave a C—N bond and form a new C—O bond.

In various embodiments, the synthesizing step comprises contacting an amine (an alkyl amine, an alkenyl amine, an aryl amine), as described herein, with a carboxylic acid or derivative thereof (an alkyl carboxylic acid or derivative thereof, an alkenyl carboxylic acid or derivative thereof, an aryl carboxylic acid or derivative thereof), as described herein, in the presence of a co-catalytic system comprising: (i) a transition metal co-catalyst comprising copper, nickel, or palladium, and (ii) a photoredox co-catalyst, to form a carbon-carbon bond. In some cases, the synthesizing comprises contacting an amine with a carboxylic acid or derivative thereof in the presence of a co-catalytic system comprising: (i) a transition metal co-catalyst comprising copper, nickel, iron, or palladium, and (ii) a photoredox co-catalyst, to form a carbon-oxygen bond. In various cases, the synthesizing comprises contacting an amine with a carboxylic acid or derivative thereof in the presence of a co-catalytic system comprising: (i) a transition metal co-catalyst comprising copper, nickel, iron, or palladium, and (ii) a photoredox co-catalyst, to form a carbon-nitrogen bond.

The transition metal co-catalyst of the co-catalytic system comprises copper, nickel, iron, or palladium. In some embodiments, the transition metal co-catalyst comprises copper. In various embodiments, the copper is copper (I). In some cases, the copper catalyst is selected from the group consisting of copper (I) bromide, copper (I) chloride, copper (I) cyanide, copper (I) thiocyancate, copper (I) thiophenecarboxylate, tetrakis(acetonitrile copper) (I) tetraafluoroborate, and copper (I) iodide. The copper species may be further complexed with ligands to generate the active catalyst. The ligands can include, but are not limited to, tetramethylethylenediamine, 2,6-dimethylanilo oxoacetic acid, 2,6-dimethoxyanilo oxoacetic acid, or 1,10-phenanthroline. In various cases, the transition metal co-catalyst can be CuI complexed with tetramethylethylenediamine, 2,6-dimethylanilooxoacetic acid, or 2,6-dimethoxyanilo oxoacetic acid. In some cases, the transition metal co-catalyst comprises nickel. In various embodiments, the nickel is nickel (0) or nickel (II). Contemplated nickel catalysts include, but are not limited to, nickel (0) (cyclooctadiene)$_2$, nickel (II) iodide, nickel (II) bromide hydrate, nickel (II) acetate tetrahydrate, nickel (II) chloride ethyleneglycol dimethyl ether complex, and nickel (II) (acetylacetate)$_2$. Any of the metal salts mentioned may be complexed with ligands to generate the active catalytic species. The ligands include, but are not limited to, di-tertbutyl bipyridine, tri-tertbutyl terpyridine, 1,10-phenanthroline, bathophenanthrloine, ligands derived from 1,3-disubstituted imidazolium salts, triphenylphosphine, XPhos, and xantphos. In various cases, the nickel transition metal co-catalyst is selected from the group consisting of nickel (II) acetate complexed to di-tertbutyl bipyridine, phenanthroline, bathophenanthroline or nickel (0) (cyclooctadiene)$_2$ complexed to 1,3-bis(2,4,6-trimethylphenyl) imidazole carbene. In some cases, the transition metal co-catalyst comprises iron. In various embodiments, the iron is iron (II) or iron (III). Contemplated iron catalysts include, but are not limited to, iron (II) acetylacetate, iron (II) sulfate, iron (III) chloride, and iron (III) chloride. In various cases, the iron transition metal co-catalyst can be selected from the group consisting of iron (II) acetylacetate. In some cases, the transition metal co-catalyst can comprise palladium. In various embodiments, the palladium is palladium (0) and palladium (II). Contemplated palladium catalysts include, but are not limited to, tetrakistriphenylphosphine palladium (0), bis(dibenzylideneacetone)palladium(0), [1,1'-bis(diphenylphosphino)ferrocene]dichloropalladium(II), palladium (II) acetate, palladium (II) chloride, and palladium (II) trifluoroacetate. The palladium compounds may also be further complexed with ligands to generate the active catalyst. The ligands can include but are not limited to XPhos, Johnphos, 1,2-bis(diphenylphosphinoethane), Brettphos, Ruphos, and tricyclohexylphosphine. In various cases, the palladium transition metal co-catalyst is selected from the group consisting of $Pd(PPh_3)_4$ and $Pd(dppf)Cl_2$.

In some embodiments, the photoredox co-catalyst comprises iridium. In various embodiments, the iridium can be Ir(I), Ir(II), Ir(III), or Ir(IV). Contemplated iridium co-catalysts include, but are not limited to $Ir(ppy)_3$, $Ir(p-CF_3-ppy)_3$, $(Ir[dF(CF_3)ppy]_2(dtbpy))PF_6$, $Ir(dFFppy)2(dtbbpy)PF_6$, $[Ir(dF(Me)ppy)_2(dtbbpy)]PF_6$, $[Ir(dF(CF_3ppy_2(bpy)]PF_6$ or $Ir[dFFppy]_2-(4,4'-dCF_3bpy)PF_6$. In some cases, the photoredox co-catalyst comprises $[Ir(dF(CF_3ppy)_2(bpy)]PF_6$ or $Ir[dFFppy]_2-(4,4'-dCF_3bpy)PF_6$.

Without intending to be bound by any particular theory, the photoredox co-catalyst (e.g., Ir(II)) can decompose the activated aryl amine to form an aryl radical, which combines with the transition metal co-catalyst (e.g., Cu(II)) to form an intermediate organocopper species (e.g., Cu(III) species)). Reductive elimination from the intermediate species results in the desired carbon-carbon bond. Concomitant oxidation of, e.g., Cu(I) to Cu(II) by the photoexcited photoredox co-catalyst (e.g., Ir(III)) closes the photoredox catalytic cycle and engages the carboxylic acid or derivative thereof.

In some embodiments, the photoredox co-catalyst system further includes a silver salt, as previously described herein. In some cases, the photoredox co-catalyst system further includes a base, such as a guanidine base (e.g., 2-tert-butyl-1,1,3,3-tetramethylguanidine). In some cases, the photoredox co-catalyst system contains reducing additives such as diethyl 1,4-dihydro-2,6-dimethyl-3,5-pyridinecarboxylate.

Thus, disclosed herein is a method of forming a carbon-carbon bond comprising contacting an aryl amine with a carboxylic acid or derivative thereof (e.g., an alkyl, alkenyl, or aryl carboxylic acid or derivatives thereof) in the presence of a co-catalytic system comprising a photoredox co-catalyst and a transition metal co-catalyst comprising copper, nickel, and palladium to form the carbon-carbon bond. See, e.g., Example 2.

In some embodiments, the aryl amine is a free aryl amine (e.g., aniline, o-toluidine, 2, 3, 4, 5, 6-pentafluoroaniline, 2-pyridinamine). In various embodiments, the aryl amine is an activated amine. The activated aryl amine can be any activated aryl amine known to one skilled in the art. In some embodiments, the aryl amine is an activated aniline. For example, the aryl amine can be 3,5-dichloroaniline. In some cases, the aryl amine is activated by forming its diazonium salt, trimethlyammonium salt, pyridinium salt, or an isocyanidyl group. In various cases, the activated aryl amine is a diazonium salt. In some embodiments, the aryl amine is activated and isolated before contacting it with the alkyl carboxylic acid or derivative thereof. In some cases, the aryl amine is activated in situ. For example, a diazonium salt of an aniline can be formed in situ by contacting the aniline with tert-butylnitrite or sodium nitrite using appropriate reaction conditions known to one skilled in the art.

The carboxylic acid or derivative thereof can be any alkyl, alkenyl, or aryl carboxylic acid or derivative thereof known to one skilled in the art. In some embodiments, the alkyl carboxylic acid or derivative thereof is $C_{3-10}$cycloalkyl carboxylic acid or derivative thereof, such as benzylic carboxylic acid or N-protected proline. In some cases, the carboxylic acid or derivative thereof is benzoic acid or methylbenzoic acid. In various embodiments, the carboxylic acid or derivative thereof is a $C_{4-20}$alkylene carboxylic acid or derivative thereof. In some cases, the carboxylic acid or derivative thereof is a $C_{4-20}$alkylenylene carboxylic acid. In some embodiments, the carboxylic acid or derivative thereof is o-toluic acid.

The co-catalytic system is as previously described herein.

Other Embodiments

It is to be understood that while the disclosure is read in conjunction with the detailed description thereof, the foregoing description is intended to illustrate and not limit the scope of the disclosure, which is defined by the scope of the appended claims. Other aspects, advantages, and modifications are within the scope of the following claims. For example, as shown in FIG. 7, additional pairs of reactants with complementary functional groups are contemplated, such as amines-aldehydes and halides-boronic acids, to arrive at products with different properties than those derived from traditional transformations, such as reductive amination or Suzuki coupling.

EXAMPLES

The following examples are provided for illustration and are not intended to limit the scope of the invention.

Materials and Methods

Reagents were purchased from commercial vendors and used as is. Anhydrous solvents were purchased in septum-sealed bottles, and used as received, or dispensed from a MBraun SPS solvent purification system which passes the solvent over a column packed with alumina under a pressure of nitrogen gas. Diazonium salts were prepared according to literature reported by D. P. Hari, P. Schroll, B. Koenig, *J. Am. Chem. Soc.*, 2012, 134(6), 2958-2961. Unless otherwise noted, all reactions were performed in oven-dried glassware under positive nitrogen pressure, and analyzed by TLC, or by UPLC-MS on a Waters I-Class ACQUITY UPLC-MS (Waters Corporation, Milford, MA, USA) equipped with in-line photodiode array detector (PDA) and QDa mass detector (ESI positive ionization mode. Column used: Waters Cortecs UPLC C18+ column, 2.1 mm×50 mm with (Waters #186007114) with Waters Cortecs UPLC C18+ VanGuard Pre-column 2.1 mm×5 mm (Waters #186007125). Reactions were typically quenched through the addition of aqueous solutions of sodium chloride, ammonium chloride, sodium bicarbonate, followed by extraction of products into organic solvents such as dichloromethane, ethyl acetate, diethyl ether, methyl-tert-butyl ether (MTBE), or hexanes. The combined organic layer was concentrated in vacuo by rotary evaporation, and the residual crude product was purified by column chromatography on silica gel (Fisher Chemical S825-25 Silica gel, 230-400 mesh, grade 60), by preparative thin layer chromatography on silica gel plates (Analtech Silica gel GF, UV 254, 20×20 cm, 500 micron), or by recrystallization. Products were analyzed by proton nuclear magnetic resonance spectra ($^1$H-NMR) and proton-decoupled carbon nuclear magnetic resonance spectra ($^{13}$C-NMR), as described below.

Enumeration and visualization code was written in Python (version 3.6.5). RDKit (version 2019.03.1—installed via Anaconda (version 4.6.11)) was used to perform computational transformation enumeration. Visualization code was written using the matplotlib (version 3.0.3), numpy (version 1.16.3), pandas (version 0.24.2), openpyxl (version 2.6.2), and seaborn (version 0.9.0) packages, which were all installed via pip (version 19.1). Chord diagrams were developed using the Circos software (version 0.69), and the Circos configuration files were generated using Python and RDKit. Dassault Systemes' Pipeline Pilot (version 18.1.0.1604) was used for the ionization of products at pH 7.4.

All reactions were conducted in oven- or flame-dried glassware under an atmosphere of nitrogen unless stated otherwise. Reactions were set up in an MBraun LABmaster Pro Glove Box ($H_2O$ level <0.1 ppm, $O_2$ level <0.1 ppm), or using standard Schlenk technique with a glass vacuum manifold connected to an inlet of dry nitrogen gas. Solvents (acetonitrile, tetrahydrofuran) were purified using a MBraun SPS solvent purification system, by purging with nitrogen, and then passing the solvent through a column of activated alumina. Acetone was distilled from anhydrous calcium sulfate. Reagents [p-toluidine, o-methyl benzoic acid, sodium nitrate, tetrafluoroboric acid solution (48% weight in water), copper iodide, silver nitrate, pyridine, oxalyl chloride, triethyl amine, diisopropyl ethyl amine, copper oxide, 1,10-phenantholine, tris(pentafluorophenyl)borane, phenylsilane, copper triflate, sulfadoxine, Boc-N-proline, HATU, LiHMDS, TMSCI, NBS, $Pd(OAc)_2$, piperidine, lithium hydroxide, magnesium, trifluoroacetic acid, lithocholic acid, yohimbine hydrochloride were purchased from Sigma Aldrich, Alfa Aesar, Oakwood Chemical, or TCI Chemical. All chemicals were used as received, except for liquid anilines, which were passed through a small plug of neutral alumina prior to reaction. Glass 2 dram vials (ChemGlass #CG-4912-02) were used as reaction vessels, fitted with a screw-cap with a Teflon-coated silicone septa (CG-4910-02), and magnetic stir bars (Fisher Scientific #14-513-93 or #14-513-65). High temperature reactions were performed in crimp cap vials (Biotage #351521).

Proton nuclear magnetic resonance spectra ($^1H$ NMR) were recorded on a Varian MR-500 MHz or Varian MR-400 MHz spectrometer and chemical shifts were reported in parts per million (ppm) using the solvent residual peak as an internal standard ($CDCl_3$ at 7.26 ppm). Data were reported using the abbreviations: app=apparent, s=singlet, d=doublet, t=triplet, q=quartet, m=multiplet, comp=complex, br=broad. Coupling constant(s) were reported in Hz. Proton-decoupled carbon nuclear magnetic resonance spectra ($^{13}C$ NMR) spectra were recorded on a Varian MR-500 MHz or Varian MR-400 MHz spectrometer, and chemical shifts were reported in ppm using the solvent as an internal standard ($CDCl_3$ at 77.16 ppm). High resolution mass spectrometry data (HRMS) was obtained on a Micromass AutoSpec Ultima Magnetic Sector instrument. Reaction analysis was typically performed by thin-layer chromatography on silica gel, or using a Waters I-class ACQUITY UPLC-MS (Waters Corporation, Milford, MA, USA) equipped with in-line photodiode array detector (PDA) and QDa mass detector (ESI positive ionization mode). 0.1 µL sample injections were taken from acetonitrile solutions of reaction mixtures or products (~1 mg/mL). A partial loop injection mode was used with the needle placement at 1.0 mm from bottom of the wells and a 0.2 µL air gap at pre-aspiration and post-aspiration. Column used: Waters Cortecs UPLC C18+ column, 2.1 mm×50 mm with (Waters #186007114) with Waters Cortecs UPLC C18+ VanGuard Pre-column 2.1 mm×5 mm (Waters #186007125), Mobile Phase A: 0.1% formic acid in Optima LC/MS-grade water, Mobile Phase B: 0.1% formic acid in Optima LC/MS-grade MeCN. Flow rate: 1 mL/min. Column temperature: 45° C. The PDA sampling rate was 20 points/sec. The QDa detector monitored m/z 150-750 with a scan time of 0.06 seconds and a cone voltage of 30 V. The PDA detector range was between 210 nm-400 nm with a resolution of 1.2 nm. 1 minute and 2 minute methods were used. The method gradients are below: 0 min: 0.8 mL/min, 95% 0.1% formic acid in water/5% 0.1% formic acid in acetonitrile; 1.5 min:0.8 mL/min, 0.1% 0.1% formic acid in water/99.9% 0.1% formic acid in acetonitrile; 1.91 min:0.8 mL/min, 95% 0.1% formic acid in water/5% 0.1% formic acid in acetonitrile.

Flash chromatography was performed on silica gel (230-400 Mesh, Grade 60) under a positive pressure of nitrogen. Thin layer chromatography (TLC) was performed on 25 µm TLC Silica gel 60 F254 glass plates purchased from Fisher Scientific (part number: S07876). Visualization was performed using ultraviolet light (254 nm), potassium permanganate (KMnO4) stain, or Cerium Ammonium Molybdate (CAM) stain.

Example 1: General Procedures for the Copper/Silver Mediated De-Aminative Coupling Reactions

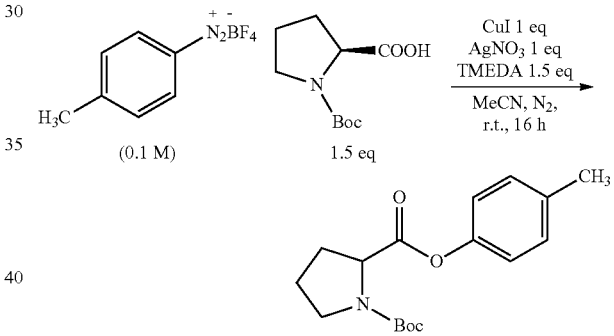

Under dry $N_2$, to a solution of (L)-Boc-Pro-OH (0.0323 g, 0.15 mmol, 1.5 equiv) and N,N,N',N'-Tetramethylethane-1,2-diamine (23 µL, 0.15 mmol, 1.5 equiv) in anhydrous acetonitrile (0.5 mL) was added copper(I) iodide (0.0190 g, 0.10 mmol 1.0 equiv). The resulting reaction mixture was stirred for 10 min at 22° C. before the addition of silver nitrate (0.0170 g 0.10 mmol, 1.0 equiv). A solution of diazonium (0.0206 g, 0.10 mmol, 1.0 equiv) in anhydrous acetonitrile (0.5 mL) was added to the mixture slowly. The reaction mixture was stirred at the same temperature until completion (16 hours, judged by TLC analysis). The reaction mixture was diluted with ethyl acetate (10 mL), washed with saturated ammonium chloride solution (10 mL×2), and saturated sodium sulfate solution (10 mL). The organic layer was dried with anhydrous magnesium sulfate After removal of the solvent, the residue was purified by flash chromatography on silica gel with gradient of hexanes and ethyl acetate. Substituting N,N,N',N'-Tetramethylethane-1,2-diamine with pyridine (1.5 equiv) was found to be beneficial.

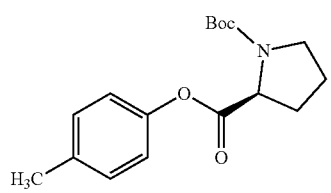 [SMILES: Cc1ccc(OC(=O)[C@@H]2CCCN2C(=O)OC(C)(C)C)cc1]

1-(tert-butyl) 2-(p-tolyl) (S)-pyrrolidine-1,2-dicarboxylate. Colorless oil, yield 51%. $^1$H NMR (400 MHz, Chloroform-d) δ 7.16 (dd, J=11.1, 8.0 Hz, 2H), 7.05-6.91 (m, 2H), 4.48 (ddd, J=31.9, 8.6, 4.2 Hz, 1H), 3.66-3.39 (m, 2H), 2.43-2.35 (m, 1H), 2.35-2.32 (m, 3H), 2.28 (d, J=9.9 Hz, 0H), 2.22-1.88 (m, 3H), 1.47 (d, J=5.6 Hz, 9H).

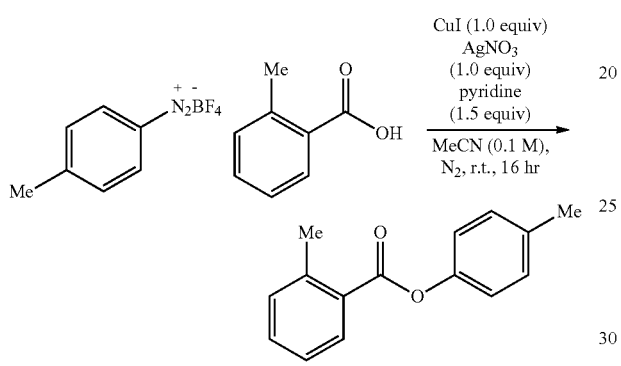

Under an atmosphere of dry nitrogen, to a solution of o-toluic acid (11, 40.8 mg, 0.300 mmol, 1.50 equiv) and anhydrous pyridine (24.0 μL, 0.300 mmol, 1.50 equiv) in anhydrous acetonitrile (1.00 mL) was added copper(I) iodide (0.0380 g, 0.200 mmol 1.00 equiv). The resulting reaction mixture was stirred for 10 min at 22° C. before the addition of solid silver nitrate (0.0343 g, 0.200 mmol, 1.00 equiv). A solution of diazonium (41.2 mg, 0.200 mmol) in anhydrous acetonitrile (1.00 mL) was slowly added to the mixture. The reaction mixture was stirred at the same temperature until completion (16.0 hours, judged by TLC analysis). The reaction mixture was diluted with ethyl acetate (10.0 mL), washed with saturated ammonium chloride solution (2×10.0 mL), and saturated aqueous sodium sulfate solution (10.0 mL). The organic layer was dried over anhydrous magnesium sulfate After removal of the volatiles in vacuo, the residue was purified by flash chromatography on silica gel with gradient of hexanes and ethyl acetate to give the ester product as a colorless liquid (26.2 mg, 58%).

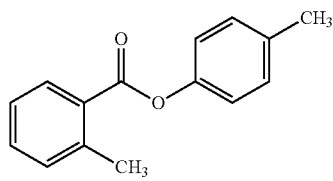 [SMILES: Cc1ccc(OC(=O)c2ccccc2C)cc1]

p-Tolyl 2-methylbenzoate. Light yellow oil, 54%. $^1$H NMR (400 MHz, Chloroform-d) δ 8.16 (dd, J=7.5, 1.9 Hz, 1H), 7.48 (td, J=7.5, 1.5 Hz, 1H), 7.33 (t, J=7.8 Hz, 2H), 7.23 (d, J=8.3 Hz, 2H), 7.13-7.04 (m, 2H), 2.68 (s, 3H), 2.38 (s, 3H). $^{13}$C NMR (100 MHz, Chloroform-d) δ 166.20, 148.80, 141.35, 135.57, 132.75, 132.06, 131.26, 130.12, 128.86, 126.02, 121.62, 22.07, 21.05. $^{13}$C NMR (100 MHz, Chloroform-d) δ 166.20, 148.80, 141.35, 135.57, 132.75, 132.06, 131.26, 130.12, 128.86, 126.02, 121.62, 22.07, 21.05.

Example 2: Procedures for the Iridium/Silver Mediated Coupling Reactions

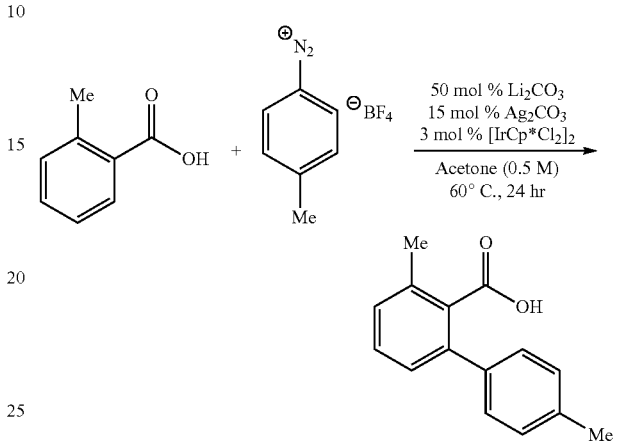

An oven-dried 4 mL dram vial was charged with [IrCp*Cl$_2$]$_2$☐(5.07 mg, 6.61 μmol, 3 mol %), lithium carbonate (8.14 mg, 110 μmol, 50 mol %), silver carbonate (9.11 mg, 33.1 μmol, 15 mol %), diazonium salt (45.4 mg, 220 μmol, 1 equiv.), and o-toluic acid (30.0 mg, 220 μmol) in that order. To this was added a teflon stirbar, and the vial was sealed with a septum cap. After placing the vial under vacuum and backfilling with N$_2$ three times, distilled and degassed acetone (441 μL, 0.50 M) was added via syringe. The reaction was warmed to 60° C. and allowed to stir for 24 hours. After this time, the reaction was allowed to cool to room temperature. The reaction mixture was diluted with ethyl acetate (3 mL) and extracted with 1M NaOH solution (3×2 mL). The combined aqueous layer was acidified using 1M HCl and extracted with ethyl acetate (3×2 mL). The combined organics were dried over sodium sulfate and concentrated via rotovap. The crude material was purified via preparatory thin layer chromatography using 8:2:0.1 hexanes/ethyl acetate/acetic acid (R$_f$ 0.30) to produce 31.2 mg (62%) of the desired product as a colorless solid. $^{13}$C NMR (126 MHz, Chloroform-d) δ 140.07, 137.71, 137.23, 135.42, 129.72, 129.10, 128.98, 128.22, 127.45, 21.19, 19.87. $^1$H NMR (500 MHz, Chloroform-d) δ 7.36 (t, J=7.7 Hz, 1H), 7.33-7.29 (m, 2H), 7.24-7.18 (m, 4H), 2.46 (s, 3H), 2.39 (s, 3H).

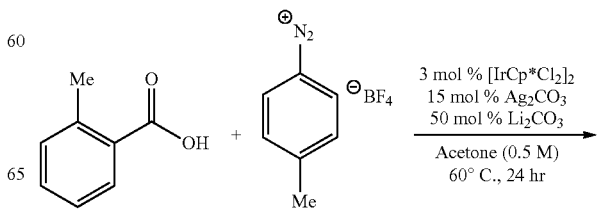

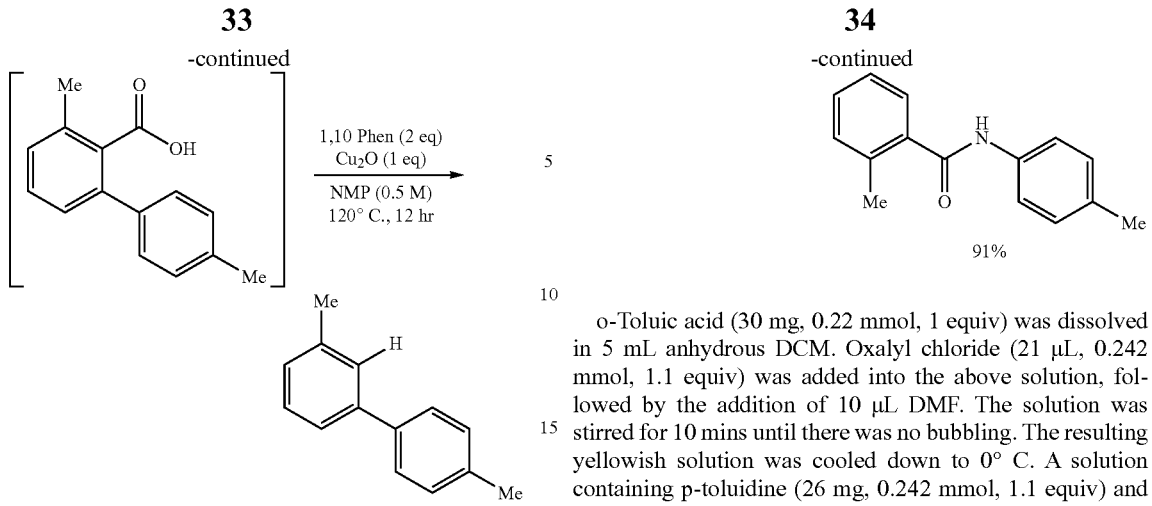

An oven-dried 4 mL dram vial was charged with [IrCp*Cl₂]₂☐(5.07 mg, 6.61 µmol, 3 mol %), lithium carbonate (8.14 mg, 110 µmol, 50 mol %), silver carbonate (9.11 mg, 33.1 µmol, 15 mol %), diazonium salt (45.4 mg, 220 µmol, 1 equiv.), and o-toluic acid (30.0 mg, 220 µmol) in that order. To this was added a teflon stirbar and the vial was sealed with a septum cap. After placing the vial under vacuum and backfilling with N₂ three times, distilled and degassed acetone (441 µL, 0.50 M) was added via syringe. The reaction was warmed to 60° C. and allowed to stir for 24 hours. After this time, the reaction was allowed to cool to room temperature. The volatiles were removed via rotovap. Copper (I) oxide (31.5 mg, 220 µmol, 1 equiv.), 1,10-phenanthroline (79.4 mg, 441 µmol, 2 equiv.), and NMP (441 µL, 0.50 M) were added to the vial containing the reaction residue. The new mixture was sealed with a septum cap, heated to 120° C., and allowed to stir for 12 hours. After this time, the reaction was allowed to cool to room temperature. The reaction mixture was quenched with brine (3 mL) and extracted with ethyl acetate (3×2 mL). The combined organics were dried over sodium sulfate and condensed via rotovap. The crude material was purified via preparatory thin layer chromatography using 95:5 hexanes/ethyl acetate ($R_f$ 0.81) to produce 27.6 mg of the desired product as a colorless solid. $^{13}$C NMR (126 MHz, Chloroform-d) δ 141.13, 138.45, 138.24, 136.88, 129.39, 128.59, 127.76, 127.69, 126.98, 124.06, 21.54, 21.09. $^1$H NMR (500 MHz, Chloroform-d) δ 7.50-7.47 (m, 2H), 7.38 (dt, J=9.5, 1.8 Hz, 2H), 7.32 (t, J=7.5 Hz, 1H), 7.24 (d, J=7.9 Hz, 2H), 7.14 (d, J=7.4 Hz, 1H), 2.42 (s, 3H), 2.40 (s, 3H).

Example 3: Coupling of Aryl Amine with Aryl Carboxylic Acid to Form Traditional Amide Produce and Reductive Amination Product

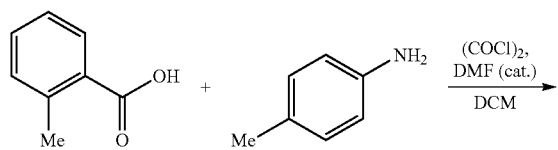

o-Toluic acid (30 mg, 0.22 mmol, 1 equiv) was dissolved in 5 mL anhydrous DCM. Oxalyl chloride (21 µL, 0.242 mmol, 1.1 equiv) was added into the above solution, followed by the addition of 10 µL DMF. The solution was stirred for 10 mins until there was no bubbling. The resulting yellowish solution was cooled down to 0° C. A solution containing p-toluidine (26 mg, 0.242 mmol, 1.1 equiv) and NEt₃ (67 µL, 0.484 mmol, 2.2 equiv) in 3 mL anhydrous DCM was added into the acyl chloride solution dropwise. The mixture was stirred at room temperature and monitored by TLC. When o-toluic acid was completely consumed, 10 mL water was added to quench the reaction. The organic layer was dried over anhydrous Na₂SO₄. The volatile was removed with rota-vapor and the residue was purified by chromatography (Rf=0.2, 15% EtOAc in hexane) to get the desired amide product as a white solid (45 mg, 91%). See Nozawa-Kumada et al., Org Lett, 2015, 17, 449. $^1$H-NMR (CDCl₃, 400 MHz): 7.48 (d, J=7.2 Hz, 2H), 7.45 (d, J=7.2 Hz, 1H), 7.32 (t, J=7.2 Hz, 1H), 7.24-7.21 (m, 2H), 7.15 (d, J=7.2 Hz, 2H), 2.48 (s, 3H), 2.33 (s, 3H); $^{13}$C-NMR (CDCl₃, 125 MHz): 168.0, 136.5, 136.4, 135.4, 134.2, 131.2, 130.1, 129.5, 126.5, 125.8, 119.9, 20.9, 19.8.

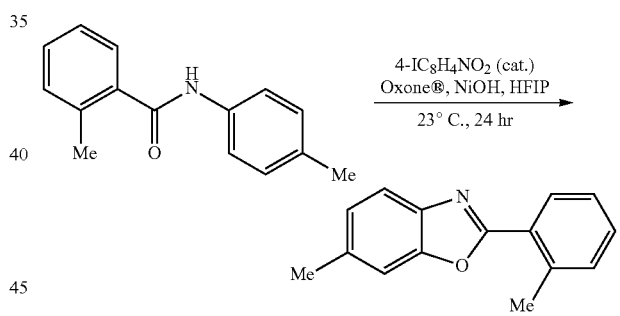

6-Methyl-2-(o-tolyl)benzo[d]oxazole: To a dry 2-dram vial was added 2-methyl-N-(p-tolyl)benzamide (25.0 mg, 0.111 mmol, 1.00 equiv), 1-iodo-4-nitrobenzene (13.8 mg, 0.0555 mmol, 0.500 equiv), and a Teflon-coated stirbar. Hexafluoroisopropanol (1.2 mL) was added followed by perfluorobutanesulfonic acid (99.9 mg, 0.333 mmol, 3.00 equiv). Finally, solid Oxone® (102 mg, 0.166 mmol, 1.50 equiv) was added, the vial capped with inclusion of air, and stirred at room temperature for 24.0 hours. The reaction mixture was filtered through a plug of silica gel using ethyl acetate (25.0 mL) as eluent. The collected mixture was washed with water (20.0 mL) and brine (20.0 mL). The organic layer was further dried over anhydrous sodium sulfate (10.0 g). After filtration, the organic layer was concentrated in vacuo. The crude mixture was purified by flash column chromatography (ethyl acetate:hexanes=1:15) to produce a white solid which contained the desired product along with 1-iodo-4-nitrobenzene. The white solid was further purified by preparative thin layer chromatography (100% hexanes as eluent) to obtain the desired product as a white solid (11.2 mg, 45%). Rf=0.6 (ethyl acetate: hexanes=1:5); $^1$H NMR (400 MHz, CDCl$_3$): δ 8.14-8.13 (m, 1H), 7.65 (d, J=8.0 Hz, 1H), 7.38-7.36 (m, 2H), 7.32-7.29 (m, 2H), 7.14 (d, J=8.0 Hz, 1H), 2.79 (s, 3H), 2.48 (s, 3H).

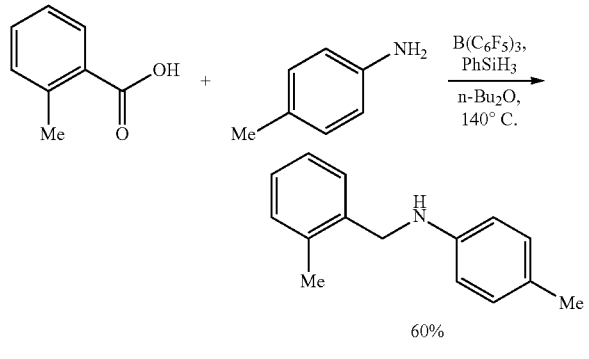

p-Toluidine (32.1 mg, 0.3 mmol, 1 equiv) and o-toluic acid (94 mg, 0.69 mmol, 2.3 equiv) were added into 1.5 mL n-Bu$_2$O under N$_2$. Then B(C$_6$F$_5$)$_3$ (5.1 mg, 3.3 mol %) and PhSiH$_3$ (148 μL, 1.2 mmol, 4.0 equiv) were added into the above solution. The mixture was stirred at 140° C. for 24 hours. The reaction mixture was analyzed by GC/MS and $^1$H-NMR. The desired secondary amine product was detected in 60% yield with 1,3,5-trimethoxybenzene as the internal standard.

The compound is not stable in air and cannot be isolated in a pure form. After adding two equivalents TFA, the TFA salt can be isolated.

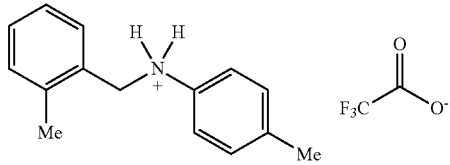

$^1$H-NMR (CDCl$_3$, 400 MHz): 11.75-11.20 (br, 2H), 7.30-7.10 (m, 8H), 4.42 (s, 2H), 2.31 (s, 3H), 2.05 (s, 3H); $^{13}$C-NMR (CDCl$_3$, 125 MHz): 139.9, 137.9, 131.9, 131.1, 130.8, 130.4, 129.8, 127.9, 126.5, 123.1, 53.6, 20.9, 18.6. $^{19}$F-NMR (CDCl$_3$, 376 MHz): -75.64.

Example 4: Coupling of Aryl Amine with Alkyl Carboxylic Acid

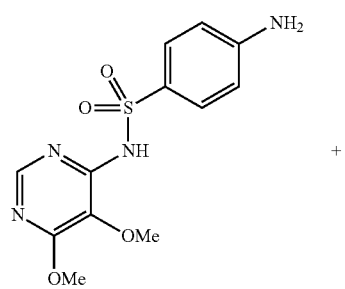

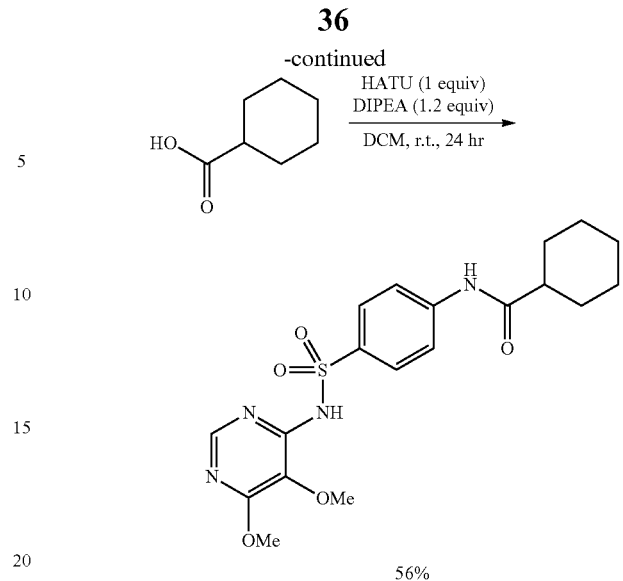

N-(4-(N-(5,6-dimethoxypyrimidin-4-yl)sulfamoyl)phenyl)cyclohexane carboxamide: To an oven-dried 2-dram vial charged with a Teflon-coated stir bar was added cyclohexane carboxylic acid (61.5 mg, 480.0 μmol, 1.20 equiv) in anhydrous dichloromethane (1.0 mL). Then, sulfadoxine (124.1 mg, 0.400 mmol, 1.00 equiv), HATU (152.1 mg, 0.400 mmol, 1.00 equiv), and diisopropylethylamine (83.6 μL, 480.0 μmol, 1.20 equiv) were added. The reaction mixture was stirred at room temperature for 24 hours. The reaction was diluted with water (15.0 mL) and extracted with ethyl acetate (3×10.0 mL). The combined organic layer was washed with brine and dried over anhydrous sodium sulfate. The solvent was removed in vacuo and the product was purified by column chromatography (acetone-ethyl acetate-hexanes 1:1:8) to give the desired compound as a white solid (95.0 mg, 56%). Rf=0.35 (ethyl acetate-hexanes=1:8); $^1$H NMR (500 MHz, DMSO-d6) δ 10.99 (s, 1H), 10.19 (s, 1H), 8.10 (s, 1H), 7.91 (d, J=8.4 Hz, 2H), 7.76 (d, J=8.6 Hz, 2H), 3.90 (s, 3H), 3.69 (s, 3H), 2.33 (dt, J=11.6, 3.5 Hz, 1H), 1.83-1.71 (m, 4H), 1.66-1.60 (m, 1H), 1.39 (qd, J=12.3, 3.0 Hz, 2H), 1.31-1.13 (m, 3H). %). $^{13}$C NMR (126 MHz, DMSO-d6) δ 174.93, 161.54, 150.58, 150.37, 143.40, 133.96, 128.73, 127.12, 118.27, 60.22, 54.01, 44.87, 28.97, 25.32, 25.13. HRMS (ESI): calculated C$_{19}$H$_{25}$N$_4$O$_5$S [M+H]$^+$: 421.1546, found: 421.1541.

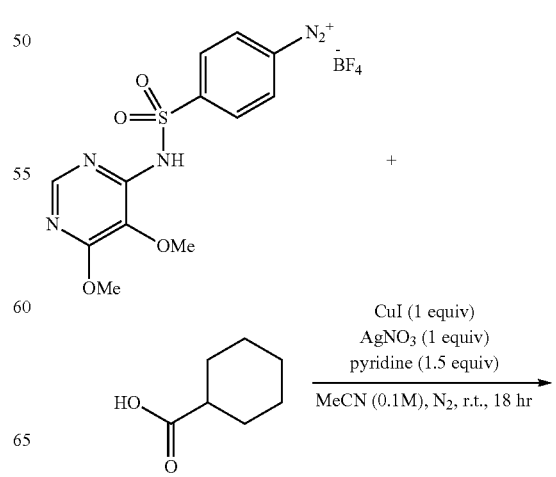

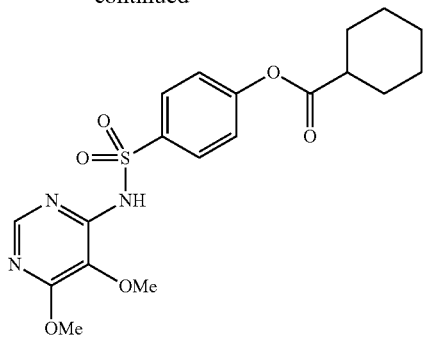

81%

4-(N-(5,6-dimethoxypyrimidin-4-yl)sulfamoyl)phenyl cyclohexanecarboxylate: Under an atmosphere of dry nitrogen, to a solution of cyclohexane carboxylic acid (25.6 mg, 0.200 mmol, 1.00 equiv) and anhydrous pyridine (24.0 μL, 0.300 mmol, 1.50 equiv) in anhydrous acetonitrile (1.0 mL) was added copper(I) iodide (0.0380 g, 0.200 mmol 1.00 equiv). The resulting reaction mixture was stirred for 10 minutes at 22.0° C. before the addition of solid silver nitrate (0.0343 g, 0.200 mmol, 1.00 equiv). A solution of diazonium salt (122.7 mg, 0.300 mmol, 1.50 equiv) in anhydrous acetonitrile (1.0 mL) was added to the mixture slowly. The reaction mixture was stirred at the same temperature until completion (16.0 hours, judged by TLC analysis). The reaction mixture was diluted with ethyl acetate (10.0 mL), washed with a saturated aqueous solution of ammonium chloride (2×10.0 mL), and a saturated aqueous solution of sodium sulfate (10.0 mL). The organic layer was dried over anhydrous magnesium sulfate. After removal of volatiles in vacuo, the residue was purified by flash chromatography on silica gel (acetone-ethyl acetate-hexanes 1:1:8) to give the desired ester product as a white powder (67.3 mg, 81%). Rf=0.65 (ethanol-ethyl acetate-hexanes=1:0.5:8); $^1$H NMR (500 MHz, CDCl$_3$) δ 8.27-8.07 (m, 3H), 7.77 (s, 1H), 7.22 (d, J=8.4 Hz, 2H), 3.98 (s, 3H), 3.86 (s, 3H), 2.56 (tt, J=11.2, 3.7 Hz, 1H), 2.04 (dt, J=12.5, 3.9 Hz, 2H), 1.81 (dt, J=12.8, 3.7 Hz, 3H), 1.69 (dq, J=12.5, 3.9 Hz, 1H), 1.62-1.52 (m, 2H), 1.37-1.27 (m, 3H). $^{13}$C NMR (126 MHz, CDCl$_3$) δ 173.84, 160.98, 154.88, 151.09, 149.67, 136.52, 130.33, 126.63, 122.07, 60.71, 54.32, 43.30, 28.98, 25.76, 25.40. HRMS (ESI): calculated C$_{19}$H$_{24}$N$_3$O$_6$S [M+H]+: 422.1386, found: 422.1387.

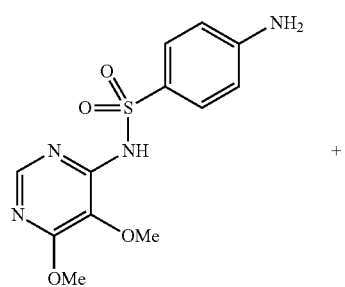

+

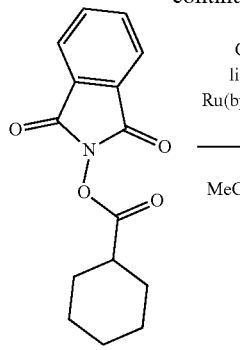

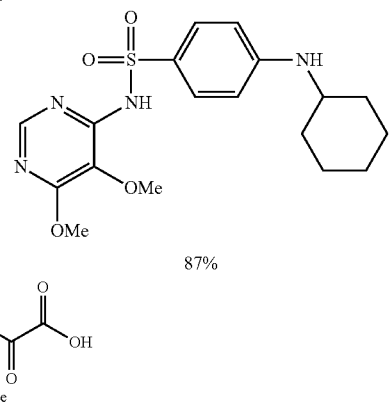

87%

4-(Cyclohexylamino)-N-(5,6-dimethoxypyrimidin-4-yl) benzenesulfonamide: The preparation of 1,3-dioxoisoindolin-2-yl cyclohexanecarboxylate NHPI ester and the amination reaction was performed according to literature precedent (Mao, R.; Frey, A.; Balon, J.; Hu, X., Nat. Catal. 1 (2), 120-126 (2018)). To an oven-dried 2-dram vial equipped with a Teflon-coated magnetic stir bar was sequentially charged with 1,3-dioxoisoindolin-2-yl cyclohexanecarboxylate, the N-hydroxyphthalimide ester of cyclohexanecarboxylic acid (32.8 mg, 120.0 μmol, 1 equiv), Ru(bpy)$_3$(PF$_6$)$_2$ (1.00 mg, 1.20 μmol, 1.0 mol %), CuBr (3.40 mg, 24.0 μmol, 20.0 mol %), 2-((2,6-dimethoxyphenyl)amino)-2-oxoacetic acid ligand (1.90 mg, 9.00 μmol, 7.5 mol %), sulfadoxine (74.5 mg, 240.0 μmol, 2.00 equiv), the vial was sealed with a screw cap and degassed under nitrogen. Then, anhydrous acetonitrile (2.0 mL) was added into the vial by syringe under anhydrous nitrogen, followed by neat triethylamine (83.6 μL, 600.0 μmol, 5.00 equiv). The vial was placed 3.0 cm away from one blue LED in a SynLED Parallel Photoreactor (MilliporeSigma cat. no. Z742680-1EA) and irradiated under fan cooling (maintain the temperature at room temperature) for 12.0 hours. After this time, the resulting dark brown reaction mixture was acidified with a saturated aqueous solution of ammonium chloride (3.0 mL) and then neutralized with a saturated aqueous NaHCO$_3$ solution (1.5 mL). The aqueous fraction was extracted with EtOAc (10.0 mL). The aqueous fraction was further washed with EtOAc (3×5.0 mL). The combined organic fractions were concentrated in vacuo with the aid of a rotary evaporator. The crude product residue was purified by flash column chromatography on silica gel (triethylamine:ethyl acetate:hexanes=0.1:1:4) to give the desired amination product as a pale yellow powder (41.0 mg, 87%). Rf=0.2 (triethylamine:ethyl acetate:hexanes=0.1:1:4), $^1$H NMR (700 MHz, CDCl$_3$) δ 8.17 (s, 1H), 7.87 (d, J=8.7 Hz, 2H), 7.76 (s, 1H), 6.52 (d, J=8.6 Hz, 2H), 4.18 (s, br, 1H), 3.96 (s, 3H), 3.82 (s, 3H), 3.31-3.24 (m, 1H), 2.00 (dd, J=12.7, 4.1 Hz, 2H), 1.78-1.72 (m, 2H), 1.65 (dt, J=13.1, 4.1 Hz, 1H), 1.40-1.31 (m, 2H), 1.27-1.13 (m, 3H), $^{13}$C NMR (176 MHz, CDCl$_3$) δ 160.83, 151.39, 151.28, 150.39, 130.86, 126.32, 124.93, 111.43, 60.60, 54.15, 51.42, 33.11, 25.76, 24.91. HRMS (ESI): calculated C$_{18}$H$_{25}$N$_4$O$_4$S [M+H]$^+$: 393.1597, found: 393.1594.

Example 5: Coupling of Alkyl Carboxylic Acid with Alkyl amine

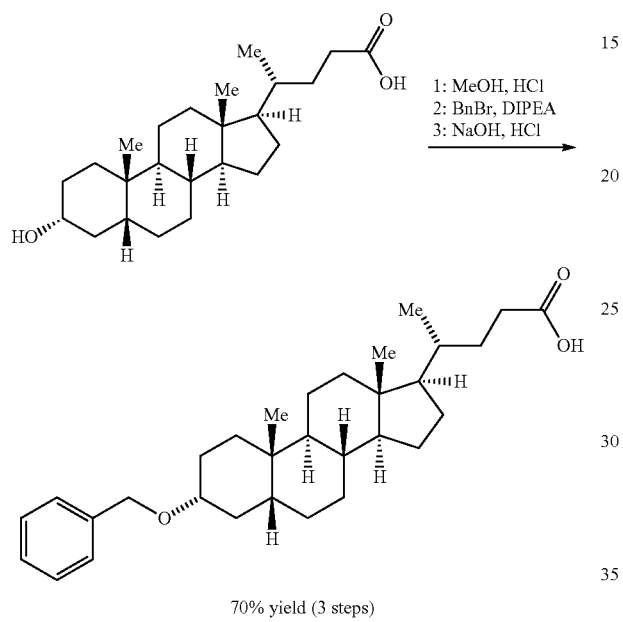

70% yield (3 steps)

Preparation of starting material (R)-4-((3R,5R,8R,9S,10S,13R,14S,17R)-3-(benzyloxy)-10,13-dimethylhexadecahydro-1H-cyclopenta[a]phenanthren-17-yl)pentanoic acid: To a 25 mL round bottom flask containing a Teflon-coated stir bar was added lithocholic acid (1.00 g, 2.66 mmol, 1.00 equiv), methanol (2.0 mL) and aqueous hydrochloric acid (2.0 mL, 37% w/w). The reaction mixture was heated to 50° C. and stirred at this temperature for 24.0 hours. Then, the reaction mixture was cooled to room temperature and the volatiles were removed in vacuo. To the residue was added a saturated aqueous solution of sodium bicarbonate (30.0 mL). The organic compound was extracted with ethyl acetate (3×30.0 mL). The organic layer was dried over anhydrous sodium sulfate and the solvent was removed in vacuo to produce a white solid, which was used without further purification. To a 10.0 mL crimp cap vial was charged the white solid produced above (1.04 g) and a Teflon-coated stir bar under neat conditions. Diisopropylethylamine (690 μL, 1.50 mmol, 1.50 equiv) and benzyl bromide (474 μL, 1.50 mmol, 1.50 equiv) were added. The tube was sealed and heated to 150° C. for 3.0 hours. The reaction was then diluted with a saturated aqueous solution of ammonium chloride (30.0 mL) and extracted with ethyl acetate (3×30.0 mL). The organic layer was dried over anhydrous sodium sulfate, and the solvent was removed in vacuo to produce a white solid, which was directly used in the next step without further purification. The white solid was charged into a dry round bottom flask and water (10.0 mL), and tetrahydrofuran (5.0 mL) was added, followed by solid sodium hydroxide (532 mg, 5.00 mmol, 5.00 equiv). The mixture was stirred for 6.0 hours at 50° C. after which point it was cooled to room temperature and acidified with 1.0 M aqueous hydrochloric acid to pH 3.0. The mixture was diluted with water (25.0 mL) and extracted with ethyl acetate (3×30.0 mL). The combined organic layer was dried over anhydrous sodium sulfate and the organic solvent was removed in vacuo. The product was purified by column chromatography on silica gel, eluting with 20% ethyl acetate:hexanes, to produce the desired product as a white solid (867 mg, 70% yield). Rf=0.1 (15% ethyl acetate in hexanes); $^1$H NMR (500 MHz, CDCl$_3$): δ 7.40-7.30 (m, 4H), 7.28-7.24 (m, 1H), 4.56 (s, 2H), 3.41-3.30 (m, 1H), 2.43-2.35 (m, 1H), 2.28-2.22 (m, 1H), 1.94 (d, J=10 Hz, 1H), 1.86-1.77 (m, 6H), 1.65-1.47 (m, 2H), 1.46-1.01 (m, 17H), 0.94-0.87 (m, 6H), 0.64 (s, 3H); $^{13}$C NMR (125 MHz, CDCl$_3$): δ 179.8, 139.1, 128.3, 127.6, 127.3, 78.5, 69.8, 56.4, 55.9, 42.7, 42.1, 40.3, 40.1, 35.8, 35.4, 35.3, 34.9, 33.2, 30.9, 30.7, 28.2, 27.3, 27.2, 26.4, 24.2, 23.4, 20.8, 18.2, 12.0.

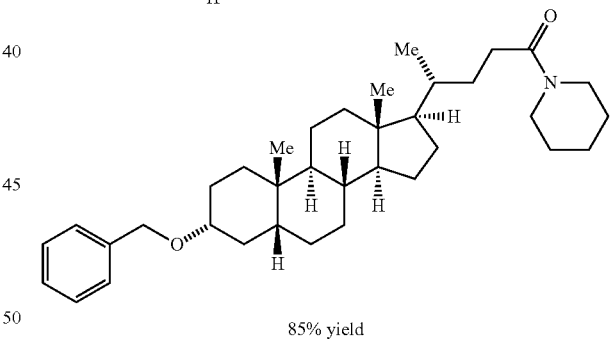

85% yield (R)-4-((3R,5R,8R,9S,10S,13R,14S,17R)-3-(Benzyloxy)-10,13-dimethylhexadecahydro-1H-cyclopenta[a]phenanthren-17-yl)-1-(piperidin-1-yl)pentan-1-one: To a pre-dried 2-dram vial charged with a Teflon-coated stir bar was added O-benzyl lithocholic acid (47.0 mg, 0.100 mmol, 1.00 equiv). Then, HATU (38.0 mg, 0.100 mmol, 1.00 equiv), piperidine (28) (49.0 μL, 0.500 mmol, 5.00 equiv) and diisopropylethylamine (87.0 μL, 0.500 mmol, 5.00 equiv) were added into the above vial. The reaction was stirred at room temperature for 24.0 hours. The reaction was diluted with water (20.0 mL) and extracted with ethyl acetate (3×20.0 mL). The combined organic layer was washed with brine (50.0 mL) and dried over anhydrous sodium sulfate. The volatiles were removed in vacuo and the product was purified by column chromatography (gradient eluent from 20% ethyl acetate in hexanes to 25% ethyl acetate) to result in the white solid desired product (45.0 mg, 85% yield). Rf=0.7 (50% ethyl acetate in hexanes); 1H NMR (400 MHz, CDCl$_3$): δ 7.33-7.28 (m, 4H), 7.25-7.21 (m, 1H), 4.53 (s, 2H), 3.51 (br, 2H), 3.37-3.34 (m, 3H), 2.38-2.32 (m, 1H), 2.21-2.13 (m, 1H), 1.94-1.00 (m, 32H), 1.00-0.88 (m, 6H), 0.61 (s, 3H); $^{13}$C NMR (125 MHz, CDCl$_3$): δ 172.0, 139.1, 128.3, 127.5, 127.3, 78.6, 69.8, 56.4, 55.9, 42.7, 42.1, 40.3, 40.1, 35.8, 35.7, 35.4, 34.9, 33.2, 31.6, 30.4, 28.3, 27.3, 27.2, 26.4, 24.6, 24.2, 23.4, 20.8, 18.5, 12.1; HRMS (ESI): calculated C$_{36}$H$_{56}$NO$_2$ [M+H]$^+$: 534.4306, found: 534.4302.

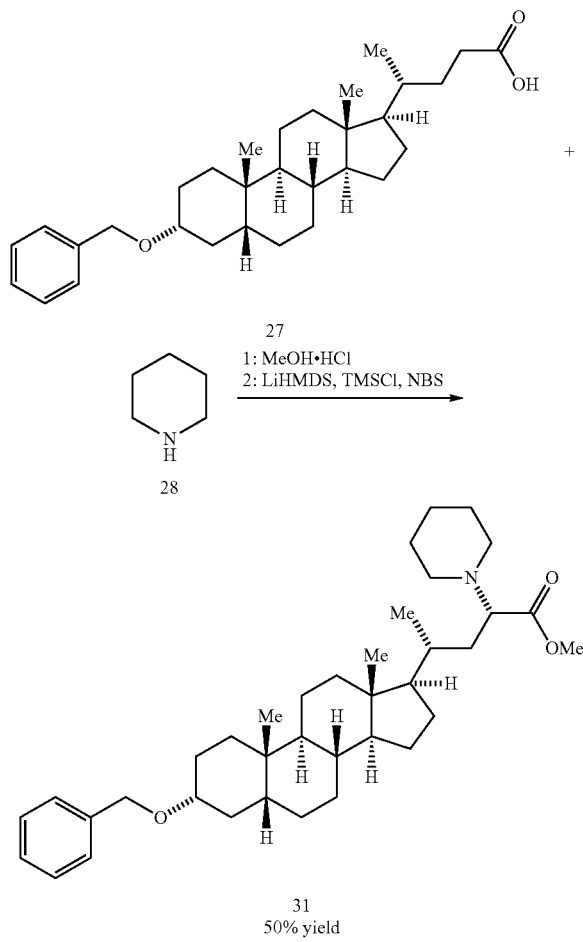

Methyl 3-(benzyloxy)-10,13-dimethylhexadecahydro-1H-cyclopenta[a]phenanthren-17-yl)-2-(piperidin-1-yl)pentanoate: To a 10.0 mL round bottom flask charged with a Teflon-coated stir bar was added O-benzyl lithocholic acid (27) (93.0 mg, 0.200 mmol, 1.00 equiv), methanol (5.0 mL) and 37% (w/w) hydrochloric acid (0.50 mL). The reaction was stirred at room temperature until the starting material was completely consumed, as determined by TLC. At this stage, the volatiles were removed in vacuo. A saturated aqueous solution of sodium bicarbonate (10.0 mL) was then added and the organic product was extracted with ethyl acetate (3×10.0 mL). The combined organic layer was dried over anhydrous sodium sulfate and volatiles were removed in vacuo to produce methyl (R)-4-((3R,5R,8R,9S,10S,13R,14S,17R)-3-(benzyloxy)-10,13-dimethylhexadecahydro-1H-cyclopenta[a]phenanthren-17-yl)pentanoate, which was used in the next step without further purification. To a pre-dried 2-dram crimp cap vial charged with a Teflon-coated stir bar was added methyl (R)-4-((3R,5R,8R,9S,10S,13R,14S,17R)-3-(benzyloxy)-10,13-dimethylhexadecahydro-1H-cyclopenta[a]phenanthren-17-yl)pentanoate (96.0 mg, 0.200 mmol, 1.00 equiv). The crimp cap vial was moved into the glove box and LiHMDS (50.0 mg, 0.300 mmol, 1.50 equiv) was added. The sealed tube was removed from the glovebox and cooled to −78° C. Anhydrous tetrahydrofuran (1.0 mL) was added and the reaction mixture was stirred for 30.0 minutes at this temperature. Trimethylsilyl chloride (38.0 jtL, 0.300 mmol, 1.50 equiv) was then added into the above solution. The mixture was warmed to 0° C. and stirred for 30.0 minutes at this temperature. The tube was cooled to −78° C. and a solution of NBS solution (47.0 mg, 0.260 mmol, 1.30 equiv) in anhydrous THF (1.0 mL) was added. The reaction mixture was warmed up to room temperature and stirred for 1.0 hour. The reaction was quenched with a saturated aqueous solution of ammonium chloride (5.0 mL) and extracted with ethyl acetate (3×5.0 mL). The combined organic layer was dried over anhydrous sodium sulfate and the volatiles were removed in vacuo to produce the brominated intermediate methyl (4R)-4-((3R,5R,8R,9S,10S,13R,14S,17R)-3-(benzyloxy)-10,13-dimethylhexadecahydro-1H-cyclopenta[a]phenanthren-17-yl)-2-bromopentanoate, which was used without further purification. Tetrahydrofuran (1.0 mL), piperidine (50.0 μL, 0.500 mmol, 2.50 equiv) and diisopropylethylamine (87.0 μL, 0.500 mmol, 2.50 equiv) were added into the above solution. The reaction mixture was stirred for 12.0 hours at room temperature. Then, the reaction was diluted with water (20.0 mL) and extracted with ethyl acetate (3×20.0 mL). The combined organic layer was washed with brine and dried over anhydrous sodium sulfate. The volatiles were removed in vacuo and the product was purified by column chromatography (10% ethyl acetate in hexanes) to produce the desired product as a white solid (major isomer, 56.0 mg, 50% yield). The diastereoisomeric ratio was determined to be 5.8:1 by integration of UPLC peak areas (UV λ$_{254}$). A pure sample of the minor isomer was isolated from a separate reaction performed on 0.5 mmol scale and this sample was used to perform NOESY analysis. Rf (major isomer)=0.7 (50% ethyl acetate in hexanes); Rf (minor isomer)=0.9 (50% ethyl acetate in hexanes); $^1$H NMR (400 MHz, CDCl$_3$): δ 7.33-7.28 (m, 4H), 7.25-7.21 (m, 1H), 4.53 (s, 2H), 3.51 (br, 2H), 3.37-3.34 (m, 3H), 2.38-2.32 (m, 1H), 2.21-2.13 (m, 1H), 1.94-1.00 (m, 32H), 1.00-0.88 (m, 6H), 0.61 (s, 3H); $^{13}$C NMR (125 MHz, CDCl$_3$): δ 172.7, 139.1, 128.3, 127.6, 127.3, 88.6, 69.8, 66.8, 56.8, 56.5, 51.2, 50.9, 42.7, 42.1, 40.3, 40.2, 35.8, 35.7, 35.4, 34.8, 33.6, 33.2, 28.3, 27.3, 27.2, 26.3, 26.2, 24.5, 23.4, 20.8, 18.9, 11.9; HRMS (ESI): calculated C$_{37}$H$_{58}$NO$_3$[M+H]$^+$: 564.4411, found: 564.4401.

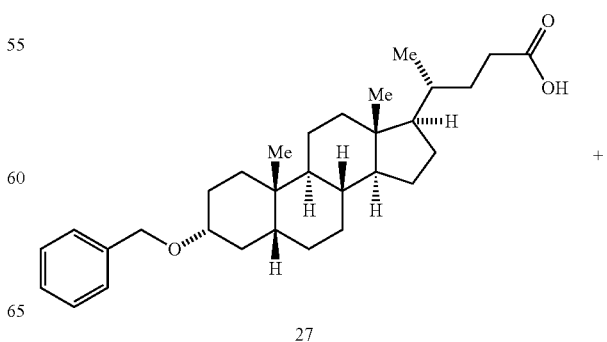

-continued

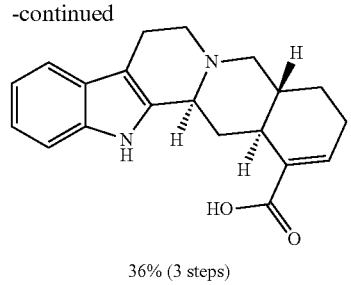

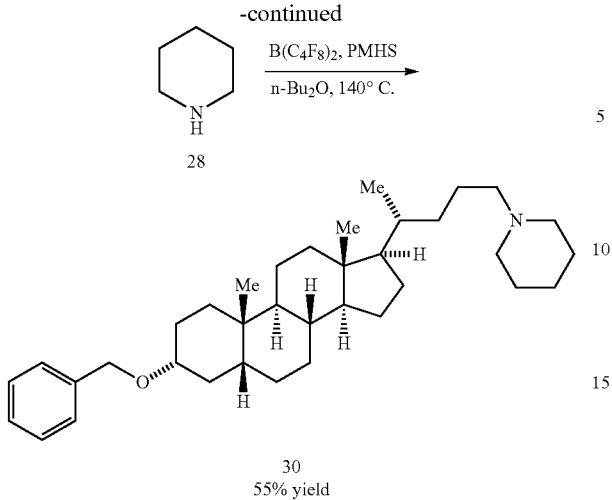

30
55% yield 1-(4-(3-(Benzyloxy)-10, 13-dimethylhexadecahydro-1H-cyclopenta[a]phenanthren-17-yl)pentyl)piperidine: To a pre-dried 2-dram vial charged with a Teflon-coated stir bar was added O-benzyl lithocholic acid (27) (107 mg, 0.230 mmol, 2.30 equiv) outside the glove box. Then the 2-dram vial was moved into the glove box and tris(pentafluorophenyl)borane (51.1 mg, 0.100 mmol, 1.00 equiv) was added. After the vial was moved out of the glove box, piperidine (28) (10.0 µL, 0.100 mmol, 1.00 equiv) and poly(methylhydrosiloxane) (30.0 µL, 0.500 mmol, 5.00 equiv) were added into the vial with a syringe. Then, the degassed n-butyl ether (1.0 mL) was added. The reaction was stirred at 140° C. for 72.0 hours. The volatiles were removed in vacuo and the product was purified by column chromatography (gradient eluent from 1% methanol in dichloromethane to 5% methanol in dichloromethane) to result in the white solid product (30) (28.5 mg, 55% yield). In order to facilitate the characterization, trifluoroacetic acid (8.5 µL, 0.110 mmol) was added to form the TFA salt of the amine product. Rf=0.1 (5% methanol in dichloromethane); $^1$H NMR (400 MHz, CDCl$_3$): δ 7.34-7.29 (m, 4H), 7.27-7.24 (m, 1H), 4.55 (s, 2H), 3.65-3.60 (br, 2H), 3.40-3.34 (m, 1H), 2.98-2.85 (br, 2H), 2.70-2.55 (br, 2H), 1.93-1.68 (m, 12H), 1.67-1.50 (m, 3H), 1.45-1.28 (m, 9H), 1.27-0.98 (m, 10H), 0.90-0.88 (m, 6H), 0.60 (s, 3H); $^{13}$C NMR (125 MHz, CDCl$_3$): δ 138.8, 128.3, 127.6, 127.4, 78.7, 69.8, 58.0, 56.3, 55.9, 53.5, 53.4, 42.7, 42.1, 40.2, 40.0, 35.8, 35.3, 34.8, 33.1, 32.7, 28.2, 27.2, 27.1, 26.3, 24.1, 23.3, 22.8, 21.9, 20.7, 20.4, 18.3, 11.9; HRMS (ESI): calculated C$_{36}$H$_{58}$NO [M+H]$^+$: 520.4513, found: 520.4507.

Example 6: Coupling of α, β Unsaturated Carboxylic Acid and Aryl Amine

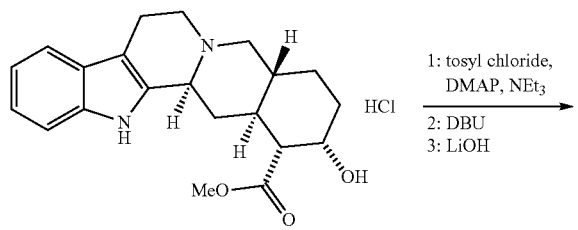

(4aR,13bS,14aS)-3,4,4a,5,7,8,13,13b,14,14a-decahydroindolo[2,3-3,4]pyrido[1,2b]isoquinoline-1-carboxylic acid: Yohimbine hydrochloride (400 mg, 1.00 mmol, 1.00 equiv), tosyl chloride (380 mg, 2.00 mmol, 2.00 equiv) and anhydrous dichloromethane (25.0 mL) were added to an oven-dried 50.0 mL round bottom flask charged with a Teflon-coated stir bar. DMAP (244 mg, 2.00 mmol, 2.00 equiv) and triethylamine (600 µL, 4.40 mmol, 4.40 equiv) were added. The reaction mixture was heated to 40° C. with stirring under a dry nitrogen atmosphere and the reaction mixture became a clear solution. After 48.0 hours, UPLC-MS analysis showed that yohimbine had been completely converted to methyl (1R,2S,4aR,13bS,14aS)-2-(tosyloxy)-1,2,3,4,4a,5,7,8,13,13b,14,14a-dodecahydroindolo[2,3-3,4]pyrido[1,2-b]isoquinoline-1-carboxylate. Next, DBU (747 µL, 5.00 mmol, 5.00 equiv) was added. The reaction was stirred for another 24.0 hours at 40° C. until methyl (1R,2S,4aR,13bS,14aS)-2-(tosyloxy)-1,2,3,4,4a,5,7,8,13,13b,14,14a-dodecahydroindolo[2,3-3,4]pyrido[1,2-b]isoquinoline-1-carboxylate was completely consumed as determined by UPLC-MS analysis. The stir bar was then removed from the round bottom flask and 5.00 g silica gel was added to the flask. The solvent was carefully removed in vacuo to produce a yellow silica gel/product mixture. The silica gel was loaded onto a column of silica gel and methyl (4aR,13bS,14aS)-3,4,4a,5,7,8,13,13b,14,14a-decahydroindolo[2,3-3,4]pyrido[1,2-b]isoquinoline-1-carboxylate intermediate was purified by flash column chromatography (ethyl acetate:hexanes=1:2 to 1:1) as a white solid (201 mg, 0.600 mmol, 60%). To an oven-dried 2-dram vial with a Teflon-coated stir bar were added methyl (4aR,13bS,14aS)-3,4,4a,5,7,8,13,13b,14,14a-decahydroindolo[2,3-3,4]pyrido[1,2-b]isoquinoline-1-carboxylate (33.6 mg, 0.100 mmol, 1.00 equiv) and lithium hydroxide (2.40 mg, 0.100 mmol, 1.00 equiv). Deionized water (0.50 mL), THF (1.0 mL), and methanol (0.50 mL) were added into the above vial. After stirring for 5.0 mins, both methyl (4aR,13bS,14aS)-3,4,4a,5,7,8,13,13b,14,14a-decahydroindolo[2,3-3,4]pyrido[1,2-b]isoquinoline-1-carboxylate and lithium hydroxide were dissolved. The solution was bubbled with nitrogen for 10.0 mins before the vial was sealed. Then, the mixture was stirred for 32.0 hours at 50° C. when UPLC-MS indicated that the methyl (4aR,13bS,14aS)-3,4,4a,5,7,8,13,13b,14,14a-decahydroindolo[2,3-3,4]pyrido[1,2-b]isoquinoline-1-carboxylate was completely consumed. The reaction was then stopped. The pH of the solution was acidified to 3.0 with 0.50 M HCl methanol solution (0.50 mL). Silical gel (5.0 g) was added into the above solution and the volatile was removed in vacuo carefully. The desired product was purified by dry loading column chromatography (10% methanol in methylene chloride with 1.0% triethyl amine) to obtain the desired product as a white solid (19.3 mg, 60% yield). Rf=0.1 (15% methanol in methylene chloride); 1H NMR (500 MHz, d4-MeOH): δ 7.46 (d, J=8.0 Hz, 1H), 7.36 (d, J=8.0 Hz, 1H), 7.13 (t, J=8.0 Hz, 1H), 7.04 (t, J=8.0 Hz, 1H), 6.57-6.54 (m, 1H), 4.37 (d, J=7.2 Hz, 1H), 3.64 (dd, J=11.5 Hz, 5.0 Hz, 1H), 3.44 (dd, J=11.5 Hz, 3.0 Hz, 1H), 3.38-3.34 (m, 1H), 3.26 (dt, J=13.0 Hz, 2.5 Hz, 1H), 3.22-3.15 (m, 1H), 3.04-2.98 (m, 2H), 2.56-2.50 (m, 1H), 2.33-2.31 (m, 2H), 1.88-1.80 (m, 1H), 1.77-1.72 (m, 1H), 1.46-1.37 (m, 2H), 0.91-0.85 (m, 1H). $^{13}$C NMR (125 MHz, d$_4$-MeOH): □ 173.1, 137.0, 136.5, 133.3, 130.1, 126.2, 121.6, 118.9, 117.5, 111.0, 105.5, 61.6, 58.9, 52.4, 39.2, 37.8, 31.6, 25.0, 24.8, 19.5; HRMS (ESI): calculated C$_{20}$H$_{23}$N$_2$O$_2$[M+H]$^+$: 323.1760, found: 323.1758.

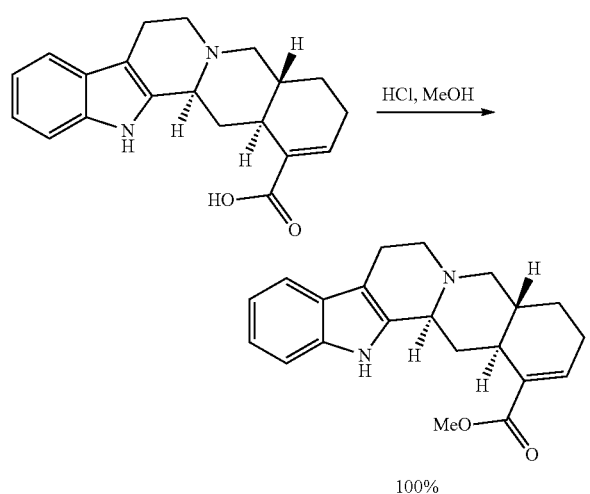

100%

Methyl(4aR,13bS,14aS)-3,4,4a,5,7,8,13,13b,14,14a-decahydroindolo[2,3,3,4]pyrido[1,2-b]isoquinoline-1-carboxylate: To an oven-dried 2-dram vial with a Teflon-coated stir bar was added (4aR,13bS,14aS)-3,4,4a,5,7,8,13,13b,14,14a-decahydroindolo[2,3,3,4]pyrido[1,2-b]isoquinoline-1-carboxylic acid (19.3 mg, 0.0600 mmol, 1.00 equiv) and 3.0 mL ACS grade methanol. Then, 12.1 N HCl (25.0 μL, 0.300 mmol, 3.00 equiv) was added into the solution, and the solution was bubbled with nitrogen gas for 20.0 mins. The reaction was stirred for 48.0 hours at 50.0° C. when UPLC-MS showed that (4aR,13bS,14aS)-3,4,4a,5,7,8,13,13b,14,14a-decahydroindolo[2,3,3,4]pyrido[1,2-b]isoquinoline-1-carboxylic acid was completely consumed. Then, the volatile portion of the reaction mixture was removed in vacuo. Following this, deionized water (10.0 mL) was added into the residue and the pH was further adjusted to 8.0 with saturated sodium bicarbonate solution (10.0 mL). The aqueous layer was extracted with ethyl acetate (3×20.0 mL). The combined organic layer was washed with saturated sodium sulfate solution (20.0 mL) and dried with anhydrous sodium sulfate. After filtration, the volatile was removed in vacuo to get the white solid methyl (4aR,13bS,14aS)-3,4,4a,5,7,8,13,13b,14,14a-decahydroindolo[2,3,3,4]pyrido[1,2-b]isoquinoline-1-carboxylate in quantitative yield (20.0 mg, 0.0600 mmol, 100%). Rf=0.2 (50% ethyl acetate in hexanes); $^1$H NMR (400 MHz, d6-DMSO): δ 10.76 (s, 1H), 7.31 (d, J=8.0 Hz, 1H), 7.28 (d, J=8.0 Hz, 1H), 6.98 (t, J=8.0 Hz, 1H), 6.90 (t, J=8.0 Hz, 1H), 6.69 (s, 1H), 3.71 (s, 3H), 3.30 (d, J=8.0 Hz, 1H), 3.00-2.96 (m, 1H), 2.89-2.87 (m, 2H), 2.80-2.73 (m, 1H), 2.54-2.47 (m, 2H), 2.21-2.16 (m, 4H), 1.57-1.49 (m, 2H), 1.23-1.13 (m, 1H), 0.98 (q, J=12.0 Hz, 1H); $^{13}$C NMR (125 MHz, d6-DMSO): δ 167.5, 139.6, 136.5, 135.9, 133.7, 127.2, 120.7, 118.7, 117.8, 111.5, 106.7, 61.1, 60.6, 52.8, 51.7, 40.6, 39.7, 33.4, 26.0, 25.5, 22.1; HRMS (ESI): calculated C$_{21}$H$_{25}$N$_2$O$_2$ [M+H]$^+$: 337.1916, found: 337.1904.

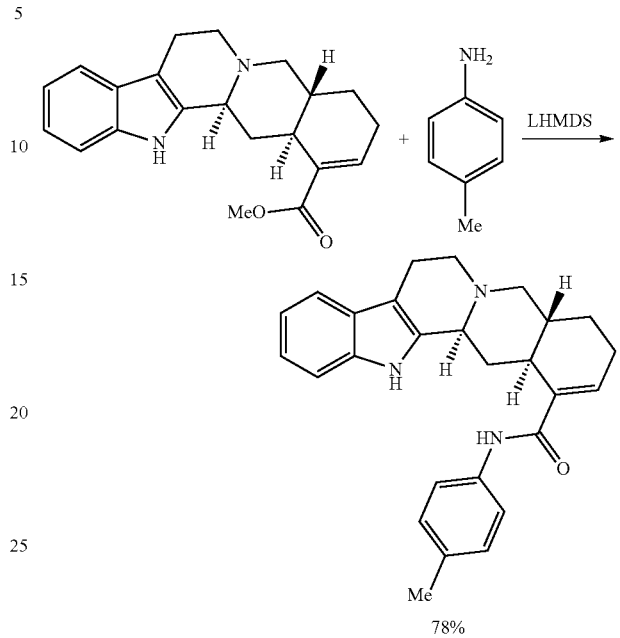

78%

N-(p-tolyl)-3,4,4a,5,7,8,13,13b,14,14a-decahydroindolo[2,3,3,4]pyrido[1,2-b]isoquinoline-1-carboxamide: To an oven-dried 2-dram vial with a Teflon-coated stir bar was added p-toluidine (32.0 mg, 0.300 mmol, 3.00 equiv). Then, the vial was moved into the glovebox, and solid LHMDS (50.1 mg, 0.300 mmol, 3.00 equiv) was added. The vial was then moved out of the glove box. Anhydrous THF (1.0 mL) was added into the above vial, which was stirred at room temperature for 30.0 minutes to obtain a clear brownish solution. Yohimbine enoate (33.6 mg, 0.100 mmol, 1.00 equiv) was added into another pre-dried 2-dram vial. By using Schlenk technique, the air in the vial was replaced with nitrogen. Anhydrous THF (0.50 mL) was added to the second vial and a clear solution was obtained after stirring for 1.0 minute. The solution in the second vial was transferred into the first vial and the mixture was stirred for another 16.0 hours at 70° C. Once TLC and UPLC-MS indicated that the yohimbine enoate was completely consumed, the reaction was terminated by adding 3.0 g silica gel to the solution and the volatiles were removed in vacuo. By using the dry-loading method, the product was purified by flash column chromatography (gradient eluent from 50% ethyl acetate in hexanes to pure ethyl acetate) to obtain the desired product as a white solid (32.0 mg, 78% yield). Rf=0.2 (100% ethyl acetate); $^1$H NMR (500 MHz, d4-MeOH): δ 7.51 (d, J=8.0 Hz, 2H), 7.36 (d, J=8.0 Hz, 1H), 7.23 (d, J=8.0 Hz, 1H), 7.13 (d, J=8.0 Hz, 2H), 7.06 (t, J=7.5 Hz, 1H), 6.94 (t, J=7.5 Hz, 1H), 6.31 (s, 1H), 3.38-3.34 (m, 1H), 3.13-3.09 (m, 1H), 2.98-2.96 (m, 2H), 2.71 (d, J=12.5 Hz, 2H), 2.65-2.59 (m, 1H), 2.44-2.41 (m, 1H), 2.31 (s, 3H), 2.25 (t, J=10.0 Hz, 1H), 1.76 (d, J=10.0 Hz, 1H), 1.70 (d, J=10.0 Hz, 1H), 1.41-1.35 (m, 1H), 1.32-1.24 (m, 1H). $^{13}$C NMR (125 MHz, d4-MeOH): δ 169.3, 138.2, 136.6, 135.9, 134.0, 133.6, 131.3, 128.7, 126.9, 120.4, 120.3, 119.9, 118.3, 117.1, 110.7, 106.3, 60.6, 52.8, 40.0, 38.5, 31.8, 25.3, 25.1, 21.0, 19.5; HRMS (ESI): calculated C$_{27}$H$_{30}$N$_3$O [M+H]$^+$: 412.2389, found: 412.2383.

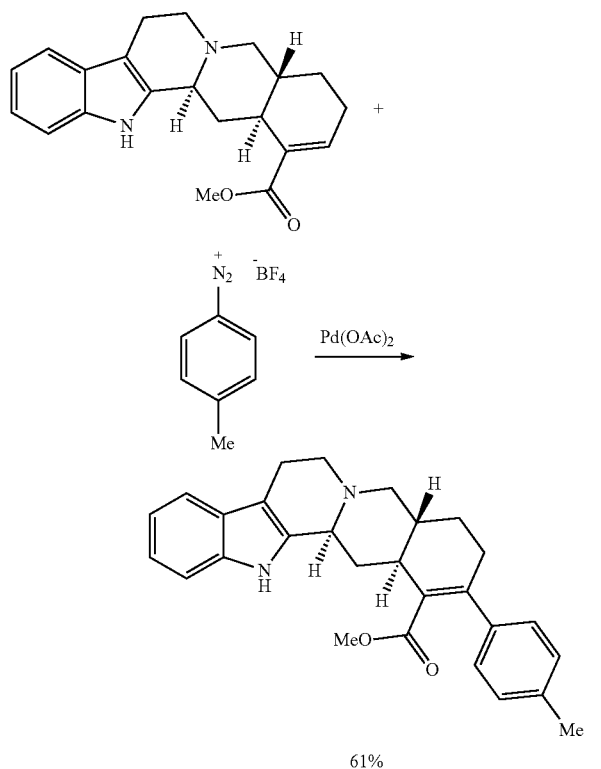

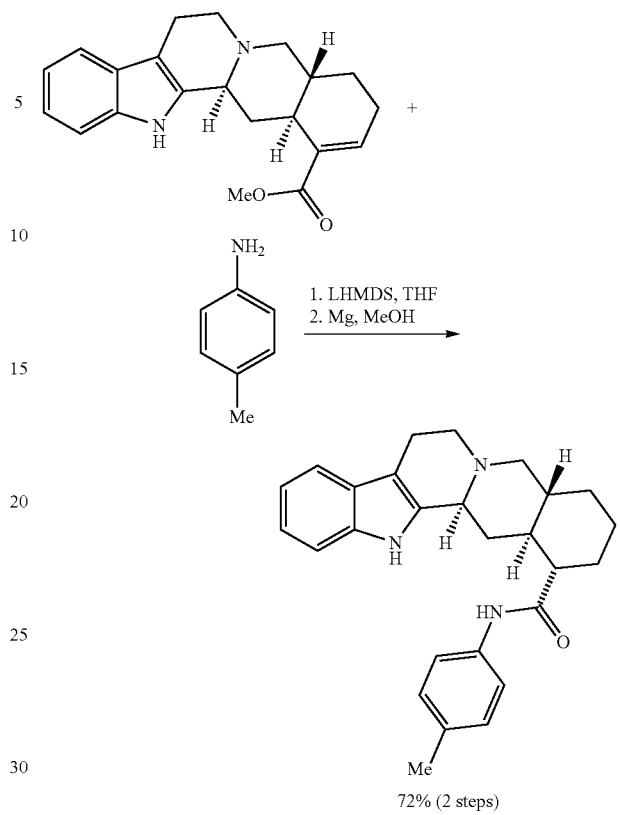

Methyl 2-(p-tolyl)-3,4,4a,5,7,8,13,13b,14,14a-decahydroindolo[2',3':3,4]pyrido[1,2-b]isoquinoline-1-carboxylate: To a 25.0 mL round bottom flask was added yohimbine enoate (33.6 mg, 0.100 mmol, 1.00 equiv), p-toluidine diazonium salt (103 mg, 0.500 mmol, 5.00 equiv) and methanol (10.0 mL). Then, palladium(II) acetate (2.30 mg, 0.0100 mmol, 0.100 equiv) was added to the mixture. The mixture was stirred and heated to 45.0° C. under air. After 1.0 hour, the reaction turned into a clear black solution. The reaction was stirred for another 23.0 hours at 45.0° C. When TLC and UPLC-MS analysis showed that yohimbine enoate was completely consumed, 3.0 g silica gel was added into the round bottom flask and the volatiles were removed completely in vacuo to produce a yellow silica gel/product mixture. By using the dry loading method, the product was purified by flash column chromatography (30% ethyl acetate in hexanes) to result in the desired product as a pale yellow solid (26.0 mg, 61%). Rf=0.4 (30% ethyl acetate in hexanes). $^1$H NMR (500 MHz, d4-MeOH): δ 7.41 (d, J=8.0 Hz, 2H), 7.33 (d, J=8.0 Hz, 2H), 7.06 (t, J=8.0 Hz, 2H), 6.99 (t, J=8.0 Hz, 2H), 4.02 (br, 1H), 3.91 (d, J=13.5 Hz, 1H), 3.63 (s, 3H), 3.56 (d, J=11.5 Hz, 1H), 3.24-3.20 (m, 2H), 3.07-3.00 (m, 1H), 2.79 (m, 1H), 2.75-2.70 (m, 1H), 2.65-2.55 (m, 1H), 2.34 (t, J=11.5 Hz, 1H), 2.30 (s, 3H), 2.14 (t, J=12.5 Hz, 1H), 1.96-1.91 (m, 1H), 1.77 (d, J=13.0 Hz, 1H), 1.62-1.59 (m, 1H), 1.20-1.13 (m, 1H). $^{13}$C NMR (125 MHz, d4-MeOH): δ 168.4, 139.6, 139.5, 137.3, 135.9, 130.9, 128.6, 127.7, 127.4, 125.8, 122.3, 119.4, 117.8, 111.3, 105.9, 61.4, 58.1, 52.7, 51.1, 41.4, 35.9, 31.4, 28.9, 20.8, 19.6, 18.8. HRMS (ESI): calculated $C_{28}H_{31}N_2O_2$ [M+H]$^+$: 427.2386, found: 427.2382.

(1S,4aR,3bS,14aS)—N-(p-tolyl)-1,2,3,4,4a,5,7,8,13,13b,14,14a-dodecahydroindolo[2',3':3,4]pyrido[1,2-b]isoquinoline-1-carboxamide: To an oven-dried 2-dram vial with a Teflon-coated stir bar was added p-toluidine (32.0 mg, 0.300 mmol, 3.00 equiv). Then, the vial was moved into the glovebox, and solid LiHMDS (50.1 mg, 0.300 mmol, 3.00 equiv) was added. The vial was moved out of the glove box. Anhydrous THF (1.0 mL) was added into the above vial, which was then stirred at room temperature for 30.0 minutes to obtain a clear brownish solution. Yohimbine enoate (33.6 mg, 0.100 mmol, 1.00 equiv) was added into another pre-dried 2-dram vial. By using Schlenk technique, the air in the vial was replaced with nitrogen. Then, anhydrous THF (0.5 mL) was added to the second vial and a clear solution was obtained after stirring for 1.0 minute. The solution in the second vial was transferred into the first vial and the mixture was stirred for another 16.0 hours at 70° C. Once TLC and UPLC-MS indicated that the yohimbine enoate was completely consumed, the reaction was terminated by adding 5.0 mL ACS grade methanol. Magnesium turnings (48.0 mg, 2.00 mmol, 20.0 equiv) were then added into the above solution in air. The mixture was stirred for 72.0 hours until the amide intermediate was consumed evidenced by UPLC-MS. Silica gel (5.00 g) was then added into the above cloudy solution and the volatiles were removed in vacuo. By using the dry-loading method, the product was purified by flash column chromatography (gradient eluent from 50% ethyl acetate in hexanes to pure ethyl acetate) to obtain the desired product as a white solid (30.0 mg, 72% yield). In order to get the characterization data for each diastereomer, the mixture was further purified by preparative TLC (pure ethyl acetate) to get the pure isomer. Rf=0.17 (bottom isomer) (100% ethyl acetate); $^1$H NMR (500 MHz, d4-MeOH): δ 7.36 (d, J=8.0 Hz, 1H), 7.33 (d, J=8.0 Hz, 2H), 7.25 (d, J=8.0 Hz, 1H), 7.05

(d, J=8.0 Hz, 2H), 7.01 (t, J=8.0 Hz, 1H), 6.95 (t, J=8.0 Hz, 1H), 3.48 (d, J=7.2 Hz, 1H), 3.16-3.13 (m, 1H), 3.00-2.97 (m, 2H), 2.76-2.66 (m, 3H), 2.62-2.58 (m, 1H), 2.27-2.25 (m, 1H), 2.24 (s, 3H), 2.17 (t, J=7.2 Hz, 1H), 2.05-1.95 (m, 2H), 1.80-1.68 (m, 3H), 1.62-1.54 (m, 2H), 1.09-1.04 (m, 1H), 0.91-0.85 (m, 1H). $^{13}$C NMR (125 MHz, d4-MeOH): δ 173.8, 136.6, 135.8, 133.8, 133.2, 128.7, 126.8, 120.5, 120.2, 118.3, 117.1, 110.5, 106.3, 62.1, 60.8, 52.7, 44.4, 43.3, 34.3, 32.9, 29.8, 29.7, 20.9, 20.6, 19.4; HRMS (ESI): calculated $C_{27}H_{32}N_3O$ [M+H]$^+$: 414.2545, found: 414.2542. $R_f$=0.18 (top isomer) (100% ethyl acetate); $^1$H NMR (500 MHz, $d_4$-MeOH): δ 7.51 (d, J=8.0 Hz, 2H), 7.35 (d, J=8.0 Hz, 1H), 7.20 (d, J=8.0 Hz, 1H), 7.14 (d, J=8.0 Hz, 2H), 6.99 (t, J=7.2 Hz, 1H), 6.93 (t, J=7.2 Hz, 1H), 3.42 (d, J=7.2 Hz, 1H), 3.14 (dd, J=7.2 Hz, 5.5 Hz, 1H), 3.03-2.95 (m, 2H), 2.75-2.65 (m, 2H), 2.35-2.21 (m, 5H), 1.97-1.90 (m, 2H), 1.70-1.58 (m, 4H), 1.54-1.46 (m, 1H), 1.37-1.32 (m, 1H), 1.19-1.12 (m, 1H), 0.91-0.83 (m, 1H). $^{13}$C NMR (125 MHz, $d_4$-MeOH): δ 174.8, 136.6, 135.9, 133.8, 133.4, 128.7, 126.7, 120.4, 119.9, 118.2, 117.0, 110.6, 106.2, 61.1, 60.5, 52.8, 50.8, 42.4, 39.9, 33.0, 30.5, 29.5, 24.8, 20.9, 19.5; HRMS (ESI): calculated $C_{27}H_{32}N_3O$ [M+H]$^+$: 414.2545, found: 414.2538.

General Procedure A: Preparation of Katritzky Salts

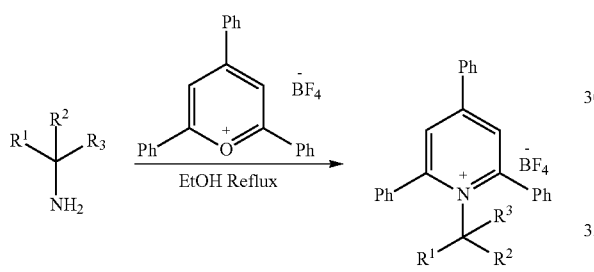

To a solution of triphenylpyrylium tetrafluoroborate (1 mmol, 395 mg) in 1 mL of ethanol, 1.2 mmol of the corresponding amine was added. The solution was heated for 4 hours at 80° C. If product precipitation occurred, the solution was cooled to room temperature and filtered. If product did not precipitate, the reaction was heated at 60° C. overnight, and upon cooling to room temperature, several drops of diethyl ether were added. The solution was allowed to stand for 15 minutes and filtered. The resulting product was washed with several portions of ether and dried on high vac overnight. See Org. Lett., 2015, 17, 4479.

General Procedure B: Synthesis of Ester Products from Potassium Carboxylates:

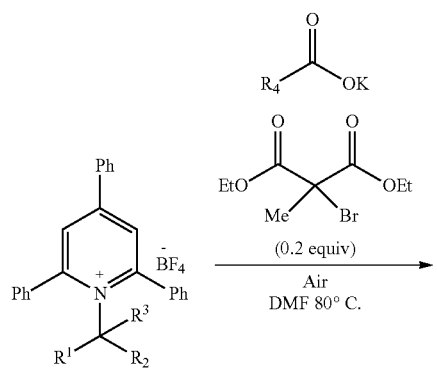

To a 4 mL screw-capped vial with septum (not dried), carboxylic acid (0.4 mmol, 2.0 equiv), Katrizky salt (0.20 mmol, 1 equiv), DMF (2.0 ml) and diethyl-2-bromo-2-methylmalonate (8 μL, 0.04 mmol, 0.2 equiv) were added. A needle was then inserted into the septum to allow air exchange. The mixture was stirred at 80° C. After 22 hours, the reaction was quenched with water and the aqueous layer was extracted. The organic layers were combined and dried over sodium sulfate. The crude residue was purified by prep TLC to provide the pure product. See Ozawa-Kumada et al., Org. Lett., 2015, 17, 4479.

General Procedure C: Synthesis of Ester Products from Free Acid:

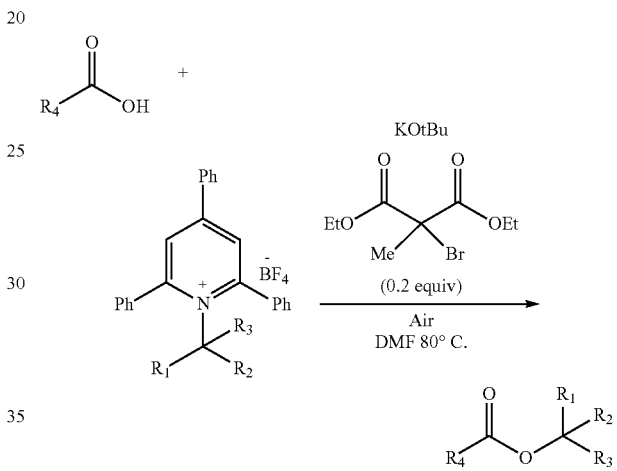

To a 2 dram vial in the glovebox was added 34 mg of potassium tertbutoxide (0.3 mmol, 1.5 equiv). The vial was capped, brought out of the glovebox, and carboxylic acid (0.4 mmol, 2.0 equiv), 1 equiv) and DMF (2.0 ml) were added. The solution was stirred for 5 minutes and Katrizky salt (0.20 mmol) and diethyl-2-bromo-2-methylmalonate (8 μL, 0.04 mmol, 0.2 equiv) were subsequently added. A needle was then inserted into the septum to allow air exchange. The mixture was stirred at 80° C. After 22 hours, the reaction was quenched with water and the aqueous layer extracted. The organic layers were combined and dried over sodium sulfate. The crude residue was purified by prep TLC to provide the pure product.

General Procedure D: Preparation of Potassium Carboxylates:

The desired carboxylic acid was dissolved in a minimal amount of methanol and subjected to an equimolar amount of 7M KOH in methanol on ice. If the starting acid was soluble in methanol, the resulting carboxylate precipitated out of solution readily. If the starting carboxylic acid was not soluble in methanol, ethanolic potassium tert-butoxide was used in place of potassium hydroxide. The resulting salt generally dissolved in the alcoholic solution and was isolated via removal of solvent.

Example 7: Reaction Mapping and Analysis Workflow

Enumeration workflow. The set of enumerated transformations was built on simple substrate pairs [sp$^2$ acid: C═C (C(O)=O); sp$^3$ acid: CC(C(O)=O); sp$^2$ amine: C=C(N); sp$^3$ amine: CC(N)]. For simplicity, only sp$^2$ or sp$^3$ containing substrates, and only functional group atoms and their and carbon atoms were considered. Each transformation was manually encoded as a SMARTS strings using RDkit's ReactionFromSmarts function. A total of 320 SMARTS strings were written. In the absence of hybridization there were 80 transformations. In the presence of hybridization, there were 320 transformations because there are four pairings (sp$^2$-sp$^2$, sp$^2$-sp$^3$, sp$^3$-sp$^2$, or sp$^3$-sp$^3$). In some instances, all 320 transformations were considered together, and in other instances they were broken down to the relevant sp$^h$-sp$^h$ subset pairing, each of which comprise 80 transformations, wherein h refers to the hybridization of each atom in the subset pairing, and each h independently is either 1, 2 or 3 for sp, sp$^2$ or sp$^3$ hybridization, respectively.

The use of SMARTS strings allows incorporation of R-groups, rather than defined atoms, so the basic enumeration structures could be used as an input to enumerate more complex substrate pairs. To begin an enumeration, two starting materials were selected. Aromatic rings were Kekulized in RDKit, if necessary, to localize aromatic bonds. Given the two selected starting materials and using the RunReactants function in RDKit, each transformation generated a product SMARTS string. This product was then sanitized using the SanitizeMol molecule function in RDKit, and appended to an array. For complicated molecular sets, a try/catch block was used to record and skip over any product that failed to be sanitized without crashing the script. Each product was saved with the name of its corresponding reaction for future reference. The final array of products was then converted to an array of SMILES and saved in a comma separated values (.csv) file for later use.

Physicochemical Property Characterization. Once the enumeration was complete, the final set of molecules was exported as a .csv of SMILES strings and imported into Dassault Systemes' Pipeline Pilot, where each molecule was ionized at a pH of 7.4. Once ionized, the products were imported into RDKit and additional relevant physicochemical properties (log P, HBA, HBD, etc) were calculated for each molecule. The set of all calculated properties was stored in an array.

Data Visualization. Once the desired characterization data of each molecule was calculated, various graphical and statistical methods were used for analysis. Python packages Matplotlib and Seaborn were used to develop ridge plots and the primary moment of inertia plot. A python script was written to prepare Circos datafiles, which were then imported to Circos to develop the chord diagrams.

Transformation prediction with IBM's Reaction Predictor. IBM's online reaction model (https://rxn.res.ibm.com/, accessed Mar. 4, 2019) was used to predict the potential outcome of two given reactants. A combinatorial matrix was generated by using each amine shown in the rows in FIG. 9 with each carboxylic acid, or derivatives, shown in the columns, as inputs into the model (a total of 36 individual reactions). The output was either a product molecule, or 'NR' if no reaction could be found, along with a level of confidence. The outcome with the highest confidence from each search is shown, along with the confidence, in the table in FIG. 9.

Retrosynthetic Visualization

Similar to the data visualization described above, a desired product can be viewed as a chord diagram, wherein each disconnection corresponds to a conceivable reaction. Retrosynthetic disconnection of the desired product using one of the conceivable reactions visualized in the chord diagram provides a simplified retrosynthetic intermediate, which can be used as an input to a new chord diagram and subjected to a similar retrosynthetic process. The process is visualized in FIG. 11, and can be iterated until simple or commercially available starting materials are identified.

The foregoing description is given for clearness of understanding only, and no unnecessary limitations should be understood therefrom, as modifications within the scope of the invention may be apparent to those having ordinary skill in the art.

Throughout this specification and the claims which follow, unless the context requires otherwise, the word "comprise" and variations such as "comprises" and "comprising" will be understood to imply the inclusion of a stated integer or step or group of integers or steps but not the exclusion of any other integer or step or group of integers or steps.

Throughout the specification, where compositions are described as including components or materials, it is contemplated that the compositions can also consist essentially of, or consist of, any combination of the recited components or materials, unless described otherwise. Likewise, where methods are described as including particular steps, it is contemplated that the methods can also consist essentially of, or consist of, any combination of the recited steps, unless described otherwise. The invention illustratively disclosed herein suitably may be practiced in the absence of any element or step which is not specifically disclosed herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

The practice of a method disclosed herein, and individual steps thereof, can be performed manually and/or with the aid of or automation provided by electronic equipment. Although processes have been described with reference to particular embodiments, a person of ordinary skill in the art will readily appreciate that other ways of performing the acts associated with the methods may be used. For example, the order of various of the steps may be changed without departing from the scope or spirit of the method, unless described otherwise. In addition, some of the individual steps can be combined, omitted, or further subdivided into additional steps.

The use of the terms "a," "an," "the," and similar referents in the context of the disclosure herein (especially in the context of the claims) are to be construed to cover both the singular and the plural, unless otherwise indicated. Recitation of ranges of values herein merely are intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended to better illustrate the disclosure herein and is not a limitation on the scope of the disclosure herein unless otherwise indicated. No language in the specification should be construed as indicating any non-claimed element as essential to the practice of the disclosure herein.

All patents, publications and references cited herein are hereby fully incorporated by reference. In case of conflict between the present disclosure and incorporated patents, publications and references, the present disclosure should control.

We claim:

1. A method comprising:
   (a) selecting one or more pairs of reactants comprising complementary functional groups, wherein each reactant pair comprises a free or an activated alkyl or aryl amine and an alkyl or aryl carboxylic acid or derivative thereof and one reactant of at least one reactant pair comprises a C—H bond that is capable of functionalization;
   (b) mapping all possible bond arrangements between the complementary functional groups of each reactant pair to provide a library of possible products using an adjacency matrix;
   (c) enumerating all possible oxidation states of each possible product in the library of possible products to produce a library of auxiliary products;
   (d) analyzing one or more properties of each possible product in the library of possible products and analyzing one or more properties of each auxiliary product in the library of auxiliary products to select one or more desired products with desired properties, wherein the desired properties comprise a target number of hydrogen bond donors (HBD), a target number of hydrogen bond acceptors (HBA), and a target formal charge (FC); and
   (e) analyzing one or more properties of the one or more pairs of reactants to select a reactant pair that forms the desired product upon functionalizing the C—H bond of the one reactant, wherein the selected reactant pair comprises at least one of the desired properties; and
   (f) functionalizing the C—H bond of the selected reactant pairs into a carbon-carbon bond, a carbon-oxygen bond, or a carbon-nitrogen bond based on the at least one desired property of the reactant pair, thereby synthesizing the one or more desired products with desired properties;
   wherein the synthesizing comprises functionalizing the C—H bond into a carbon-carbon bond, a carbon-oxygen bond, or a carbon-nitrogen bond; wherein if the at least one desired property of the reactant pair comprises the target number of hydrogen bond donors (HBD) or the target number of hydrogen bond acceptors (HBA), the C—H bond is functionalized into a carbon-oxygen bond or a carbon-nitrogen bond, and if the at least one desired property of the reactant pair comprises the target formal charge, the C—H bond is functionalized into a carbon-carbon bond; and the one or more properties is selected from the group consisting of partition coefficient (LOG P), molecular weight (MW), rotatable bonds (ROTB), polar surface area (PSA), aromaticity (AROM), formal charge (FC), 3D shape as determined by principal moment of inertia (PMI), fraction of $sp^3$ carbons (FSP3), number of hydrogen bond donors (HBD), number of hydrogen bond acceptors (HBA), quantitative estimate of drug-likeliness (QED), and combinations thereof; and
   wherein functionalizing the C—H bond comprises contacting the complementary functional groups in the presence of either: (a) a catalytic system comprising: (i) an oxidant or a reductant, and (ii) a transition metal catalyst comprising copper, nickel, iron, or palladium, or (b) a co-catalytic system comprising: (i) a transition metal co-catalyst comprising copper, nickel, or palladium, and (ii) a photoredox co-catalyst, or (c) when functionalizing the C—H bond into a carbon-oxygen bond, functionalizing the C—H bond comprises a radical shuttle.

2. The method of claim 1, further comprising
   enumerating all possible stereoisomers of each product and auxiliary product to produce a library of stereoisomers.

3. The method of claim 2, wherein the library of possible products, library of auxiliary products, and/or library of stereoisomers is a combinatorial library.

4. The method of claim 1, wherein the one or more properties is selected from the group consisting of partition coefficient (LOG P), molecular weight (MW), number of hydrogen bond donors (HBD), number of hydrogen bond acceptors (HBA), and combinations thereof.

5. The method of claim 1, wherein one reactant of the reactant pair comprises a functional group selected from the group consisting of an amine, an alcohol, a thiol, an organohalide, and activated forms thereof, and the other reactant of the reactant pair comprises a functional group selected from the group consisting of a carboxylic acid or derivative thereof, an alcohol, an amine, a thiol, an organohalide, and activated forms thereof.

* * * * *